US009830504B2

(12) United States Patent
Masood et al.

(10) Patent No.: US 9,830,504 B2
(45) Date of Patent: Nov. 28, 2017

(54) APPARATUS, METHODS AND SYSTEMS FOR INTEGRATED WORKFORCE MANAGEMENT AND ACCESS CONTROL

(71) Applicant: SoloInsight, Inc., Chicago, IL (US)

(72) Inventors: Farhan Masood, Lahore (PK); Muhammad Attiq Aamir, Lahore Cantt (PK); Muhammad Umair, Lahore (PK)

(73) Assignee: SOLOINSIGHT, INC., Chicago, IL (US)

( * ) Notice: Subject to any disclaimer, the term of this patent is extended or adjusted under 35 U.S.C. 154(b) by 0 days.

(21) Appl. No.: 15/141,083

(22) Filed: Apr. 28, 2016

(65) Prior Publication Data

US 2016/0239705 A1 Aug. 18, 2016

Related U.S. Application Data

(63) Continuation of application No. 14/553,310, filed on Nov. 25, 2014, now abandoned, which is a
(Continued)

(51) Int. Cl.
*G06K 9/00* (2006.01)
*G06Q 10/06* (2012.01)
(Continued)

(52) U.S. Cl.
CPC ..... *G06K 9/00255* (2013.01); *G06K 9/00221* (2013.01); *G06K 9/00248* (2013.01);
(Continued)

(58) Field of Classification Search
CPC .......... G06K 9/00617; G06K 9/00604; G06K 9/00281; G06K 9/00926; G06K 9/00248; G06K 9/00288; G06K 9/00255; G06K 9/00892; G06Q 10/06; G06Q 10/1091; G06Q 40/125; H04N 5/33; H04N 9/04
(Continued)

(56) References Cited

U.S. PATENT DOCUMENTS

2003/0059124 A1 3/2003 Center, Jr.
2004/0264743 A1 12/2004 Amouse
(Continued)

OTHER PUBLICATIONS

International Search Report for Application No. PCT/US14/26653 dated Aug. 11, 2014 (4 pages).
(Continued)

*Primary Examiner* — Ruiping Li
(74) *Attorney, Agent, or Firm* — Michael Best & Friedrich LLP

(57) ABSTRACT

Apparatus, systems and methods for managing a workforce working from a single or multiple locations through software and hardware components integrated under a modular solution for workforce management tasks, such as worker's biometric recognition, hiring, enrollment, time and attendance capturing, access control, tracking and managing schedules, overtime, leaves, holidays, absence, breaks, official and personal time-outs, trainings, assets, vehicles and transport, work orders and tasks, payroll and performance management, and reporting.

28 Claims, 43 Drawing Sheets

Related U.S. Application Data continuation of application No. 14/209,894, filed on Mar. 13, 2014, now abandoned.

(60) Provisional application No. 61/780,831, filed on Mar. 13, 2013.

(51) Int. Cl.
  *G06Q 40/00* (2012.01)
  *G06Q 10/10* (2012.01)
  *H04N 5/33* (2006.01)
  *H04N 9/04* (2006.01)
  *G07C 9/00* (2006.01)

(52) U.S. Cl.
  CPC ..... *G06K 9/00281* (2013.01); *G06K 9/00288* (2013.01); *G06K 9/00604* (2013.01); *G06K 9/00617* (2013.01); *G06K 9/00892* (2013.01); *G06K 9/00926* (2013.01); *G06Q 10/06* (2013.01); *G06Q 10/1091* (2013.01); *G06Q 40/125* (2013.12); *G07C 9/00158* (2013.01); *H04N 5/33* (2013.01); *H04N 9/04* (2013.01); *G07C 9/00007* (2013.01)

(58) Field of Classification Search
  USPC .......................................................... 382/117
  See application file for complete search history.

(56) References Cited

U.S. PATENT DOCUMENTS

| | | | |
|---|---|---|---|
| 2006/0104483 | A1 | 5/2006 | Harel et al. |
| 2008/0059807 | A1* | 3/2008 | Miller, Jr. .......... G06K 9/00979 713/186 |
| 2008/0075334 | A1* | 3/2008 | Determan .......... G06K 9/00604 382/117 |
| 2009/0097720 | A1 | 4/2009 | Roy et al. |
| 2009/0140838 | A1 | 6/2009 | Newman et al. |
| 2009/0320106 | A1 | 12/2009 | Jones et al. |
| 2010/0290668 | A1 | 11/2010 | Friedman et al. |
| 2010/0299530 | A1* | 11/2010 | Bell ........................ G06F 21/32 713/186 |
| 2011/0102142 | A1 | 5/2011 | Widger et al. |
| 2011/0135168 | A1 | 6/2011 | Hosoi |
| 2011/0228094 | A1 | 9/2011 | Cheng et al. |
| 2011/0248851 | A1 | 10/2011 | Pham |
| 2011/0277518 | A1 | 11/2011 | Lais et al. |
| 2011/0316671 | A1* | 12/2011 | Yaguchi ............. H04N 21/6582 340/5.83 |
| 2012/0200689 | A1* | 8/2012 | Friedman .......... G06K 9/00604 348/78 |
| 2012/0257031 | A1 | 10/2012 | Tsuchiya et al. |

OTHER PUBLICATIONS

Written Opinion for Application No. PCT/US14/26653 dated Aug. 11, 2014 (15 pages).

* cited by examiner

FIG. 1b
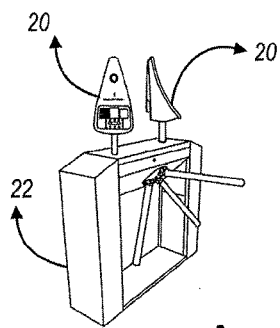
A
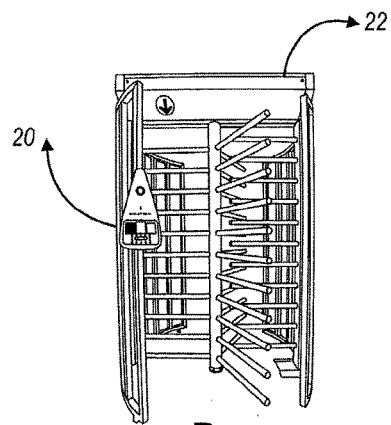
B
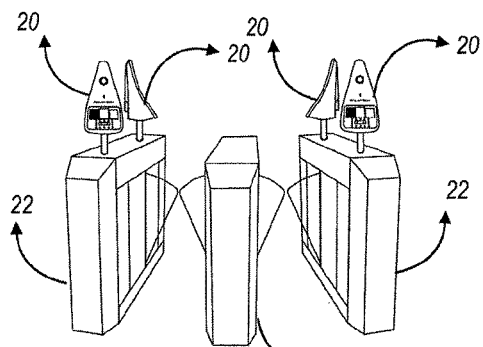
C
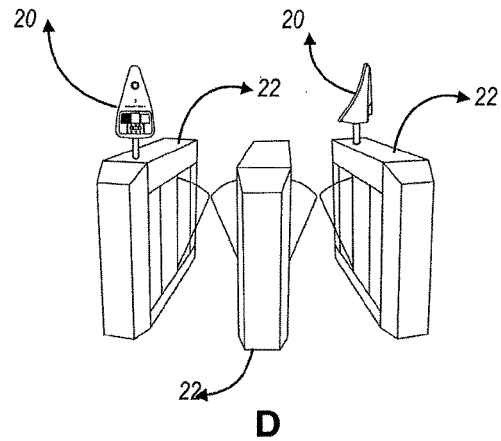
D
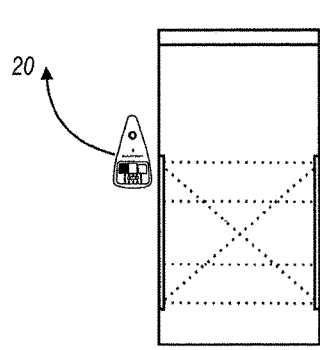
E
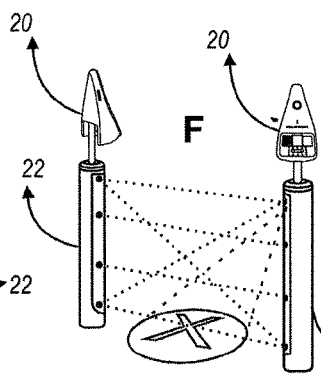
F
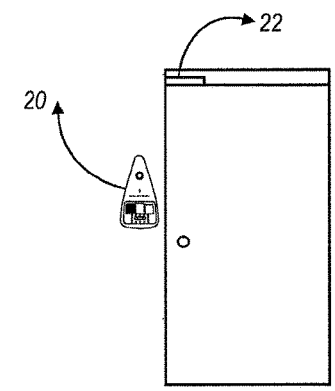
G

FIG. 5
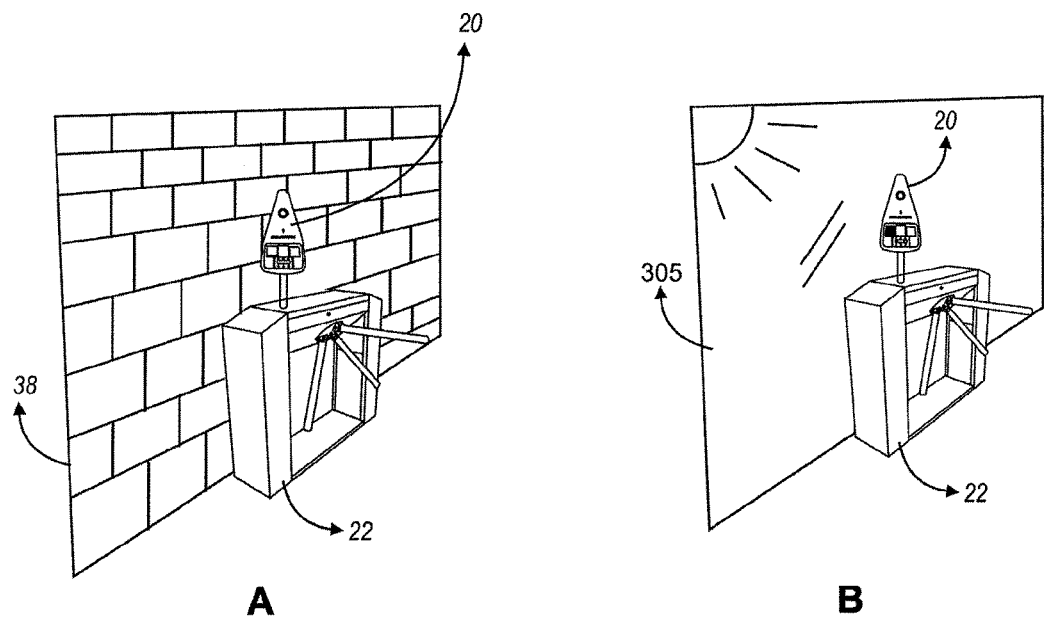
A
B
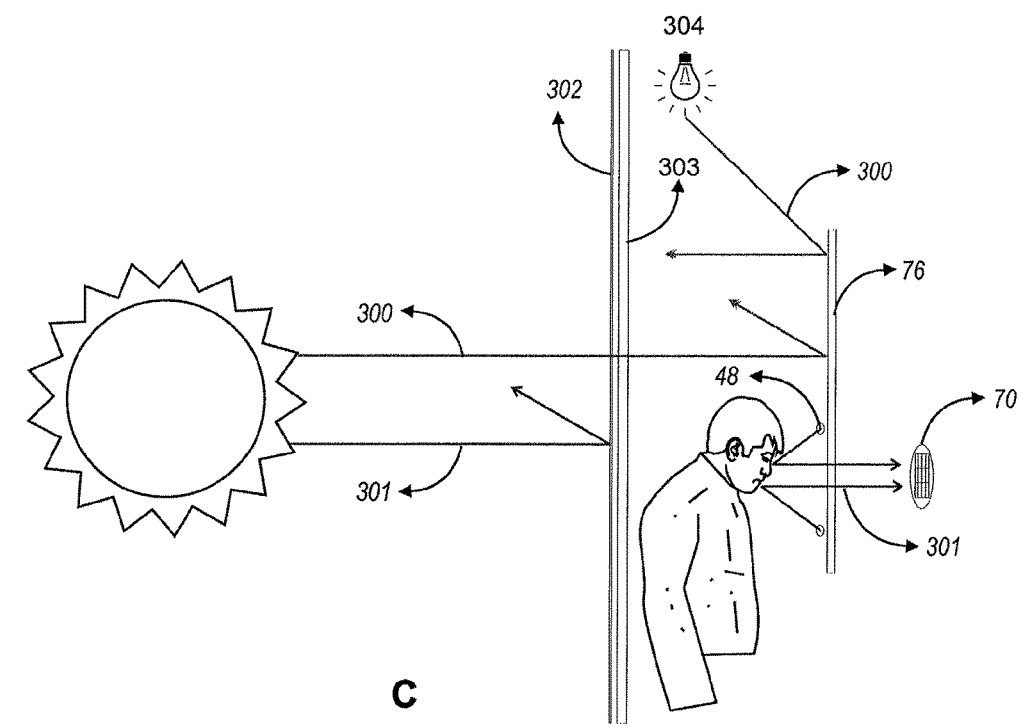
C

FIG.16a
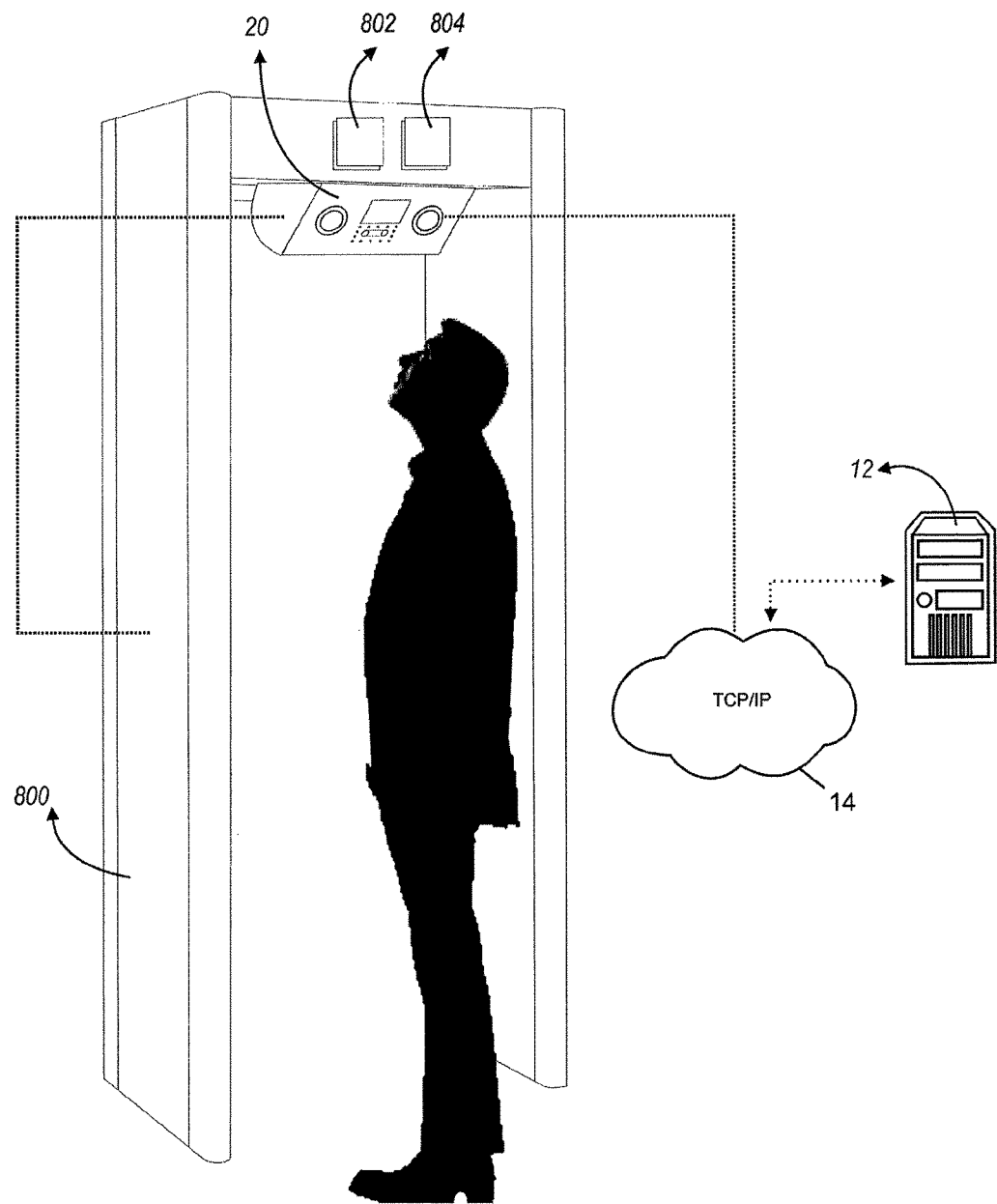

FIG.16b
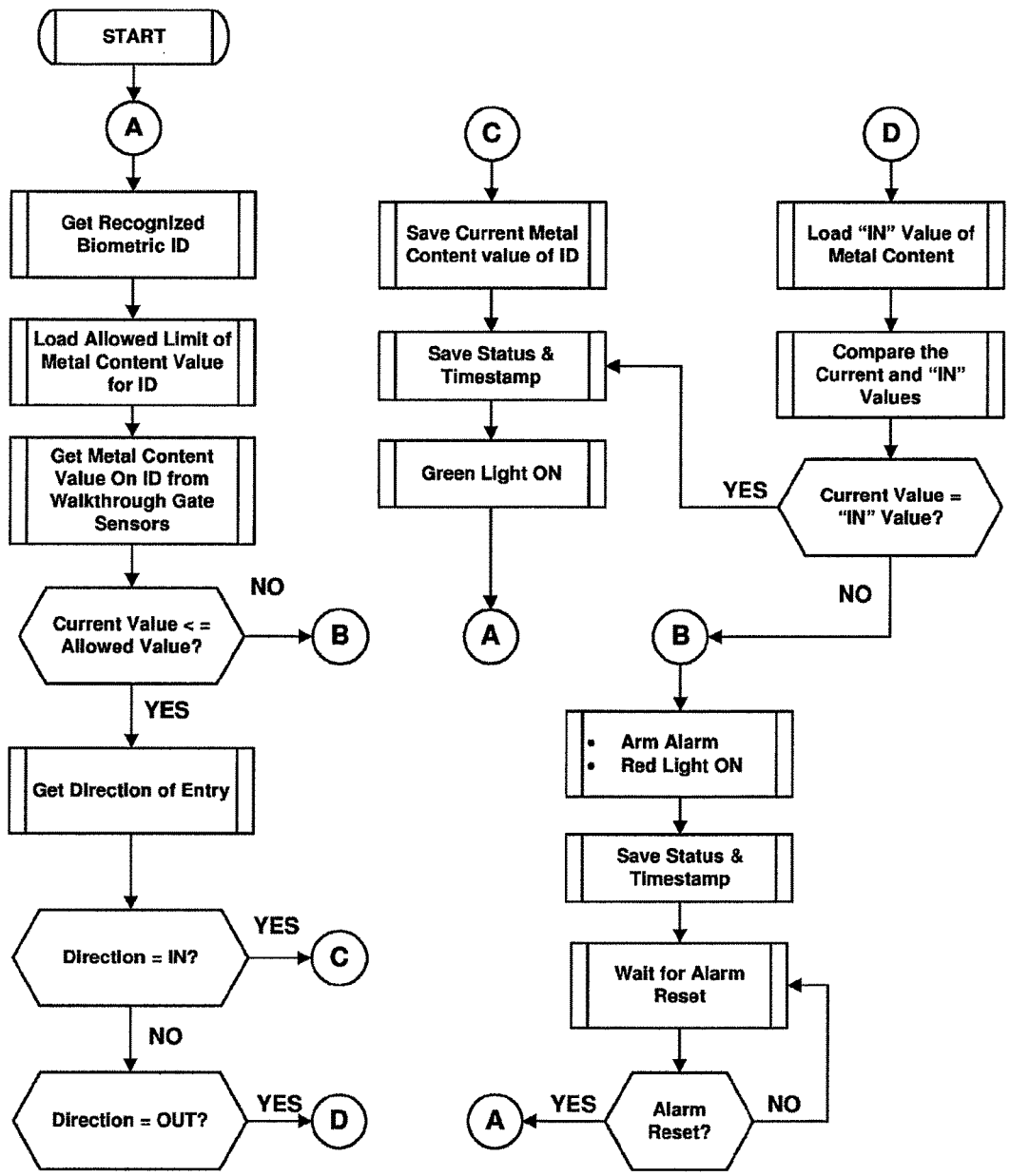

APPARATUS, METHODS AND SYSTEMS FOR INTEGRATED WORKFORCE MANAGEMENT AND ACCESS CONTROL

CROSS-REFERENCE TO RELATED APPLICATIONS

This is a continuation of U.S. patent application Ser. No. 14/553,310, filed on Nov. 25, 2014, which is a continuation of U.S. patent application Ser. No. 14/209,894, filed on Mar. 13, 2014, which claims priority to U.S. Patent Application No. 61/780,831, filed on Mar. 13, 2013, the entire contents of all of which are fully incorporated herein by reference.

FIELD

Embodiments of the present invention relate to the field of workforce management and, more specifically, to the field of worker recognition, time and attendance capturing, access control, multi-location tracking, workforce billing and payroll distribution.

BACKGROUND

Workforce management systems strive to integrate employee time and attendance capturing, human resource management, access control and payroll in one solution. Integrating some of these functionalities can be tedious and costly. Furthermore, integrating workforce management products from different suppliers create challenges that often do not result in a satisfactory solution and leave most of the workforce management requirements unaddressed.

SUMMARY

Accordingly, embodiments of the invention provide a combination of hardware and software tools and processes which interact with a user to solve workforce management challenges for workforces as small as five workers or as large as tens of hundreds or thousands of workers working from different locations in different time zones, in fixed or rotating shifts, and during regular time or overtime. The workers may move from one company location to another or even work from client locations and belong to all courses of different verticals, professions, ranks and positions. Workers may be illiterate, digitally challenged or highly qualified, may speak or read different languages, or may have a physical or biometric disability.

Embodiments of the invention may be modular and seamlessly integrated into human resource, payroll, customer relationship, enterprise resource planning, banking, supply chain, warehouse, asset, infrastructure, training, access control, production, administration and security management systems that overlap various components of workforce management.

One embodiment of the invention provides a method of performing workforce management. The method is performed by a biometric scanning device and includes receiving, a plurality of biometric templates, wherein each of the plurality of biometric templates is associated with an individual and storing the plurality of biometric templates to an internal memory. The method also includes switching to a detection mode, capturing an image of a subject, processing the image to identify a face, and processing the image to identify an eye included in the identified face. In addition, the method includes comparing the identified face to at least one of the plurality of biometric templates stored on the internal memory to identify a first match, comparing the identified eye to at least one of the plurality of biometric templates stored on the internal memory to identify a second match, comparing the first match and the second match to determine an identify of the subject, and when an identity of the subject is determined, outputting information.

Another embodiment of the invention provides a system for performing workforce management. The system includes a biometric scanning device including a camera and memory and a server. The server stores a plurality of biometric templates and is configured to transmit the plurality of biometric templates to the biometric scanning device. Each of the biometric templates is associated with a different individual. The biometric scanning device is configured to receive the plurality of biometric templates from the server and store the plurality of biometric templates to an internal memory. The biometric scanning device is also configured to switch to a detection mode, capture an image of a subject using the camera, process the image to identify a face, and process the image to identify an eye included in the identified face. In addition, the biometric scanning device is configured to compare the identified face to at least one of the plurality of biometric templates stored on the internal memory to identify a first match, compare the identified eye to at least one of the plurality of biometric templates stored on the internal memory to identify a second match, compare the first match and the second match to determine an identify of the subject, and when an identity of the subject is determined, output information.

Yet another embodiment of the invention provides a system for performing workforce management. The system includes a left eye, right eye, and 3D face based multi-biometric scanning device and a server. The server stores a plurality of biometric templates and is configured to transmit the plurality of biometric templates to the biometric scanning device. Each of the biometric templates is associated with an individual. The biometric scanning device is configured to identify an individual based on the plurality of biometric templates and integrate with at least one of the following components: a radio frequency identification reader, a computing device providing a policy override function, a computing device displaying a survey, a payroll system, a cash dispensing machine, a vending machine, a metal detector, a mobile telephone transmitting a remote access instruction, a mobile telephone performing video conferencing, a palm vein reader, one or more proximity sensors for detecting individuals entering or leaving the area, and a pair of augmented-reality glasses.

Additional embodiments of the invention can provide an eyes and three-dimensional ("3D") face biometric scanner based access control system that shares the "IN" or "OUT" access status of each user with all biometric scanning devices on the same network, an eyes and 3D face biometric scanner based access control system that does not allow the same user to have multiple "IN" or multiple "OUT" access statuses in a row to prevent tailgating event, an eyes and 3D face biometric scanner based access control system that prevents tailgating events, a building structure with open passage that prevents sun light from reaching the biometric scanner to control the lighting conditions, an eyes and 3D face biometric system that is designed on a TI DaVincci and/or a Intel NUC platform, an eyes and 3D face biometric device, which shifts to a "Face Only" mode when eyes are not accepted, an biometric device in which templates can be divided among different scanning groups, an eyes and 3D face biometric device, that integrates with a palm/vein biometric plug-in, an eyes and 3D face biometric device that divides, stores, and searches the templates based on gender, a biometric device that pushes collected data to a server wherein the server is also configured to pull data from the device in combined, and combinations thereof.

Other aspects of the invention will become apparent by consideration of the detailed description and accompanying drawings.

BRIEF DESCRIPTION OF THE DRAWINGS

FIG. 1b illustrates access control points used in a workforce management system.

FIG. 5 schematically illustrates performing face recognition under sunlight.

FIG. 16a illustrates a metal detector combined with a biometric scanning device.

FIG. 16b is a flowchart illustrating a method of using a metal detector with a biometric scanning device.

DETAILED DESCRIPTION

Figure 1A:
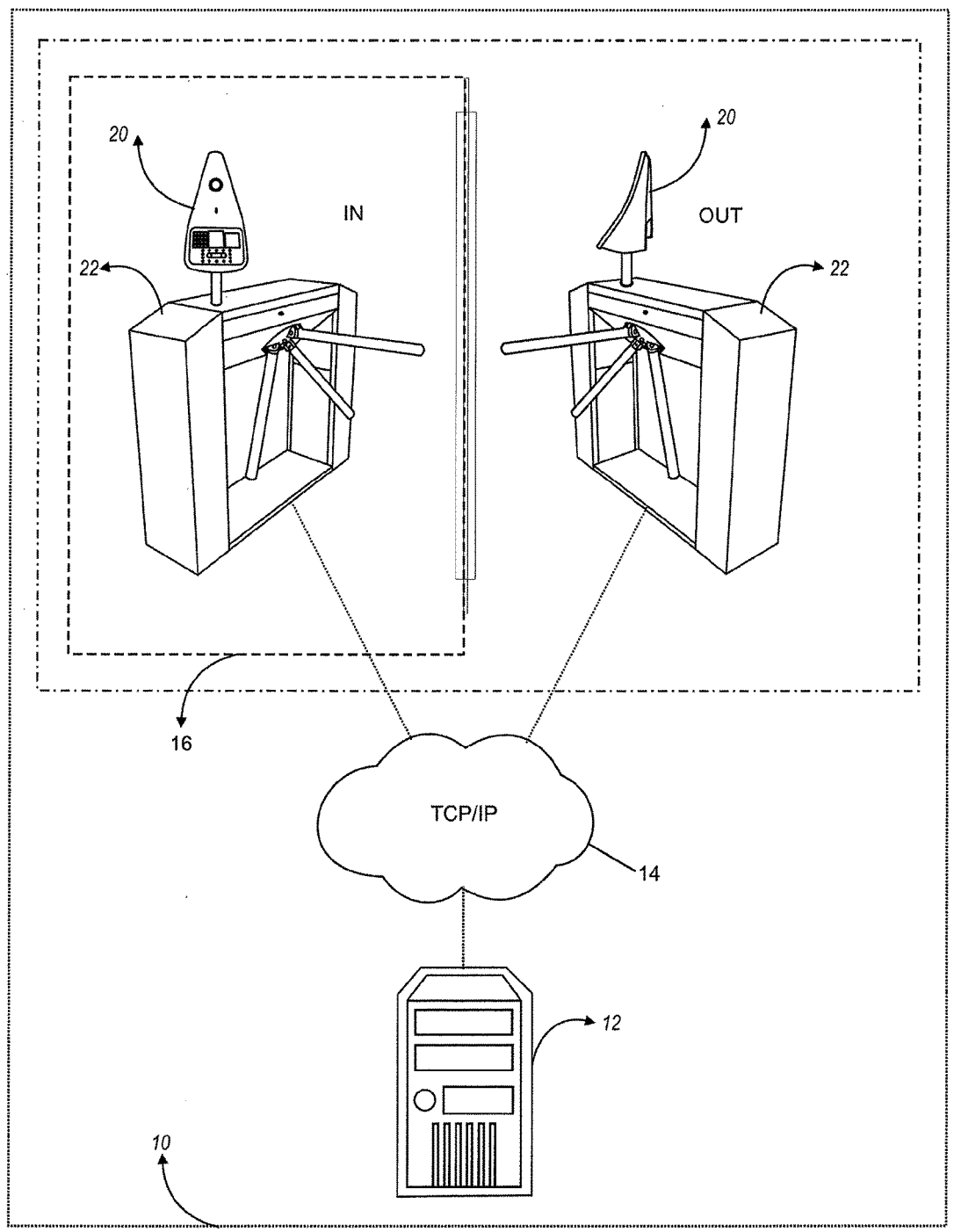
FIG. 1a schematically illustrates a workforce management system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

As noted above, embodiments of the present invention provide computer-implemented methods and systems for managing a workforce effectively. Embodiments may be configured separately or in a combination to reduce operational costs, manage access control, enforce organizational policies and increase efficiency of the workforce at a single or multiple locations while minimizing the elements of fraud and inaccuracy. Embodiments may also integrate with existing and allied systems, such as human resource ("HR"), payroll, customer relationship, enterprise resource planning, banking, supply chain, warehouse, asset, infrastructure, training, access control, production, administration and security management systems that overlap various components of workforce management.

FIG. 1a illustrates a workforce management system 10 providing integrated access control. The system 10 includes a server 12 that hosts server software and related tools connected over a connection 14, such as a TCP/IP connection, to one or more access control points 16. An access control point 16 can be installed at a worker entrance of a building. For example, in one embodiment, one access control point 16 can be used for inward pedestrian worker traffic and another access control point 16 can be used for outward pedestrian worker traffic. Each access control point 16 includes a biometric scanning device 20 (hereinafter referred to as the "device 20") and an electromagnetic/electric barrier or gate 22 (hereinafter referred to as the "turnstile 22"). As described in more detail below, each access control point 16 (e.g., the device 20) is configured to collect information about workers (e.g., time and attendance data) and control access to a particular premises according to administrative, HR, fire and security, payroll, or other policies set by management. As described in more detail below, the biometric scanning device 20 can be configured to scan one or more portions of a subject (e.g., using one or more biometric scanners). For example, the device 20 can include a left eye (iris and/or retina), right eye (iris and/or retina), and three-dimensional ("3D") face based multi-biometric scanning device. Different combinations and/or other portions of a subject can also be scanned with the device 20 (e.g., finger prints, veins, etc.).

FIG. 1b illustrates different types of access control points 16 with different combinations of devices 20 and turnstiles 22. For example, a tripod turnstile 22 can be used with one device 20 for both inward and outward traffic. A tripod turnstile 22 can also be used with a separate device 20 for inward and outward traffic (see FIG. 1b(A)). As illustrated in FIG. 1b(B), a full height turnstile 22 can also be used with one or more devices 20 (see FIG. 1b(B)). In other embodiments, a butterfly-wing-gate turnstile 22 can also be used with two passages and four devices 20 (see FIG. 1b(C)) or with two passages and two devices 20 (see FIG. 1b(D)). As illustrated in FIGS. 1b(E) and 1b(F), an infrared-door-type turnstile 22 or infrared-pillar-type turnstile 22 can be used with one or more devices 20. Also, an access-control-door-lock turnstile 22 can be used with one or more devices 20 (see FIG. 1b(G)).

Figure 1C:
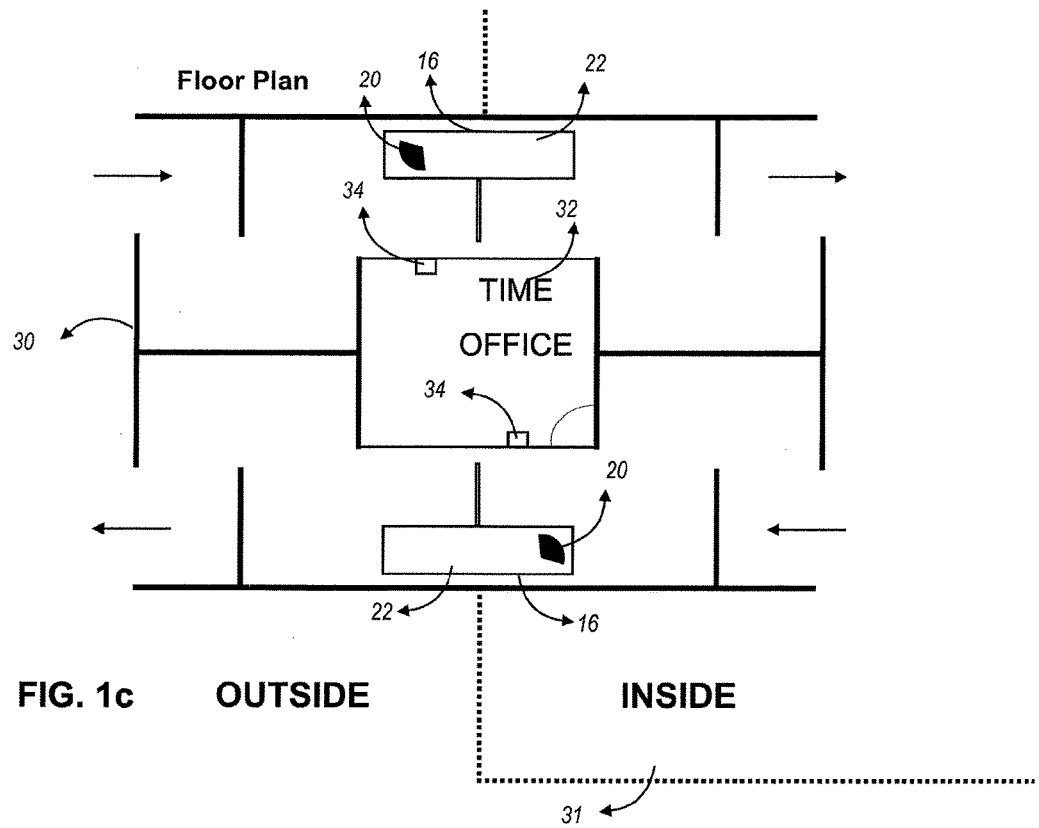
FIG. 1c illustrates traffic flow and setup of a workforce management system.

FIG. 1c schematically illustrates an access room 30 used as a passage for inward and outward pedestrian traffic located at an entrance to an area 31. The room 30 can be divided in three sections. One section is assigned for inward traffic, one section is assigned for outward traffic, and one section is assigned for an office 32. Two or more access control points 16 are installed in the room 30 (e.g., one or more in each passage). For inward traffic, a device 20 can be installed on the left side of a turnstile 22, and, for outward traffic, a device 20 can be installed on the right side of a turnstile 22.

In some embodiments, the walls of the room 30 are constructed with opaque material, and at least a portion of the walls of the office 32 (e.g., the walls facing the access control points 16) are transparent or include transparent windows. The office 32 provides space for one or more officers to service queries of workers, such as through a window 34, installed on each side of the office 32 (e.g., to cater to both inward and outward traffic). A door of the office 32 can be installed on the passage side of the outward traffic.

The room 30 can include four doors. The four doors can be kept open for easy flow of pedestrian traffic in scheduled traffic times. Other doors and passages to the area 31 can be locked and not used except for emergencies. In some embodiments, personal areas, such as a cafeteria, washrooms, a locker room, a smoking area, and prayer rooms, are kept outside the area 31.

The access control points 16 in the room 30 integrate the functions of access control and workforce management. In particular, the points 16 automatically capture time, attendance, and access data, which eliminates the need for a worker to physically clock-in and clock-out, which a worker can otherwise forget to do or can do improperly. In particular, every clock-in and clock-out is captured separately by the access control points 16, which eliminates human error associated with this process, such as buddy-punching fraud (i.e., when your "buddy" fraudulently clocks you "IN" or "OUT"). The arrangement of the points 16 in the room 30 also implements queue management, provides visibility and control to officers on duty, caters to workers' access-related requests, and offers better ventilation for temperature settings associated with the system 10.

Figure 1D:
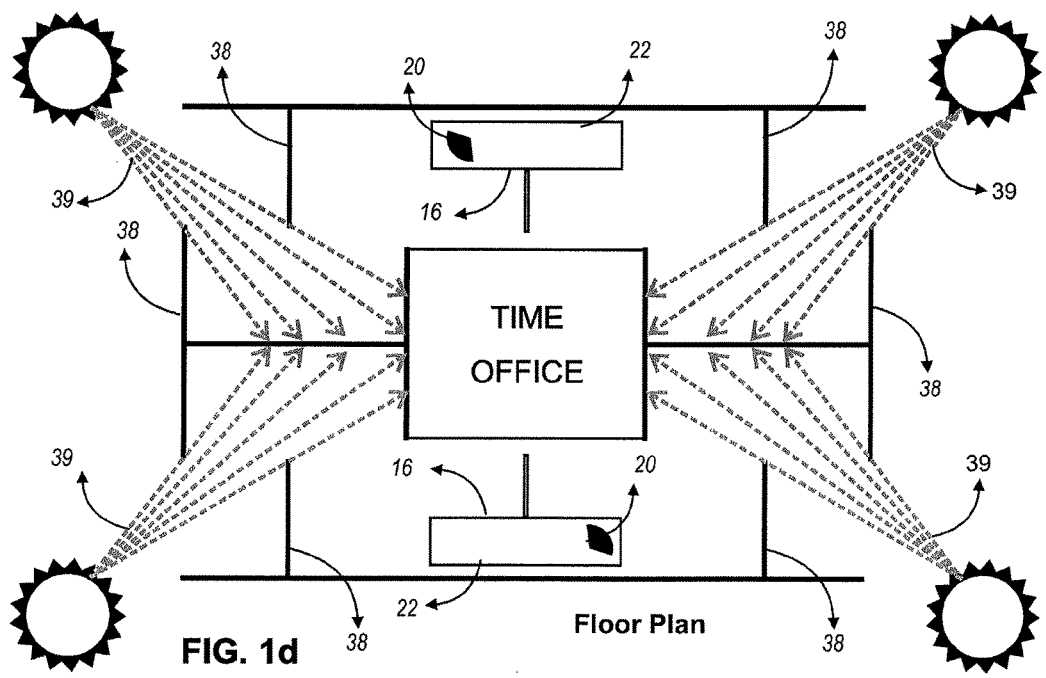
FIG. 1d illustrates a controlled lighting environment design for face, retina, and/or iris scanning.

FIG. 1d illustrates lighting conditions for the room 30. As illustrated in FIG. 1d, opaque walls 38 in the room 30 serve as light barriers even as the sun changes positions to prevent sunlight 39 from reaching the areas where the devices 20 are installed. Therefore, the floor plan of the room 30 and the position of the opaque walls 38 efficiently control lighting conditions for the devices 20, which is an important factor for proper functioning of the devices 20 (e.g., when performing face, iris, or retina scanning).

Figure 2:
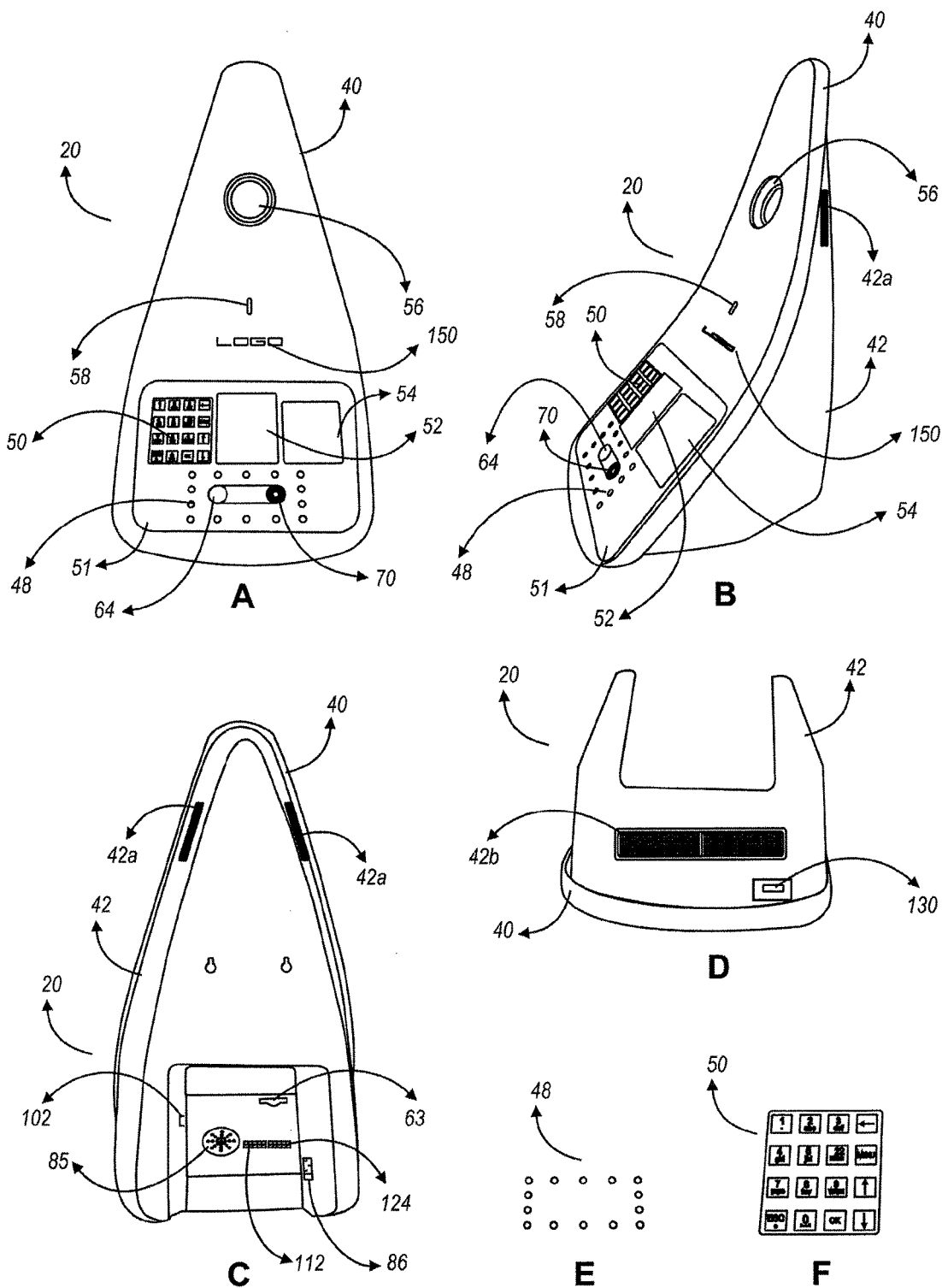
FIG. 2 illustrates a biometric scanning device.
Figure 3:
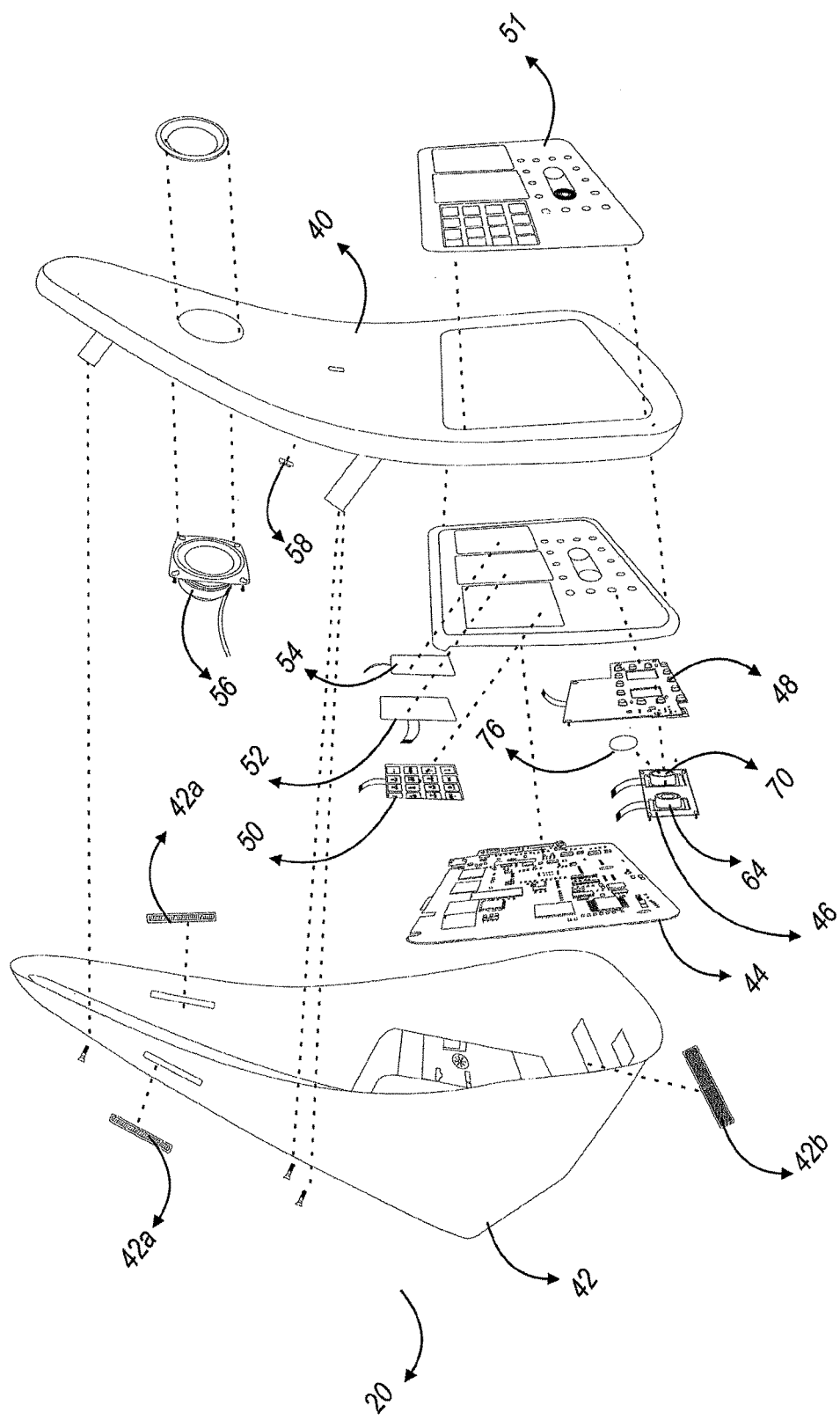
FIG. 3 is an exploded view of the device of FIG. 2.

The device 20 is configured to recognize workers through their eyes and face (e.g., 3D facial recognition) to clock-in to and clock-out of their place of employment as part of a time and attendance component of the system 10. Therefore, workers use the devices 20 to mark their attendance and gain access to various areas. As illustrated in FIGS. 2-3, the device 20 includes a housing front 40 and a housing back 42, a digital signal processing ("DSP") board 44, a camera board 46, a scanner infrared illuminator board 48, a keypad 50 (forming part of a user interface 51 of the device 20), a liquid crystal display ("LCD") screen 52, a radio frequency identification ("RFID") antenna 54, a speaker 56, and a power light emitting diode ("LED") 58. The housing back 42 is supported by right and left exhaust window covers 42a and a bottom exhaust window 42b.

Figure 4:
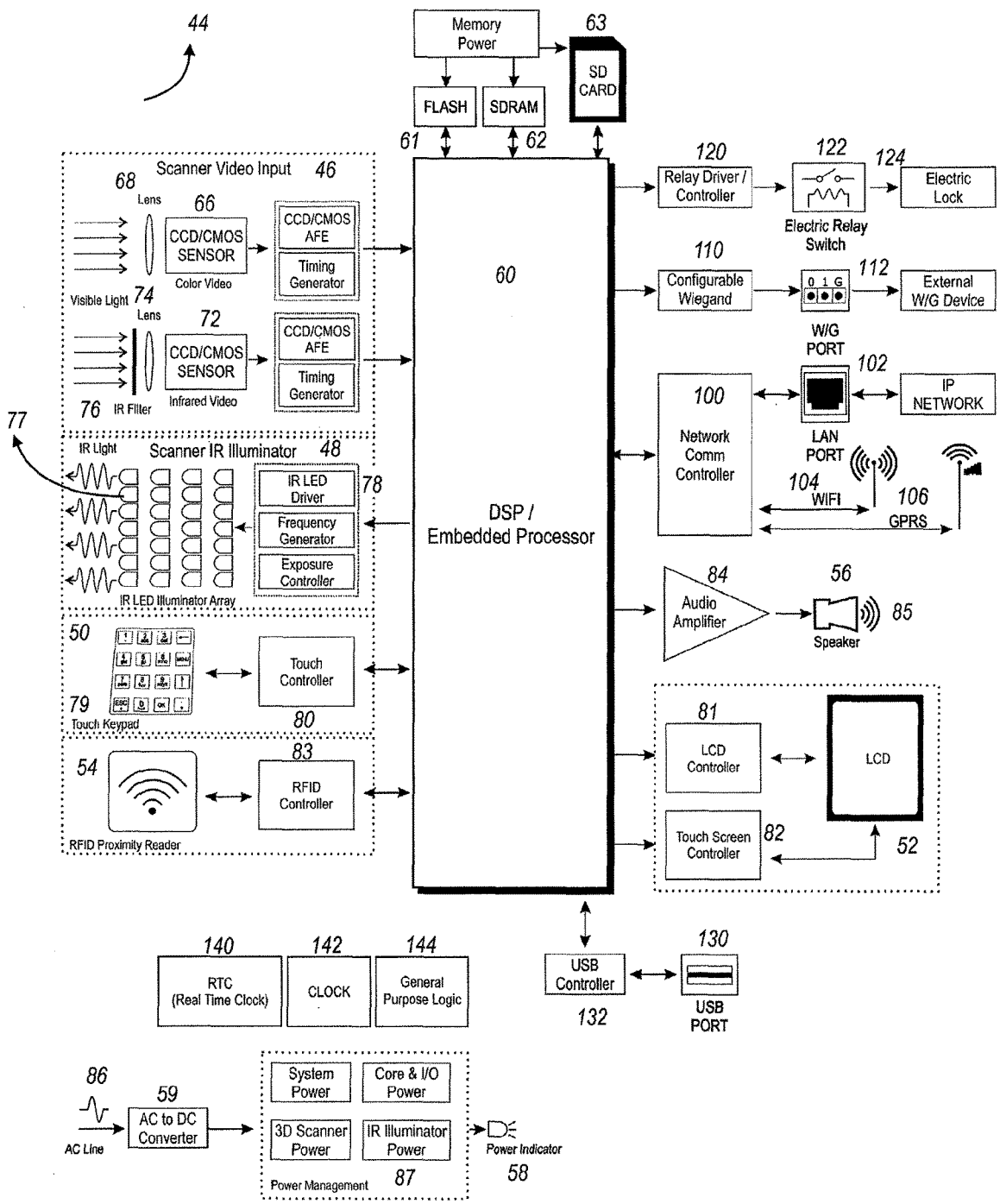
FIG. 4 schematically illustrates the device of FIG. 2.

FIG. 4 schematically illustrates components of the device 20. As illustrated in FIG. 4, and as previously illustrated in FIGS. 2-3, the device 20 includes the DSP board 44, the camera board 46, the scanner infrared illuminator board 48, the keypad 50, the LCD screen 52, the RFID antenna 54, the speaker 56, and a power LED 58 with a AC/DC converter 59.

The DSP board 44 contains a plurality of devices connected to an embedded processor 60. The processor 60 performs the processing, communicating, and controlling of the components connected to the board 44 and/or included in the device 20. In some embodiments, the processor 60 includes a digital signal processor and/or an ARM-based or x822-based microprocessor. In some embodiments, the processor 60 can also be a variant of a DSP. For example, the processor 60 can include a DSP, such as the TMS320DM642 or TMS320DM6446 or any single of dual core ARM-based or x86-based processor and DSP combination, manufactured by Texas Instruments, ARM licensed manufacturers, and Intel Inc.

The device 20 includes one or more input, output, and auxiliary devices that connect to the processor 60. For example, the processor 60 can interface with an internal flash read-only memory ("ROM") 61, secure digital ("SD") random-access memory ("RAM") 62, and an external SD card 63. Flash ROM 61 can contain firmware or operating system code and can contain face templates for secure non-volatile storage. SDRAM 62 can be used for processing and general-purpose volatile storage of data. SD card 63 is a detachable storage medium that can be used to store records (e.g., evidence pictures) and data processing.

The camera board 46 is one input device for the processor 60. The camera board 46 includes a visible light color CCD/CMOS camera 64 (see FIG. 3) that contains a CCD/CMOS sensor 66, a focus lens 68, and imaging stabilization and preprocessing logic. The camera board 46 also contains an infrared CCD/CMOS camera 70 (see FIG. 3) that contains a CCD/CMOS sensor 72, a focus lens 74, a visible-light-block/infrared-pass filter 76, and imaging stabilizing and preprocessing logic. Both cameras 64 and 70 are adjusted at an angle suitable for 3D imaging.

Scanner infrared illuminator board 48 is an auxiliary device connected to the processor 60 and is part of a biometric facial recognition system. The board 48 is used to properly illuminate the face of a subject with infrared light. In some embodiments, the scanner infrared illuminator board 48 consists of an array of infrared LEDs 77 powered by intelligent infrared controller and driver circuitry 78.

The keypad 50 is an input device connected to the processor 60 and provides part of the user interface 51 of the device 20. The keypad 50 includes a capacitive touch pad 79 and is processed by a touch controller 80. The touch controller 80 translates touch events to the keypad key codes for further processing by the processor 60.

The LCD screen 52 is an output device connected to the processor 60 and used to provide a graphical user interface ("GUI"). The LCD screen 52 is controlled by an LCD controller 81. In some embodiments, the LCD screen 52 is also an input device and includes a touchscreen controlled by a touchscreen controller 82. The touchscreen controller 82 (when used) is also connected to the processor 60. The touchscreen controller 82 translates user interaction with the GUI on the LCD screen 52 for processing by the processor 60.

The RFID antenna 54 is controlled by an RFID controller (e.g., EM/DESFIRE/MIFARE/HID compatible) 83. The RFID antenna 54 and the RFID controller 83 form a RFID proximity reader, which is an input device for the processor 60. The RFID controller 83 energizes a RFID tag (e.g., carried by a worker) with the RFID antenna 54 when the tag is presented near the RFID antenna 54, receives an emitted signal from RFID tag with the RFID antenna 54, and decodes the emitted signal to a RFID code that is provided to the processor 60. It should be understood that in some embodiments, the RFID antenna 54 and/or the RFID controller 83 can be positioned outside of the housing 40 and 42 of the device 20 but can be electrically connected with the device 20 to exchange data (e.g., see FIGS. 11a, b, and c).

To enhance the user experience on the device 20, different audio messages can be output by the processor 60 for different events at the device 20. Audio output is amplified by an amplifier 84 and fed to the speaker 56. In some embodiments, the device 20 includes multiple speakers. For example, as illustrated in FIG. 2, the device 20 can include a speaker 85 on the housing back 42. Volume control can be provided by GUI settings that adjust the amplification of the amplifier 84 programmatically.

AC Line connecter 86 provides the 100-240 Volts AC ("Alternating Current") to the AC/DC Converter 59, which converts the high AC voltages to the low DC ("Direct Current") voltage. To provide power to the peripherals and devices included in the device 20, the device 20 includes a power management controller 87 that intelligently manages the power of the peripherals and devices, such as a scanner, the IR illuminator, and memory. The power indicator LED 58 displays the status of the power.

As illustrated in FIG. 4, the device 20 also includes a network communication controller 100 that provides network connectivity on one or multiple interfaces. For example, the device 20 can include a local area network ("LAN") port 102 that provides wired network connectivity, a WIFI radio 104 that provides wireless network connectivity, and/or a general packet radio service ("GPRS") interface that provides wireless network connectivity over cellular global system for mobile communications ("GSM") with GSM/GPRS radio 106. The GSM/GPRS radio 106 can provide long distance connectivity on the TCP/IP protocol. It should be understood that the network communication controller 100 is not limited to the stated interfaces and can include interfaces to additional or different networks or communication systems.

To meet industry standards for access control, device 20 provides a mono or bidirectional, configurable Wiegand interface controller 110 connected with a W/G port 112 to connect to external access controllers. Configurable Wiegand controller 110 can be configured to the desired Wiegand protocol for external access controllers programmatically or from the GUI interface of the device 20.

The device 20 also includes a relay driver and controller 120 that controls an electric relay switch 122, which controls an external electric lock 124 via a relay port. Action of the electric relay switch 122 is controlled programmatically by the processor 60.

In some embodiments, a universal serial bus ("USB") flash disk can be connected to the device 20 through a USB port 130. The port 130 is connected to a USB controller 132, which is connected to the processor 60. USB port 130 can be used to download and upload different kind of data to and from the device 20.

A real-time clock ("RTC") 140 can be connected to the processor 60 to keep accurate time and date information for processing the date and/or time of particular events. In some embodiments, the RTC 140 includes a battery backup so it maintains accurate time even when the device 20 is powered off. Another clock 142 provides a heartbeat to processor 60. General purpose logic 144 provides connectivity between the device 20 and all other connected devices and interfaces. As illustrated in FIG. 2, the device 20 can include a logo or other brand information 150 (e.g., on the housing front 40).

The device 20 is an embedded device and it is designed to perform biometric identification, such as 3D face recognition, by taking advantage of high-speed DSP processing performed by the single or multi core processor combination included in the processor 60, which eliminates the need for expensive hardware. The processor 60 can run an operating system, such as embedded Linux or Android. The processor 60 also executes application software that employs customized and enhanced algorithms for performing biometric identification and recognition while taking advantage of the capabilities of the processor 60.

The camera board 46 provides a face scanner that provides two types of video feed: (1) a color feed from the color camera 64 and (2) an infrared feed from the infrared camera 70. Both feeds are provided to the processor 60. As noted above, the scanner IR illuminator board 48 provides optimal infrared illumination to sample the infrared video from the infrared camera 70 of a subject. In some embodiments, due to the stereoscopic nature and the angle between the two cameras 64 and 70, the application firmware can perform 3D reconstruction of the face of a subject. In some embodiments, the application software executed by the device 20 can provide 1:1 ("one-to-one") biometric recognition (e.g., one identified identity of a subject).

The device 20 stores biometric templates (described below) in a secure non-volatile storage, such as the flash ROM 61, and uses the volatile SDRAM 62 to perform software processing. The SD card 63 can be used for the external storage of the captured frontal pictures of subjects, clock-in and clock-out data, attendance logs, and biometric operation logs. The USB controller 132 and the USB port 130 provide data transfer capability from memories 61, 62, or 63 to other storage mediums located external to the device 20, such as a USB flash drive.

FIGS. 5*a*, *b*, and *c* illustrate using the device 20 in sunlight. As discussed above with respect to FIG. 1*d*, improper lighting conditions can cause the device 20 to malfunction. In particular, face, iris, and retina recognition techniques do not work properly when performed under partial or complete direct sunlight. Accordingly, as described above, opaque walls 38 without windows or portals can be used to block sunlight to area where the device 20 are installed. In some embodiments, rather than using the opaque walls 38, filters can be used to prevent unwanted light from reaching the device 20. For example, as illustrated in FIG. 5*c*, direct sunlight has two kinds of light: (1) visible light 300 and infrared light 301, which directly affects the operation of a device 20. Accordingly, an infrared block/visible-light pass film/coating 302 can be overlaid on a transparent window or partition 303 positioned next to a sunlit environment. The film/coating 302 blocks the infrared light 301, but lets the visible light 300 pass through the window or partition 303. Thus, the room containing the device 20 can be lit with visible light 300 but the infrared light is blocked out of the room 30. Accordingly, the room containing the device can function as an indoor environment for the device 20 while being fully lit with outdoor sunlight through any number of walls or a ceiling made of transparent glass overlaid with the film 302.

Furthermore, as noted above, the filter 76 is overlaid on the infrared camera 70, which lets infrared light 301 pass but blocks visible light 300 from reaching the infrared camera 70. Therefore, visible light 300 from sunlight or other sources, like a light bulb 304, is blocked by the filter 76. As also noted above, the device 20 uses the infrared illuminator board 48 to illuminate the subject's face and eyes with infrared light 301. This helps the infrared camera 70 obtain quality infrared imaging needed for performing facial, iris, and retinal recognition in singular form or in a combination.

Using the above setup (i.e., the film 302, filter 76, and illuminator board 48), allows for facial, iris, and retinal recognition even in sunlight, which reduces setup infrastructure costs and helps increase security. Accordingly, an access control point 16 can be located in an environment as illustrated in FIG. 5*b* (i.e., with a transparent wall or window 305) rather than being restricted to an environment as illustrated in FIG. 5*a* (i.e., with an opaque wall 38).

Figure 6:
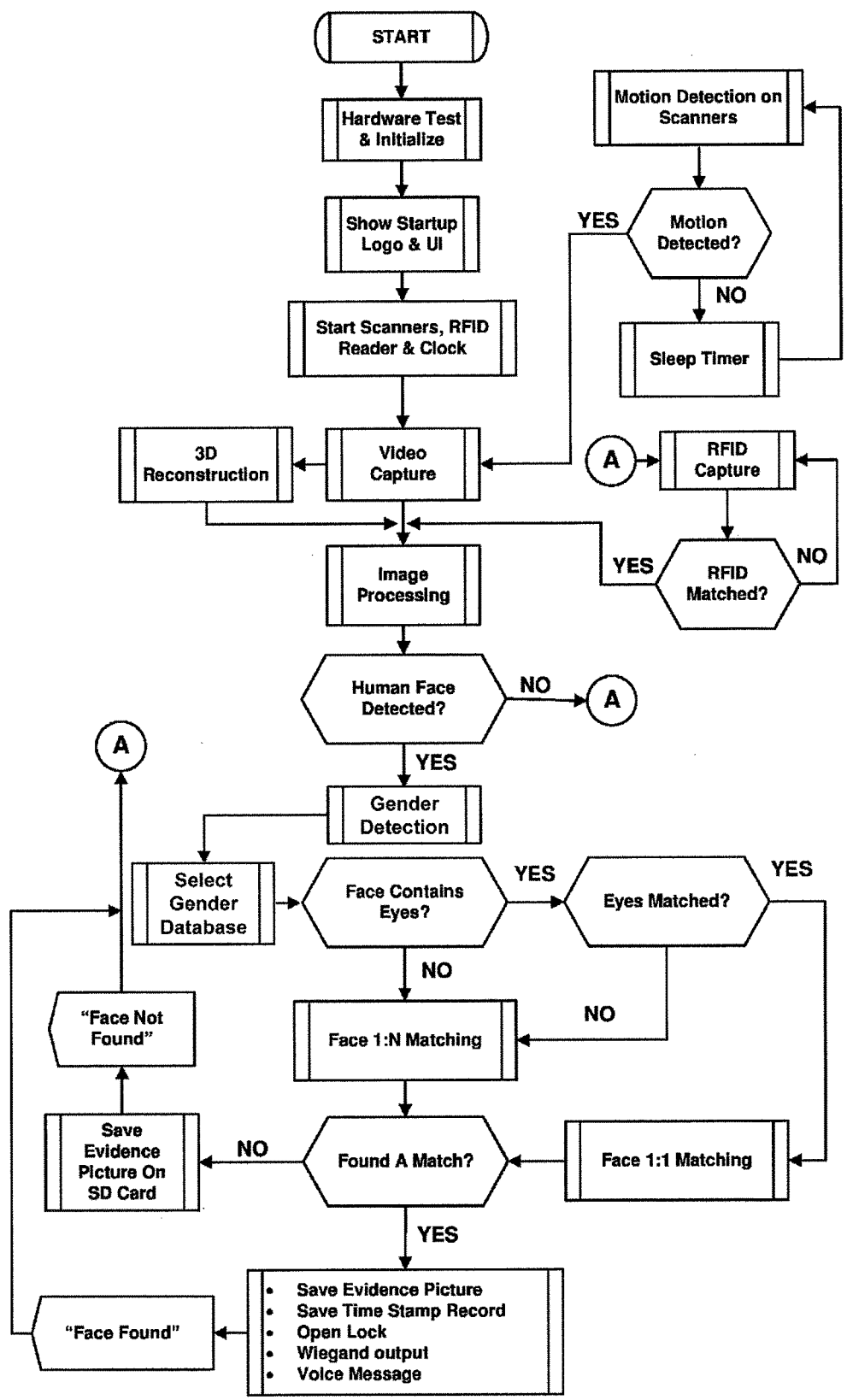
FIGS. 6 and 7 are flowcharts illustrating a process for performing worker recognition.
Figure 7:
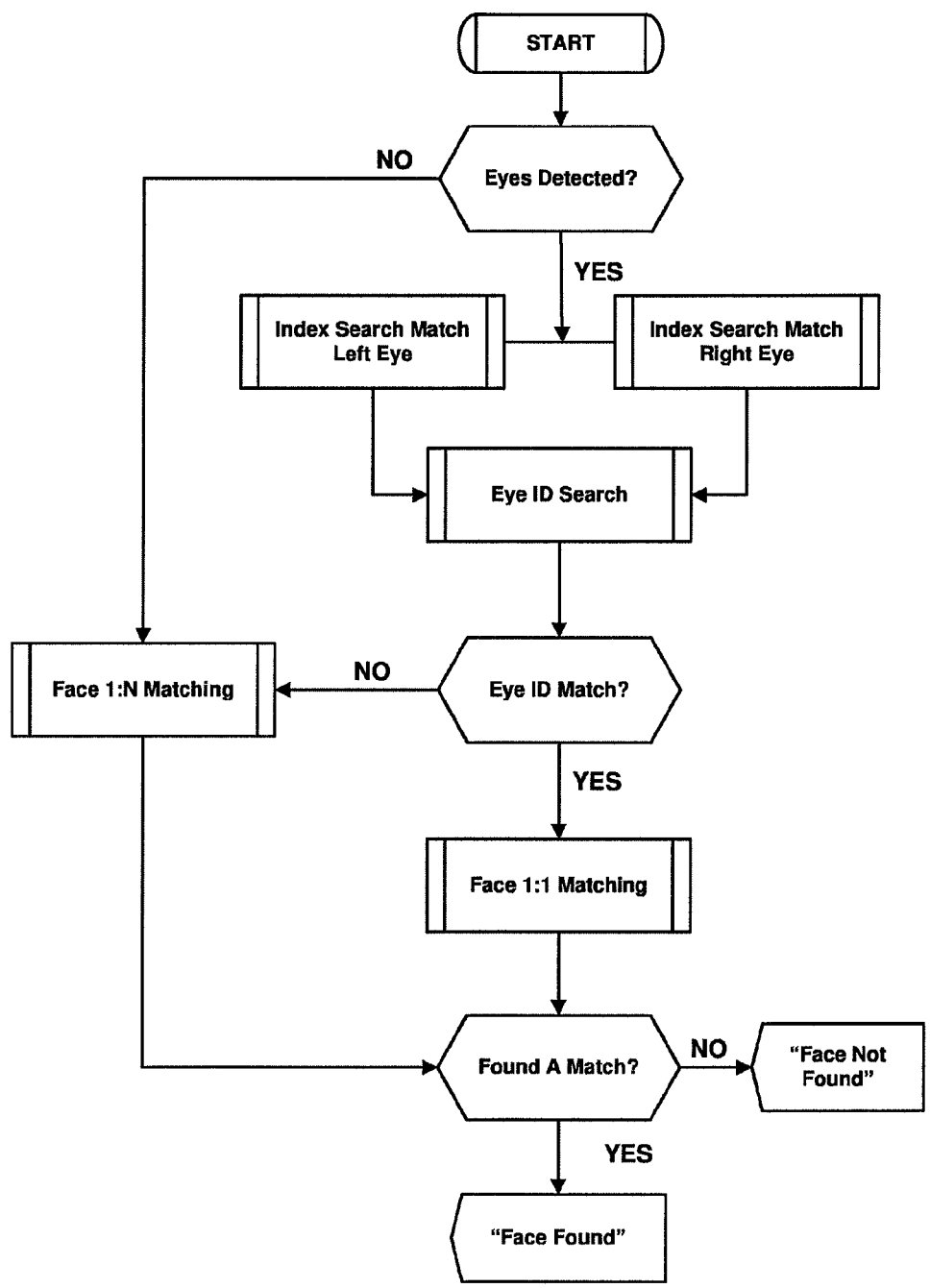

FIGS. 6 and 7 are flowcharts illustrating an eyes-and-face recognition method performed by the device 20. In some embodiments, the device 20 is configured to shift to an idle mode after a cold boot. A detection mode, such as a face detection mode, however, can be turned on by motion detected by the camera 64 or when an RFID tag is detected through the RFID reader (i.e., the RFID controller 83 and the RFID Antenna 54). The face detection mode triggers 3D reconstruction through the stereo vision feed from both the optical camera 64 and the IR camera 70. The device 20 then performs a (1:1):1 recognition of the left eye and the right eye and the 3D face, as illustrated in FIG. 6.

In some embodiments, the biometric templates of the left eye, right eye and the 3D face of a worker are stored in separate databases of the device 20. Therefore, while matching a face, the left and right eyes can be detected, extracted, and separated. The device 20 can then run an index matching routine individually on each component (i.e., the left eye and the right eye) and compare the results to each other in the respective database to extract possible worker identity matches that are further matched with the extracted 3D face matched through the related 3D face templates (see FIG. 7). Separately processing these components increases the speed of matching through multiple sources in the same field-of-view and helps eliminate the need of a card setup used in some existing recognition systems, which are prone to card loss and theft. Also, in some embodiments, as illustrated in FIG. 6, the device 20 is configured to detect a gender of a subject based on a captured image (e.g., based on a face identified in the image). Using the detected gender, the device 20 can select a subset of the available biometric templates (e.g., a particular database) that is associated with the detected gender. Using gender-specific templates reduces the amount of processing (and associated time) needed to determine a match.

Upon finding a match to all three components, the device 20 plays a visual and/or audio message. The device 20 also generates and stores time stamp data and an evidence picture against the identified worker identity (e.g., on the SD card 63). In addition, the device 20 can trigger a lock to allow the worker to pass through the access control point 16 (if allowed for that worker under the employer's policy). The device 20 can also send a Wiegand code to Wiegand readers or the server 12 and/or push a record to another device or to the cloud, such as over TCP/IP.

Accordingly, the device 20 acts as a standalone device that saves and matches biometric templates. However, the device 20 can be configured to push data (see FIG. 10*a*) to external devices or systems, which simulates server-based recognition functionality. The device 20 is also specifically designed to address challenges of workforce management overlapping with other verticals. In particular, existing devices address security requirements (e.g., with simple clock-in and clock-out functionality) but do not help with other workforce management functions. As noted above, however, the device 20 is configured to integrate with other systems involving various components of workforce management, such as HR, payroll, customer relationship, enterprise resource planning, banking and financial transactions, supply chain, warehouse, asset, infrastructure, training, access control, production, administration, security management, voting, and ticketing.

As illustrated in FIG. 7, the device 20 can be configured to automatically shift to a 1:N ("one to many") face-only matching mode from a (1:1):1 eyes-and-face matching mode. For example, the device 20 can be configured to shift to the face-only matching mode when eye detection and/or recognition fails. In some embodiments, the face-only matching mode applies the same biometric templates associated with a worker's face as used in the eyes-and-face matching mode. However, in other embodiments, the face-only matching mode can use a separate database of templates.

If a worker has a problem enrolling with the device 20 due to any problem with one or both of his or her eyes, the worker can be enrolled with his or her eyes closed under the face-only matching mode. After enrolling with the device 20 with his or her eyes closed, the worker can be identified by the device by similarly presenting his or her face with eyes closed. For example, in some embodiments, when the device 20 detects a face without eyes, the device 20 automatically shifts into the face-only matching mode, which can match a scanned face with templates (e.g., stored in a face-only database). It is estimated that over 8% of the world population suffers from various types of eye diseases that makes it difficult for them to be enrolled onto an iris-based or retina-based biometric device. However, the process defined above for the device 20 can be used to both enroll and later identify the worker without requiring exception handling or reprogramming. In particular, the ability of the device 20 to automatically shift from capturing one biometric feature to another increases the efficiency and reliability for worker recognition and workforce management.

Figure 8:
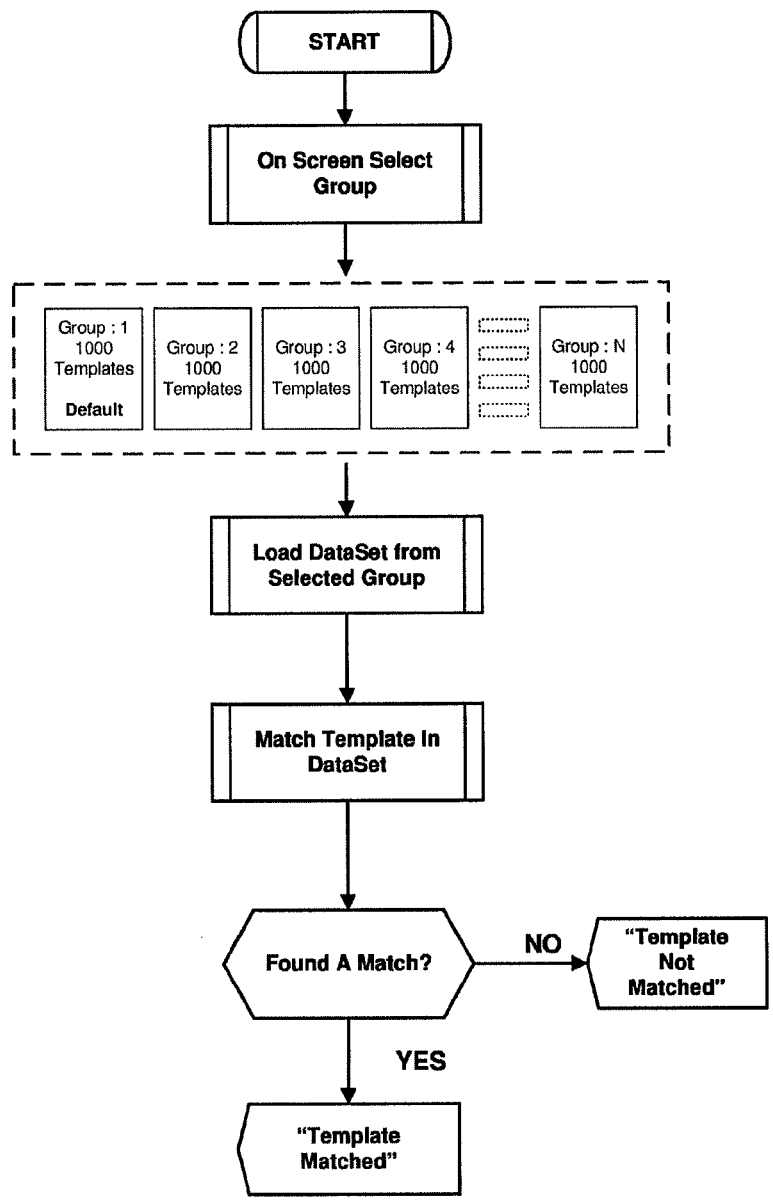
FIG. 8 is a flowchart illustrating a process for extending template groups used by the device of FIG. 2.

FIG. 8 is a flowchart that illustrates template capacity of the device 20. In an unlimited-capacity mode, biometric templates are separated and grouped into multiple databases, and the limit of the template groups is only limited based on the available data storage on the device 20 (e.g., size of the SD card 63). In some embodiments, each template group includes approximately 1,000 biometric templates. When template groups are used, the device 20 can be configured to prompt a worker to select his or her template group (e.g., on the LCD screen 52). Upon receiving a selection of a template group, the worker's biometric features are matched only in the selected template group database. Accordingly, creating groups of templates helps increase the limit of template capacity of the device 20 while keeping the matching speed efficient by limiting the number of templates the device 20 has to process to perform a match.

Figure 9A:
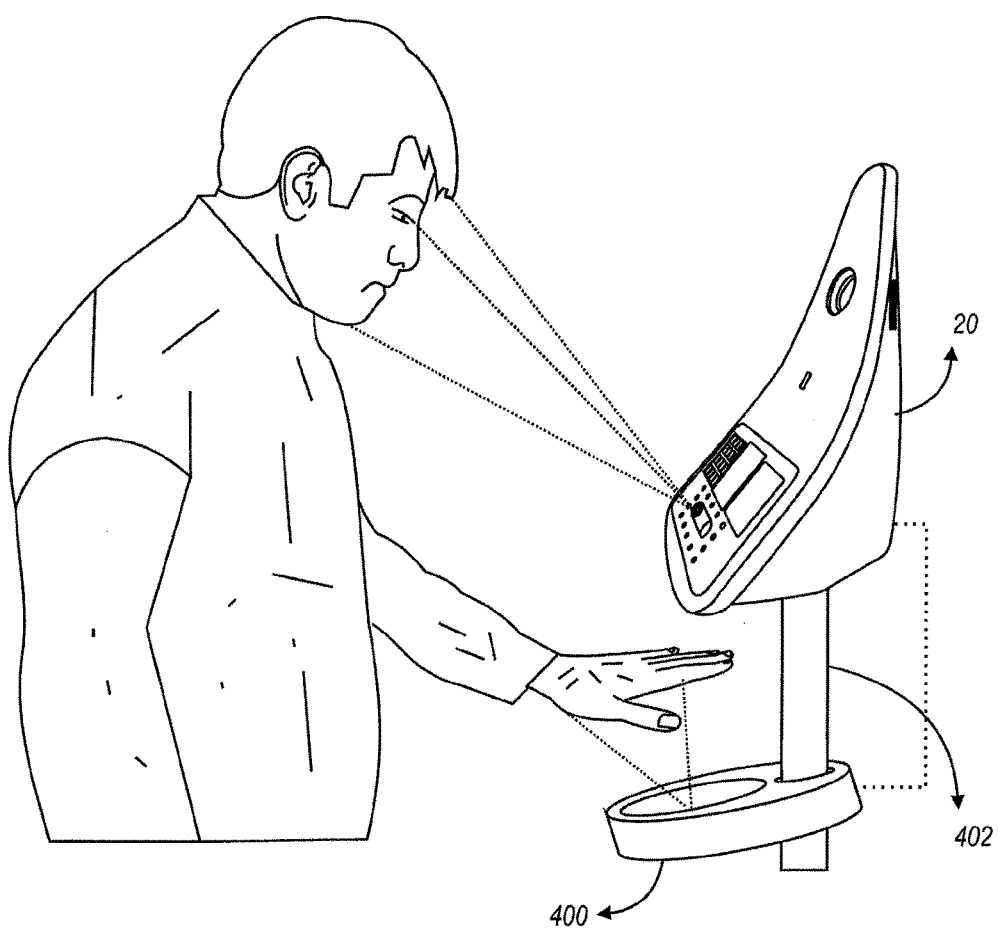
FIG. 9a schematically illustrates performing palm recognition.

FIG. 9a illustrates the device 20 paired with a palm vein reader 400. As illustrated in FIG. 9a, the device 20 and the reader 400 can both be mounted on a support 402 and can be connected electrically (e.g., by a wired connection) that allows the devices to exchange information. The palm vein reader 400 and the device 20 can be used to perform a palm-eyes-and-face recognition. In some embodiments, this matching process results in a 1 {(1:1):1} match.

Figure 9B:
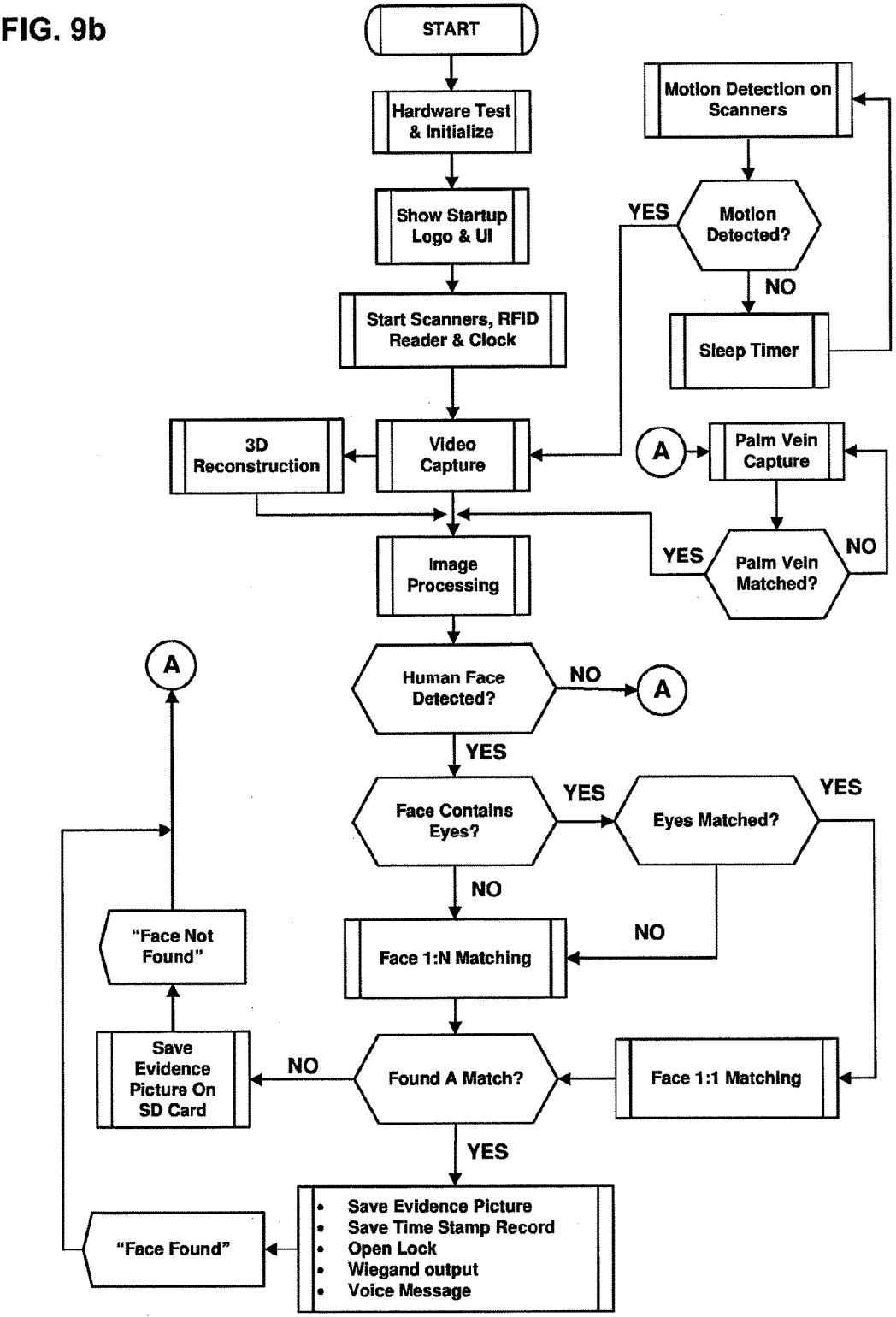
FIG. 9b is a flowchart illustrating a process for performing palm recognition.

FIG. 9b illustrates a process for performing a match using the palm vein reader 400. As illustrated in FIG. 9b, the device 20 can be configured to shift to idle mode after a cold boot. However, when a worker hovers his or her hand over the reader 400, the device 20 receives notice of this motion from the reader 400 and the device 20 automatically shifts to face detection mode. The reader 400 then performs a palm-vein matching method to extract the worker's identification and the reader pushes the identification to the device 20. The device 20 receives the identification and executes the face detection mode, which triggers 3D reconstruction through the stereo vision feed from both the optical camera 64 and the IR camera 70 simultaneously. The device 20 then performs an eye-and-face matching method as shown in FIG. 7.

Figure 10A:
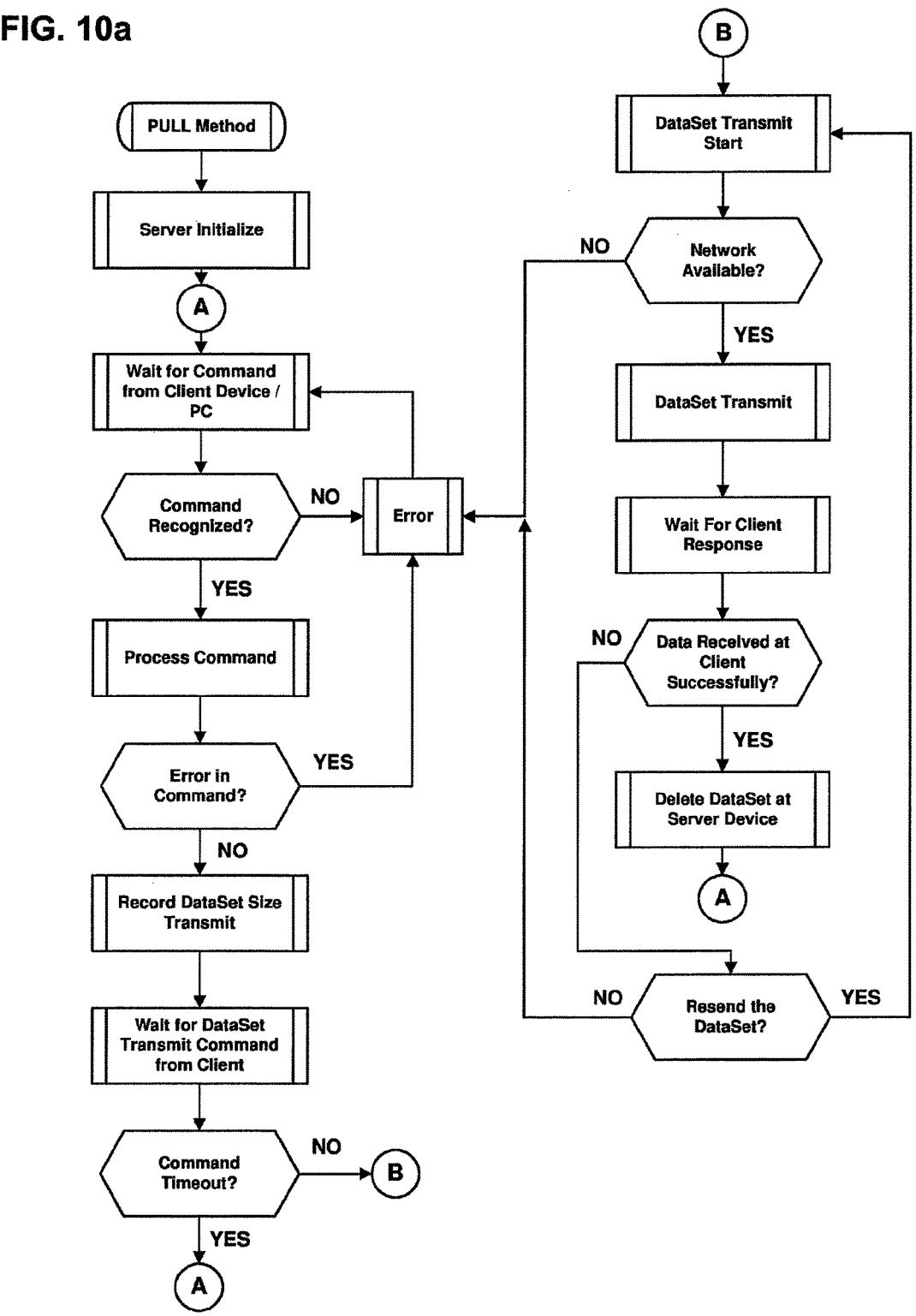
FIG. 10a is a flowchart illustrating a data pull method performed by the device of FIG. 2.
Figure 10B:
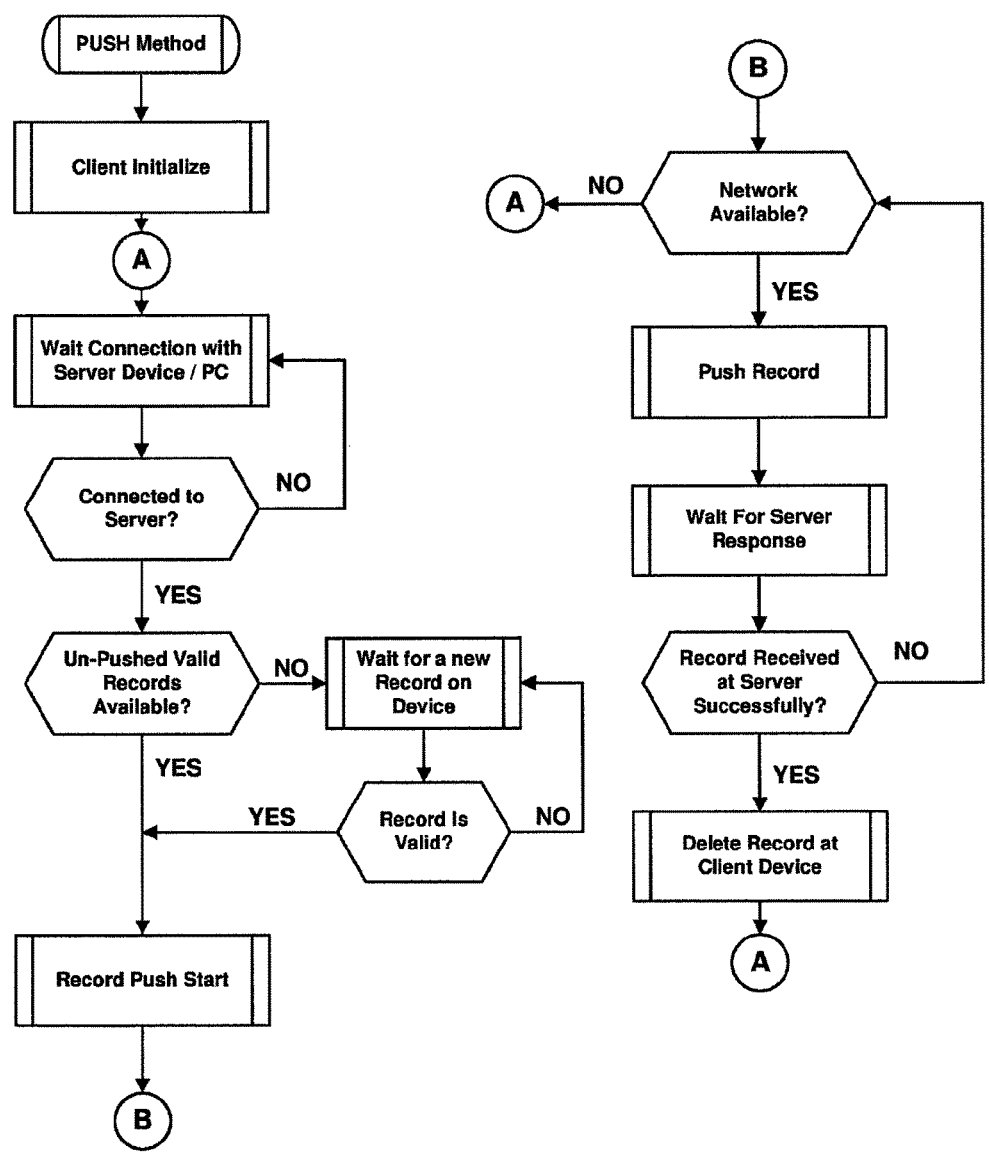
FIG. 10b is a flowchart illustrating a data push method performed by the device of FIG. 2.

FIG. 10a is a flowchart illustrating a pull method performed by the device 20, and FIG. 10b is a flowchart illustrating a push method performed by the device 20. In some embodiments, both methods can be used to manage time and attendance data captured by the device. The device 20 can be configured to perform two types of simultaneous data transaction methods to ensure no transaction or data is loss in transit between the device 20 and server 12. For example, the two streams can be cross-compared before final settlement of data on the server 12. In the pull method illustrated in FIG. 10a, the server 12 sends requests to the device 20 over the connection 14, and the device 20 transmits data to the server 12 in response. In the push method illustrated in FIG. 10b, the device 20 pushes the data to the server 12 as the device 20 receives the data and/or per the availability of the connection 14. Before, during, and after transmitting the data, the unavailability of the connection 14 is considered by the device 20, and the device 20 re-transmits the data unless the data is received by the server 12 and the server 12 sends the confirmation back to device 20. The server 12 compares data received by the push and pull methods and, upon final confirmation, sends a command to the device 20 to delete (e.g., erase and/or overwrite) data successfully transmitted to the server 12. Accordingly, the device 20 can eliminate data loss, which is not acceptable for even a single transaction of time and attendance data or other types of transactions, including financial transactions. Existing biometric devices do not give importance to this matter and are prone to data loss, which causes failures in downstream workforce management systems.

Figure 11A:
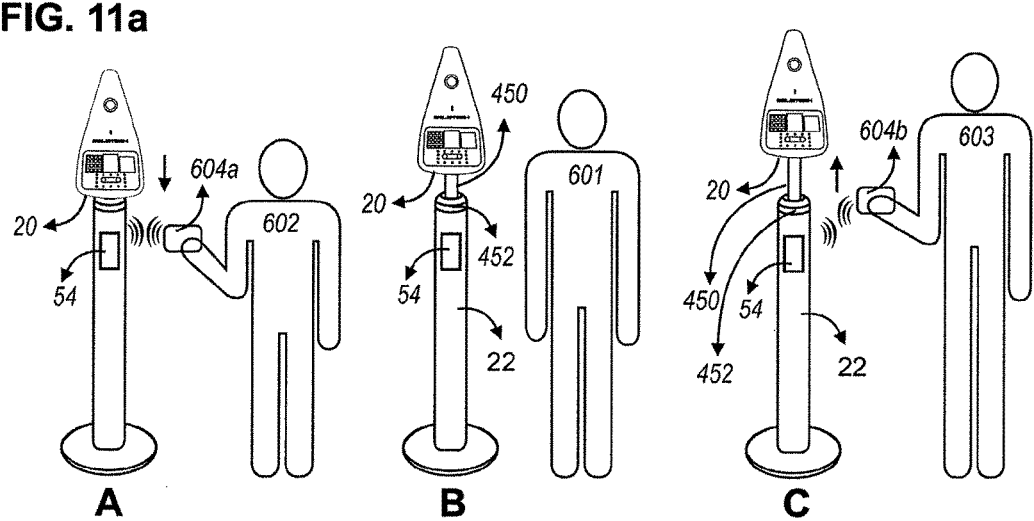
FIGS. 11a and 11b schematically illustrate a height-adjusting biometric scanning device.
Figure 11B:
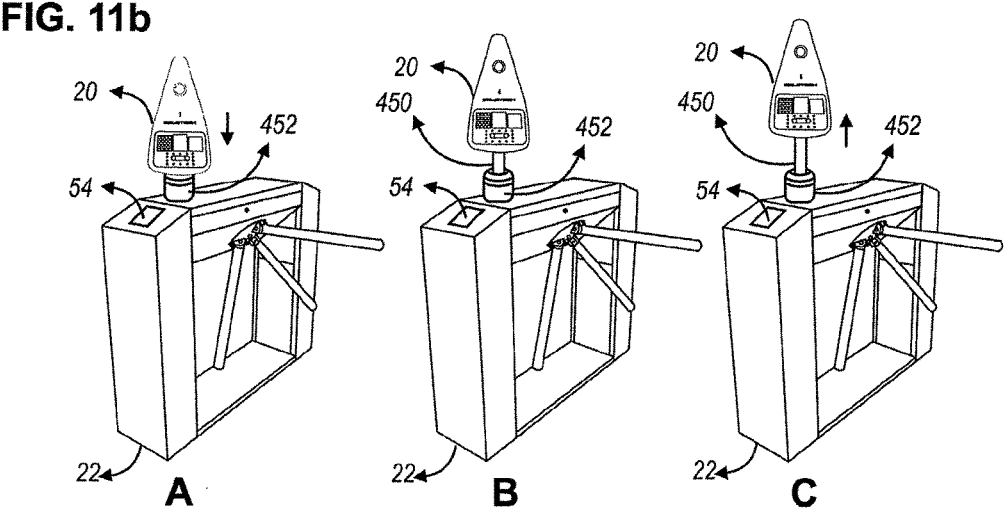

In some embodiments, the device 20 can be installed with an automatic height control system. For example, as illustrated in FIGS. 11a, b, and c, the height of the device 20 can be automatically adjusted based on the height of the worker interacting with the device 20. For example, the device 20 can be fixed on top of a free moving pole 450 controlled by a motor driver. During initialization of the device 20, the pole 450 is driven to a default height to cater to a worker of average or medium height (e.g., worker 601, illustrated in FIG. 11a, B). Workers with a shorter-than-average height (e.g., worker 602, illustrated in FIG. 11a, A) and workers with a taller-than-average height (e.g., worker 603, illustrated in FIG. 11a, C) can be issued RFID tags 604a and 604b. It should be understood that in some embodiments all workers can be issued RFID tags that identify a height code. However, in some embodiments, workers with average heights (e.g., the worker 601), do not need an RFID tag to use the device 20 at its default position as per the process discussed in FIG. 6.

Figure 11C:
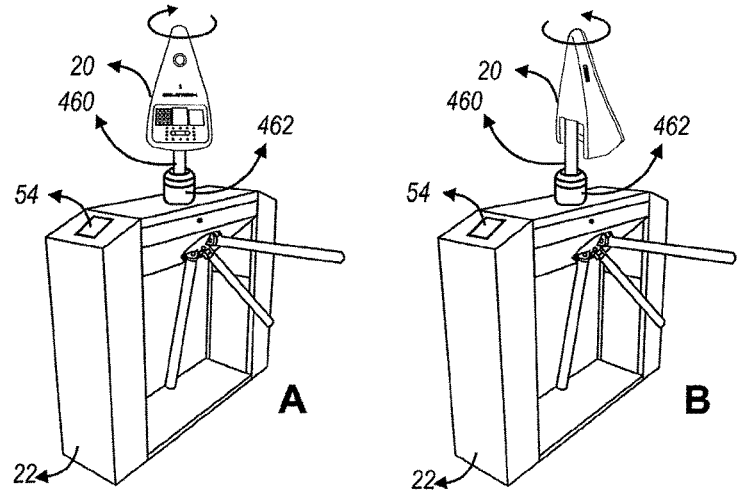
FIG. 11c schematically illustrates a position-adjusting biometric scanning device.
Figure 11D:
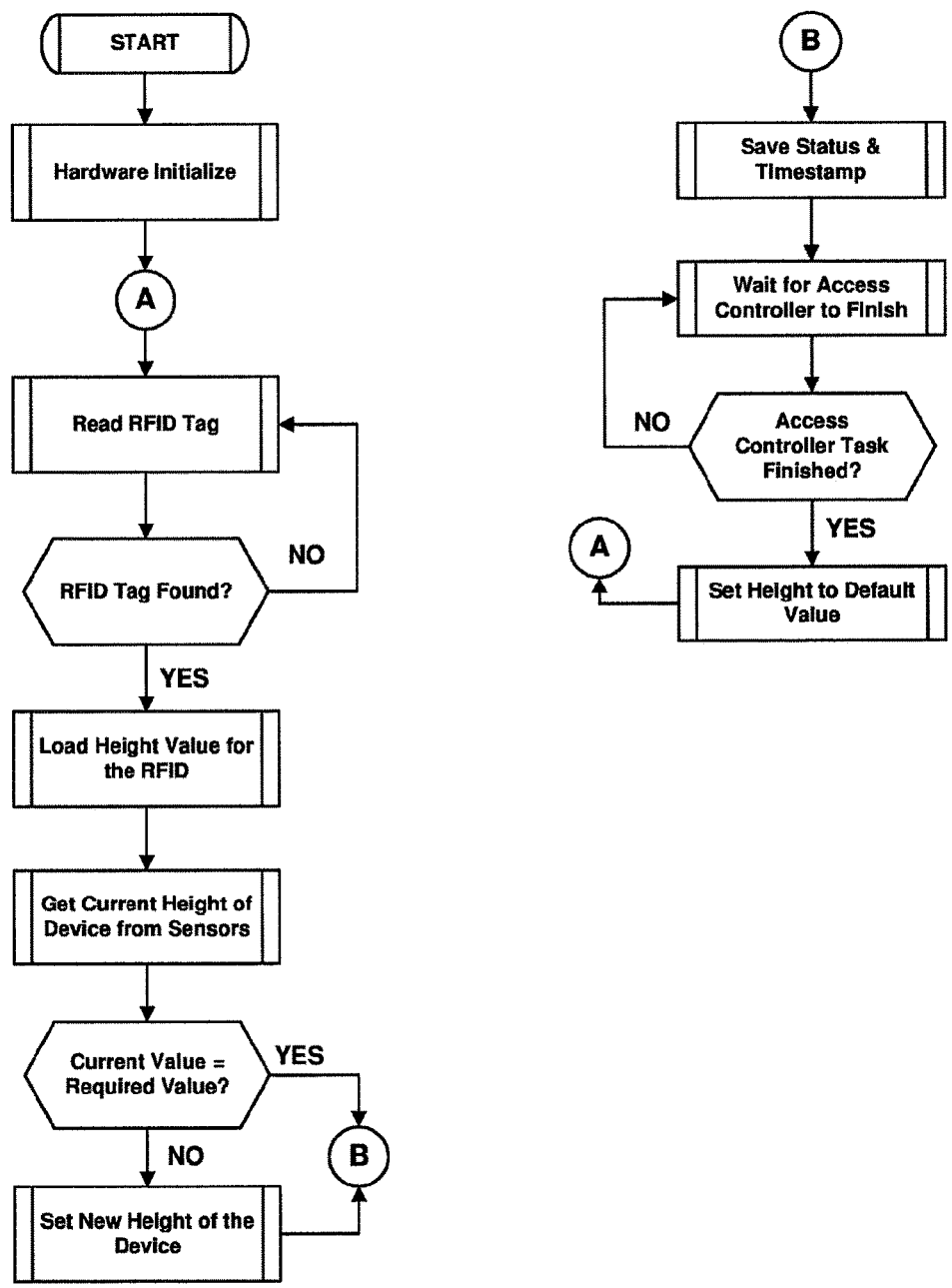
FIG. 11d is a flowchart illustrating a height-adjustment process performed by the devices of FIGS. 11a and 11b.
Figure 11E:
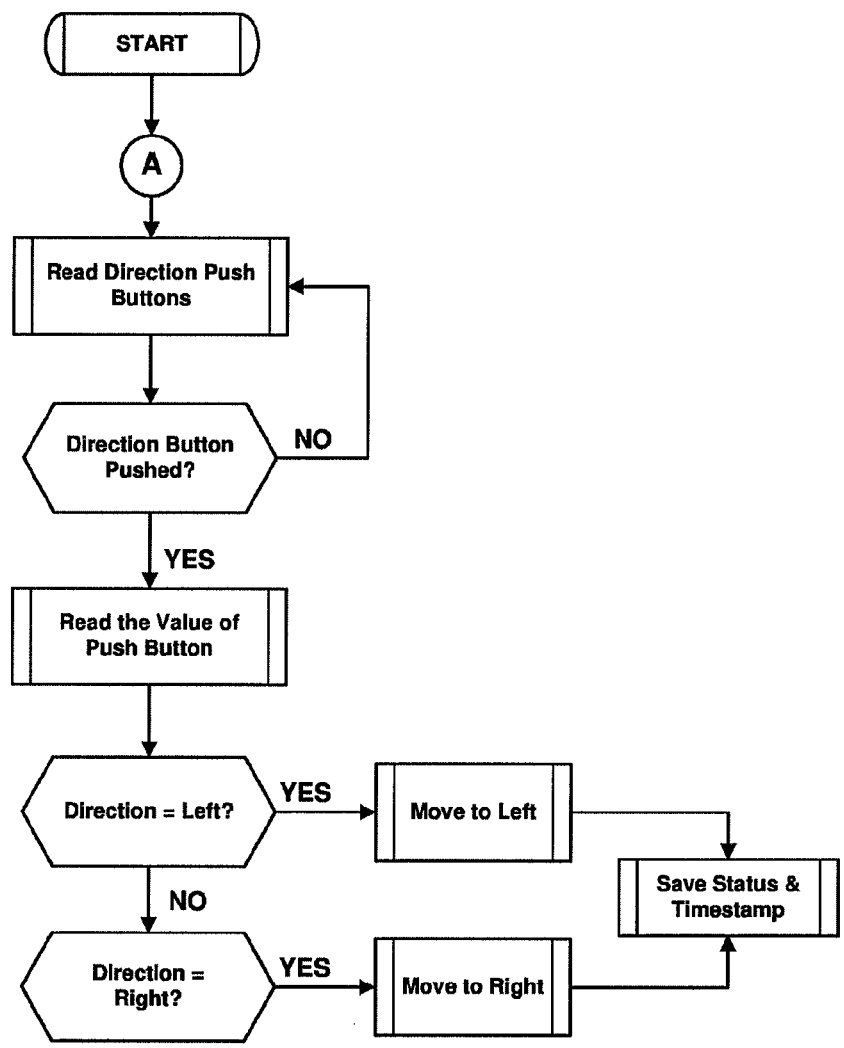
FIG. 11e is a flowchart illustrating a position-adjustment process performed by the devices of FIG. 11c.

To adjust the device's height, worker 602 shows his or her RFID tag 604a to the RFID antenna 45, which signals an RFID code that is matched to a "short" height code stored in a database (e.g., locally-stored in the RFID controller 83). The height code will then be used to automatically move the pole 450 down per "short" height settings associated with the "short" height code. The worker 602 can then use the device 20, and, after the device 20 captures the necessary data regarding the worker 602, the pole 450 can be returned to its default height (see, e.g., FIG. 11a, B). A similar process is performed to accommodate the worker 603 and drive the pole 450 to a taller height than its default position. For example, FIG. 11d is a flowchart illustrating a process for adjusting the device 20 height.

It should be understood that the RFID controller 83, motor driver 452, the device 20, or combinations thereof can be configured to control the height of the pole 450 based on the detected RFID tag. For example, in some embodiments, the RFID antenna 54 is positioned within the turnstile 22 and transmits detected tags to the RFID controller 83 included in the device 20 (e.g., over a wired connection between the antenna 54 and the device 20). The device 20 can process codes identified by the controller 83 based on the detected tags, and the device 20 can then issue a command to the motor driver 452 to position the pole 450 at a particular height. In other embodiments, a controller position in the turnstile 22 with the antenna 54 can be configured to detect and process codes received from the RFID tags and issue a command directly to the motor driver 452 without interaction with the device 20.

Furthermore, as noted above and as illustrated in FIGS. 11a, b, and c, in some embodiments, the RFID antenna 54 can be positioned outside of the housing 40 and 42 of the device 20. For example, the antenna 54 can be positioned at a lower height than the device 20 to allow workers of all heights (including workers in wheelchairs) to use the antenna 54 to adjust the height of the device 20. Existing biometric devices are often installed at a fixed height which makes it difficult for short and tall workers to mark their attendance. Accordingly, the automatic height adjustment described above solves this problem. Furthermore, the RFID antenna 54 is a cheaper implementation than providing button control for manually adjusting the height. In some embodiments, the palm vein reader 400 can similarly be used to obtain a height or other position code from a worker (e.g., associated with an identification of the worker) and can send the height data to the motor driver 452.

It should also be understood that in some embodiments, the RFID tags can be configured with codes that identify not only a height of the device 20 but other positions and/or settings. For example, as illustrated in FIG. 11c, in some embodiments, the device 20 can be installed at approximately the center of a turnstile 22 so that the same device 20 can be used for both inward and outward traffic (e.g., in areas with light traffic). The device 20 can pivot on top of a pole 460 rotatable by a motor driver 462. One or more buttons can be installed on the turnstile 22 and/or the device 20. For example, the turnstile 22 can include a left button and a right button. When the left button is pressed, a command is sent to the motor driver 462 that rotates the device 20 to face inward traffic, which sets the status of the device 20 to "IN." When the right button is pressed, a command is sent to the motor driver 462 that rotates the device 20 to face outward traffic, which sets the status of the device 20 to "OUT." In other embodiments, an RFID antenna on each end of the turnstile 22 can be used to detect a direction of traffic and set a status of the device 20 accordingly. Existing systems typically require two devices 20 to manage both inward and outward traffic. Accordingly, using the rotatable device 20 as illustrated in FIG. 11c reduces the costs while preserving data capture functionality.

Figure 12A:
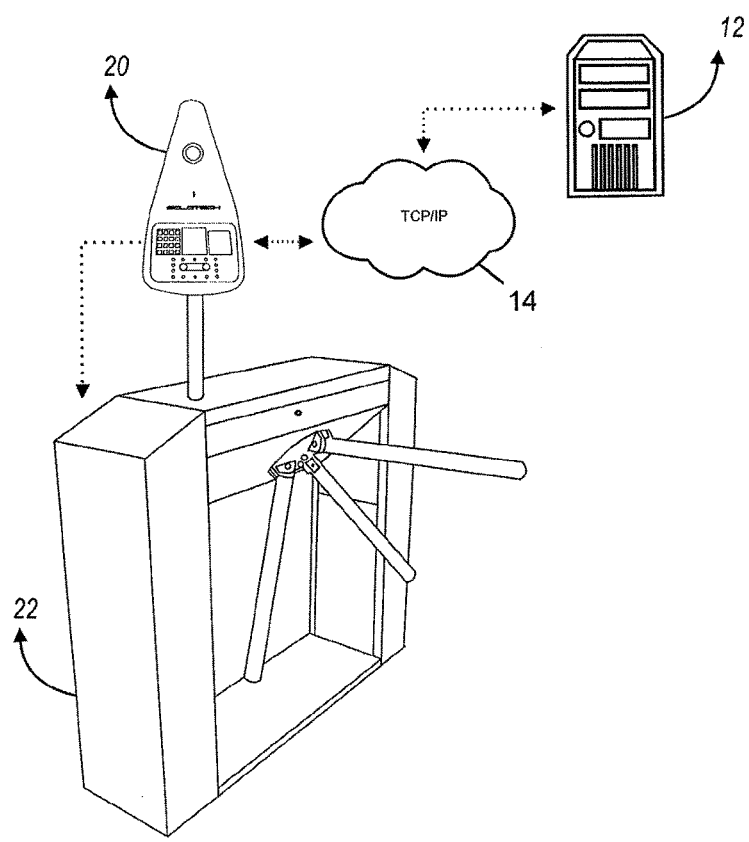
FIG. 12a illustrates a biometric scanning device connected directly to an electric lock.
Figure 12B:
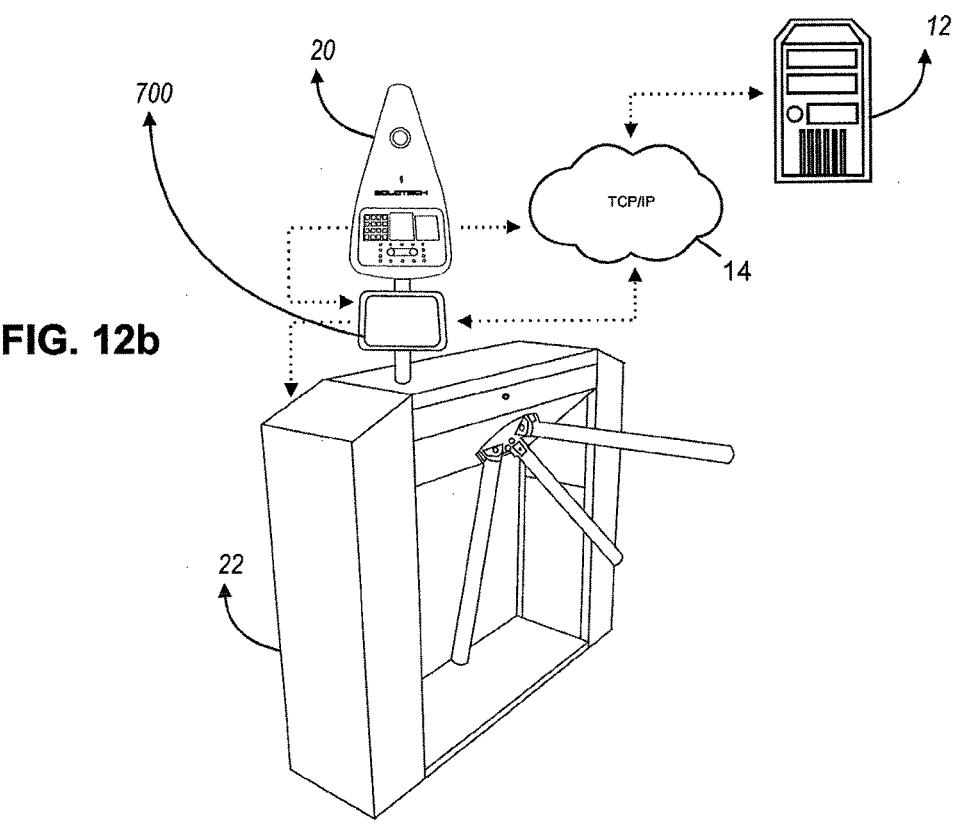
FIG. 12b illustrates a biometric scanning device connected indirectly to an electric lock through computing device.
Figure 12C:
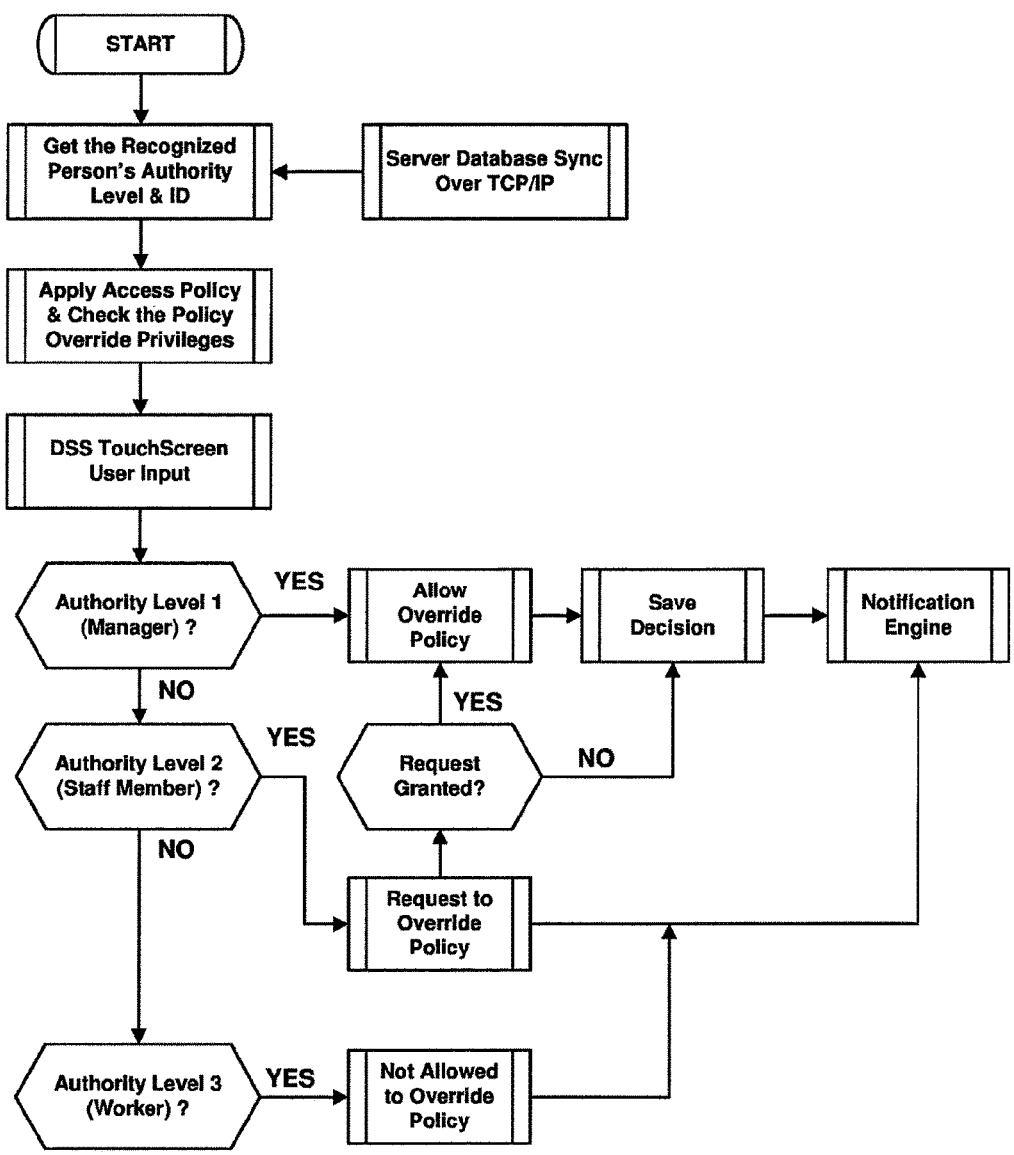
FIG. 12c is a flowchart illustrating a method for checking access policies and rules with the devices of FIGS. 12a and 12b

In a standard setup, as illustrated in FIG. 12a, the device 20 matches a worker's biometric features and signals the turnstile 22 directly to open the lock and let the worker enter or exit the area and clock him or her "IN" or "OUT." In an alternative setup, the device 20 is connected to a computing device 700, such as an Android-based tablet, that is connected to the turnstile 22 (see FIG. 12b). The policies and rules are set on the server 12 and are pushed to the computing device 700 over the connection 14. When a worker successfully marks his attendance on the device 20, an identifier of the worker is sent to the computing device 700, which takes further action as per the policies set by the server 12.

For example, if the policies and rules are matched for the worker (e.g., per a database stored on the computing device 700), the computing device 700 signals the turnstile 22 to unlock and let the worker pass. The attendance data can also be stored on the computing device 700 and synched with the server 12 as described above with respect to FIGS. 10a and 10b. If the policies and rules are not matched for the worker, the computing device 700 will prompt the worker (e.g., on a screen of the computing device 700) for additional information based on a worker level associated with the worker (e.g., per the database stored on the computing device 700). If the worker level is set as "manager," the device 700 will allow the worker to override the policy and enter on his or her own decision. If the worker level is set as "staff" the worker will have an option to request access (associated with selectable reasons for the request). If the request is granted, the worker will be notified (e.g., over a text message to a cellular telephone) of a code that the worker can enter into the device 700 to gain access. If the worker level is set as "labor," the worker is not provided any further options and must accept the denial of access. Existing systems are only able to match a worker and clock the worker "IN" or "OUT." Accordingly, the device 20 can perform additional functionality to enforce HR, security, administrative, overtime and other policies and provide decision support for the enforcement of the policies.

Figure 13:
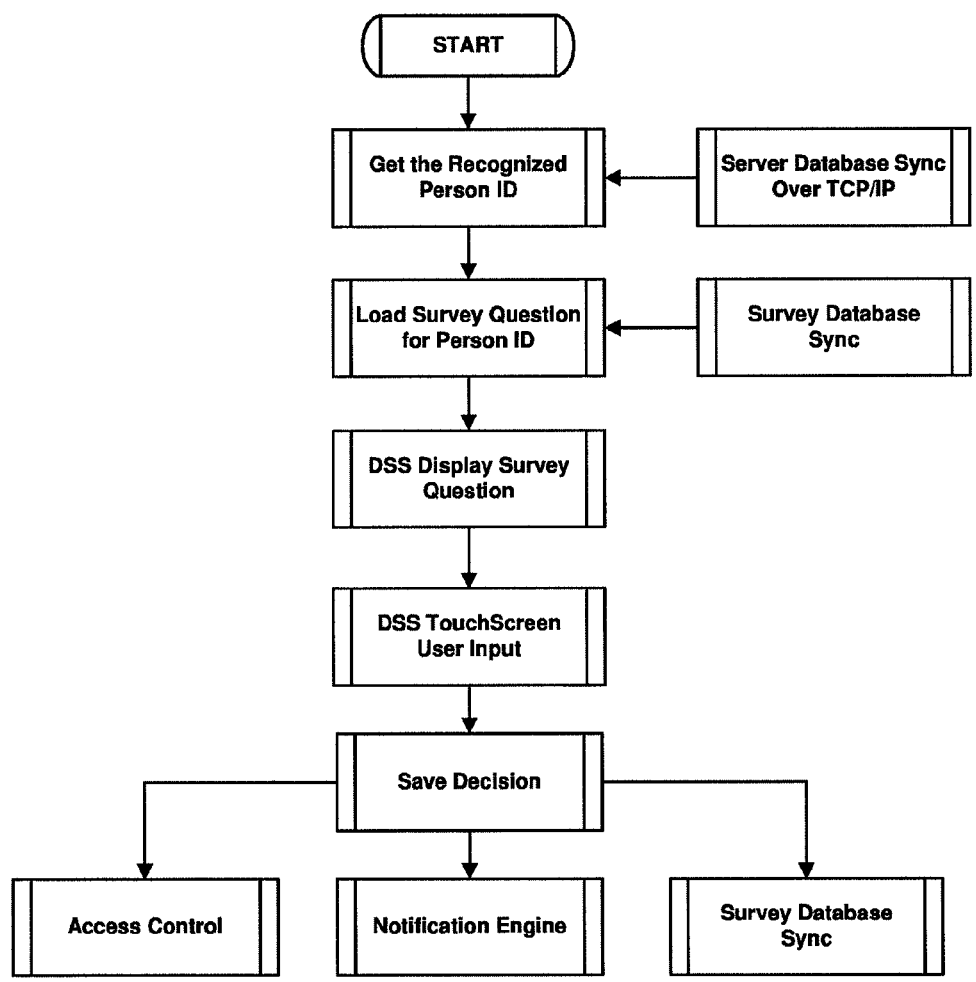
FIG. 13 is a flowchart illustrating a method for using surveys with the devices of FIG. 12b.

FIG. 13 is a flowchart that illustrates the use of surveys with the device 20 and the computing device 700. Surveys for individual workers can be created (e.g., with supported text and graphics) and stored on the server 12, which are then synched over the connection 14 with the computing device 700. When a worker marks his attendance on a device 20 connected to the computing device 700, the device 700 displays the survey created for him or her (e.g., on a touchscreen of the computing device), which the worker completes using the computing device 700 (e.g., the touchscreen). Upon completing the survey, the computing device 700 passes a signal to the turnstile 22 to unlock and let the worker pass. The survey input is stored in the database of the computing device 700 and is synched with the server 12 over the connection 14. Survey questions may vary from "Would you like to have the meal today?" which may help the kitchen to know how many meals to be prepared, or "Which drink would you prefer at the cafeteria, Pespi or Coke?" to identify suppliers to contract with. Similarly, the computing device 700 can act as a voting system to know worker choices and make better HR policies for the workers.

Figure 14A:
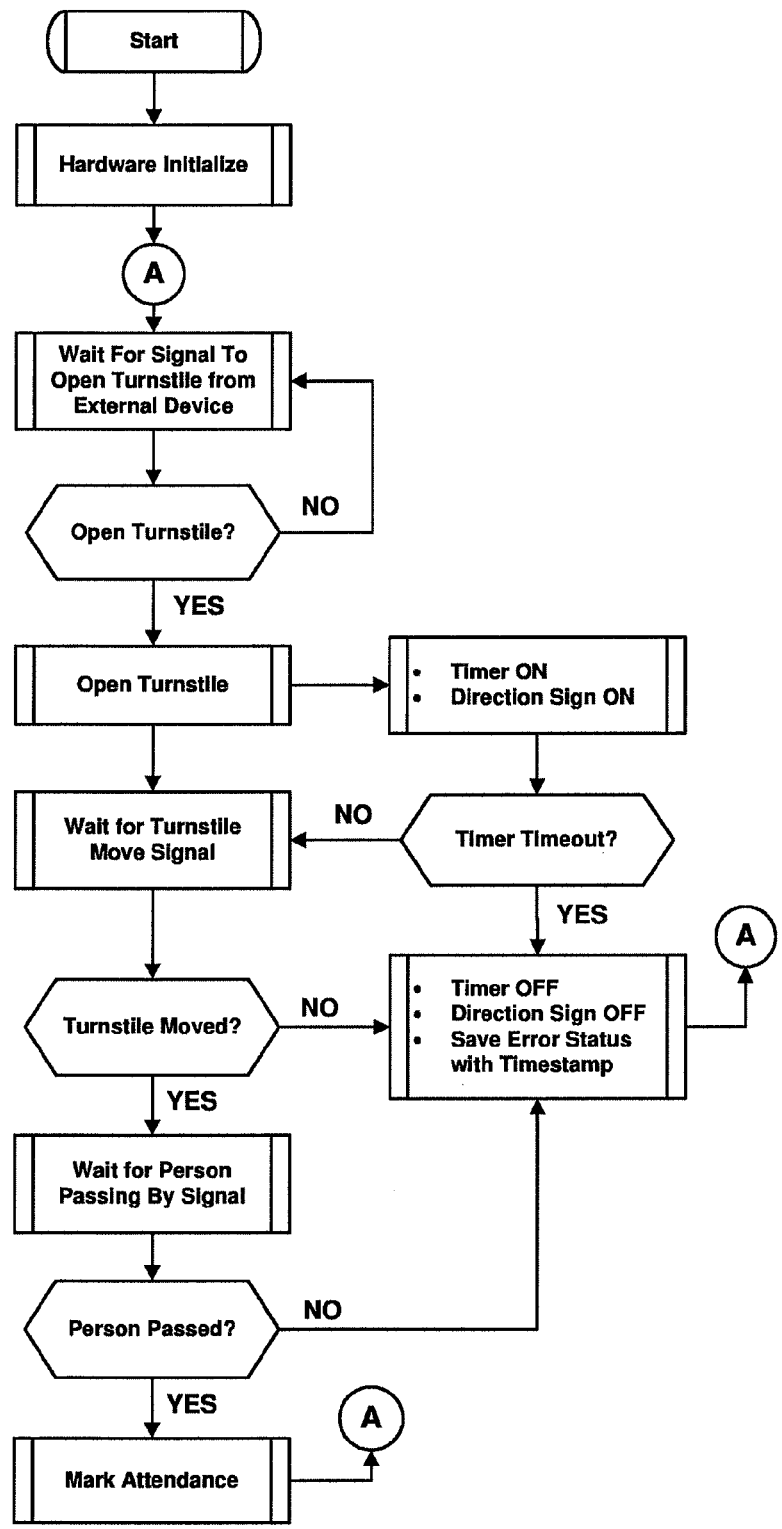
FIG. 14a is a flowchart illustrating a method for performing multi-status physical access control.

FIG. 14a is a flowchart that illustrates the use of multi-status physical access control with the device 20 or any RFID device. In this configuration, special sensors are integrated into the turnstile 22 to get additional data to determine if a worker actually entered or exited after clocking "IN" or "OUT." For example, in some embodiments, attendance records stored on the device 20 can have one of three levels: (1) The worker was able to successfully mark his attendance; (2) The turnstile 22 opened and/or a tripod was rotated; and (3) The worker crossed the other end of turnstile 22. This fraud prevention method is used to determine if a worker clocked-in on a device 20 but did not actually enter the work area. The server 12 can be configured to determine whether to accept a clock-in or not based on the status of the clock attempt.

Figure 14B:
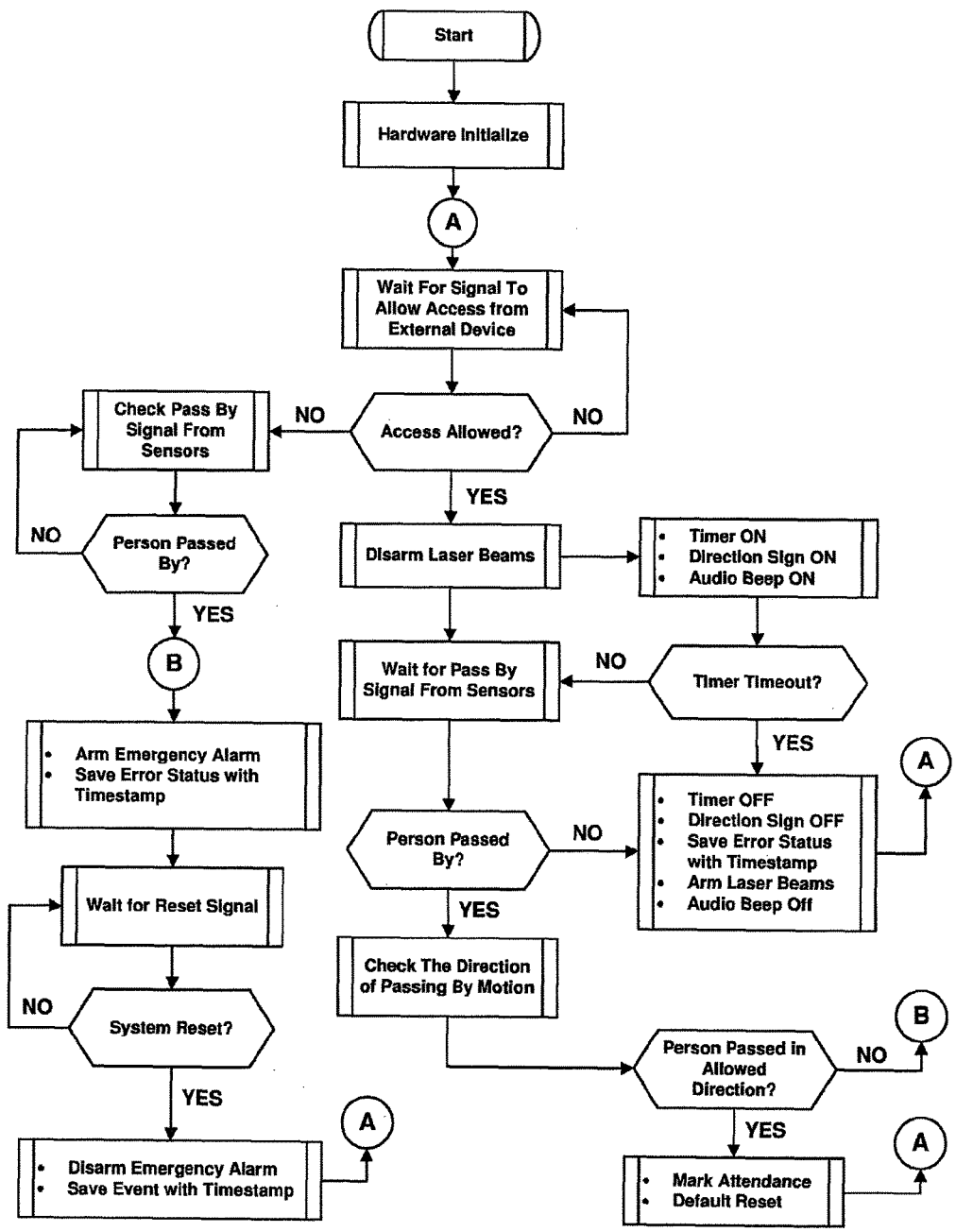
FIG. 14b is a flowchart illustrating a method for performing multi-status non-physical access control.
Figure 14C:
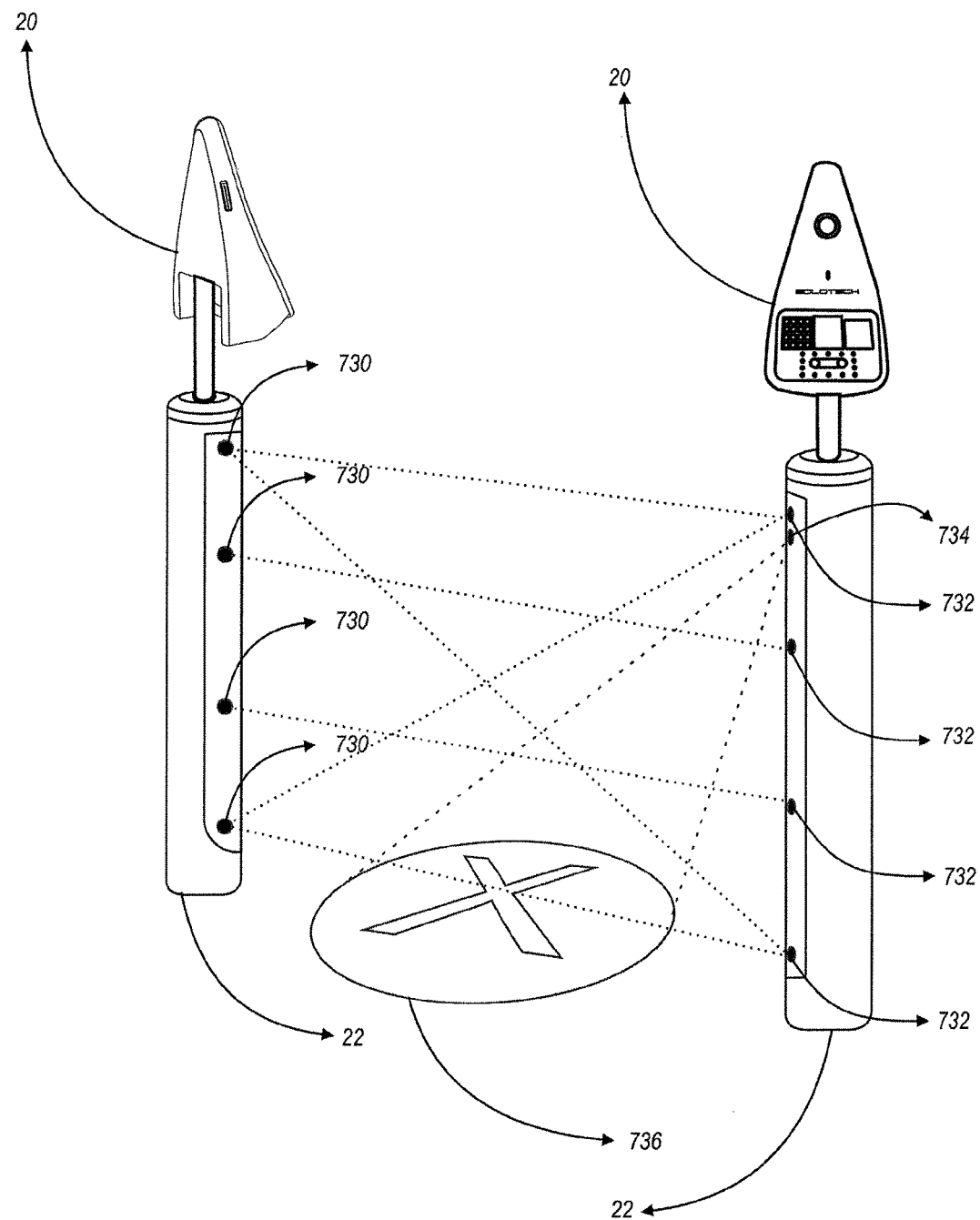
FIG. 14c illustrates a system for performing multi-status non-physical access control.

Similarly, FIG. 14b is a flowchart that illustrates the use of multi-status non-physical access control with a device 20 or any RFID device. As illustrated in FIG. 14c, a combination of proximity sensors 730, laser light source and associated sensors 732, and a projector 734 can be installed in a turnstile 22. In some embodiments, however, the devices 730, 732, and 734 can be controlled by an intelligent controller without any tangible turnstile 22. The proximity sensors 730 are capable of motion detection in both directions. Laser light source and associated sensors 732 are used to mimic a barrier or gate and are also used for intrusion detection. The projector 734 is used to display different signs 736 on the floor for access control (e.g., "Stop" or "Go"). The device 20 and/or the separate intelligent controller is responsible for control and communication between the different devices.

Using the devices 730, 732, and 734 allows the access control point 16 to perform intrusion detection, bi-directional movement sensing, and sensing the numbers of people passing through (e.g. if only one person is allowed to pass but more than one person attempts to pass, an alarm will be issued and the event will be saved). Accordingly, the multi-status non-physical access control can provide three types of status information: (1) clock-in and clock-out information; (2) intrusion detection; and (3) a number of people passing through. The multi-status non-physical access control can maintain a batter-backed calendar, a real-time clock, and an event counter to provide accurate status information. The modular design of the multi-status non-physical access control aids integration with other components of the system 10. Multi-status non-physical access control also is an effective and cost-cutting discipline enforcement solution.

Figure 15A:
FIG. 15a illustrates a biometric scanning device used to perform asset protection.
Figure 15B:
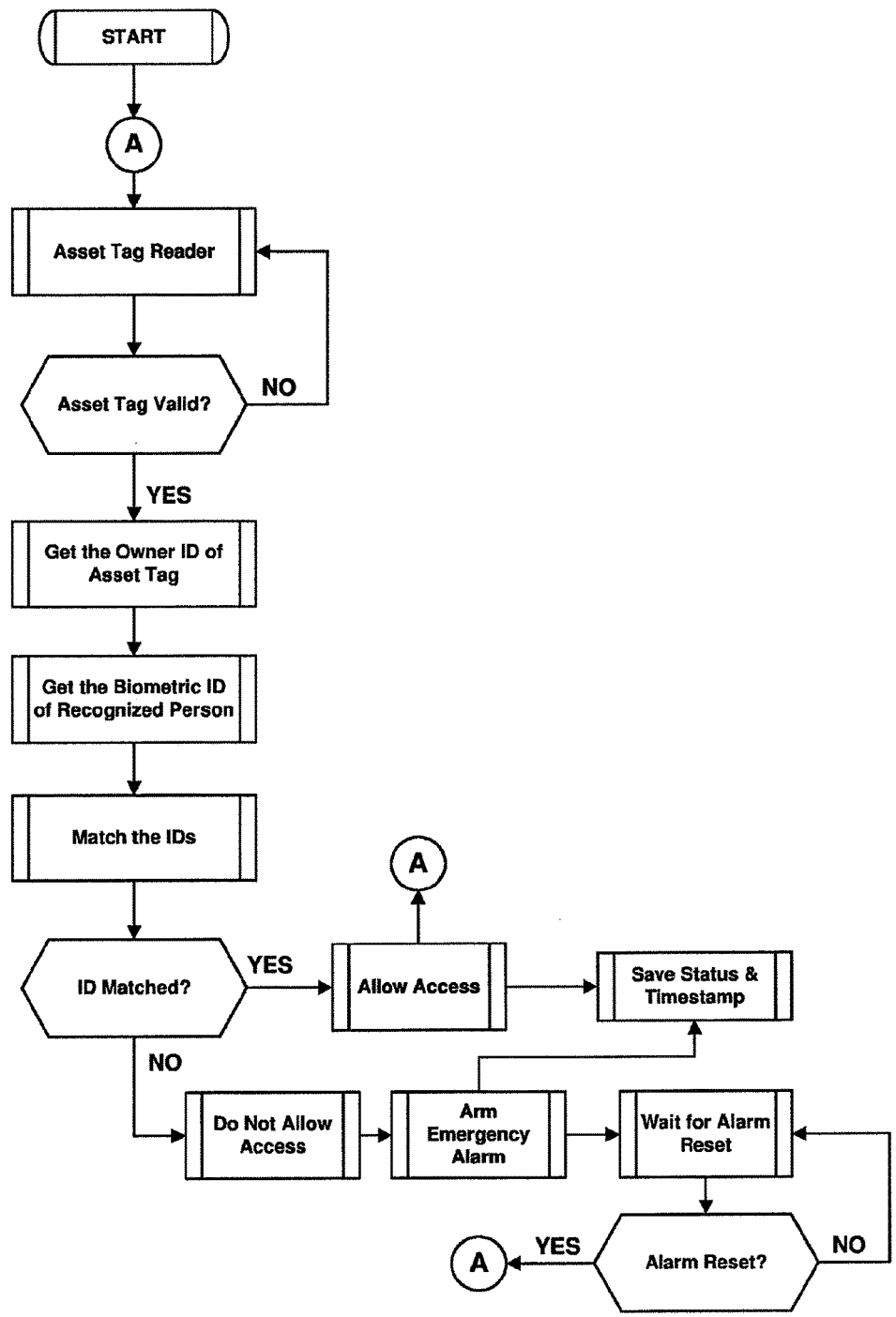
FIG. 15b is a flowchart illustrating a method for performing asset protection.

FIG. 15a is an exemplary illustration of a device 20 used with asset protection. Similarly, FIG. 15b is a flowchart that illustrates the use of asset protection with the device 20. To perform asset protection, asset tags 750 are attached to expensive assets, such as laptops and mobile phones and are assigned to a particular worker's profile on the server 12. A tag reader (e.g., medium range) 752 is attached to the device 20. If a worker brings an asset with a tag 750, such as a laptop or a mobile phone, in the proximity of the tag reader 752, information collected from the tag 750 is passed to the device 20 and the device 20 matches the information with the worker attempting to gain access. If the asset tag 750 matches the identified worker's profile, the device 20 grants the worker access. If the asset tag 705 does not match with the worker's profile, the device 20 prevents the worker from passing through the turnstile 22. In some embodiments, if the asset tag 750 does not match, the device 20 is also configured to trigger an alarm or notification. Accordingly, the asset protection adds a layer of protection of assets, which reduces the asset theft cases, and, consequently, can reduce insurance costs.

In some embodiments, a device 20 can be integrated with a metal detector, such as a walk-through metal detector 800, as illustrated in FIG. 16a. FIG. 16b is a flowchart that illustrates the use of the metal detector integrated with the device 20. The device 20 can be integrated into the ceiling of a walk-through metal detector 800 and is connected to the server 12 over the connection 14. With this configuration, the worker must look up while walking through the detector 800. If the worker attempted and is granted access, a first (e.g., green) light 802 on the detector 800 can flash, which informs the worker that he or she can walk-through the detector 800 where the worker and the contents he or she carries will be scanned. Data gathered by the detector 800 can be stored in a database. For example, metal contents allowed in with a worker can be stored in a database and compared with metal contents carried by the worker at the time of exiting. If a worker is not identified by the device 20, a second (e.g., red) light 804 will flash and, in some embodiments, a security alarm will be triggered.

Figure 17:
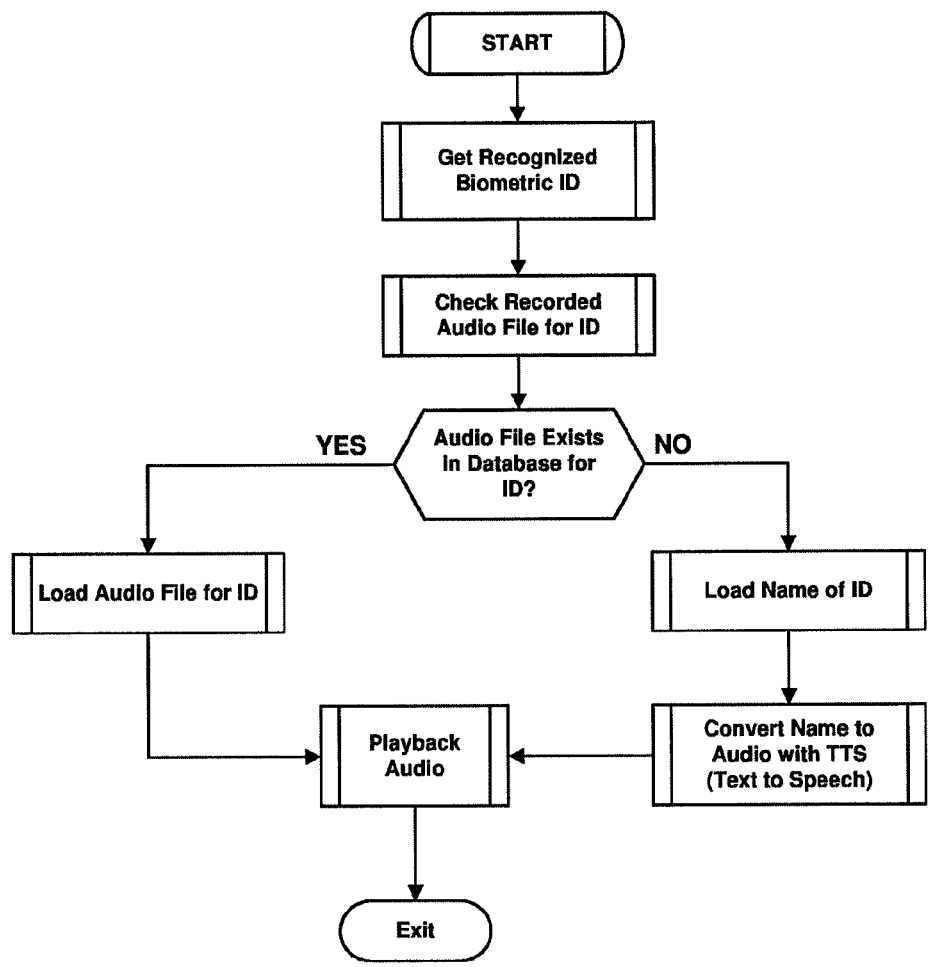
FIG. 17 is a flowchart illustrating a method of playing a worker's name after successful use of a biometric scanning device.

FIG. 17 is a flowchart that illustrates using a name method executed by the device 20. Names of workers are saved in text and audio form on the server 12, which are synched with the device 20. When a worker uses the device 20 to successfully mark his or her attendance, the device 20 plays the corresponding name audio file. If there is no audio file available for a particular worker, the device 20 executes a text-to-speech engine to convert the text of the worker's name into audio. Some existing systems play a fixed sound whenever a user successfully uses a biometric device. If there are a large number of such devices installed in close proximity, however, the sounds can confuse a user because a user does not know if the sound they heard was from the device they were using or a different device. Accordingly, configuring the device 20 to play the worker's own name increases the efficiency of the system 10 and the confidence of the worker.

Figure 18:
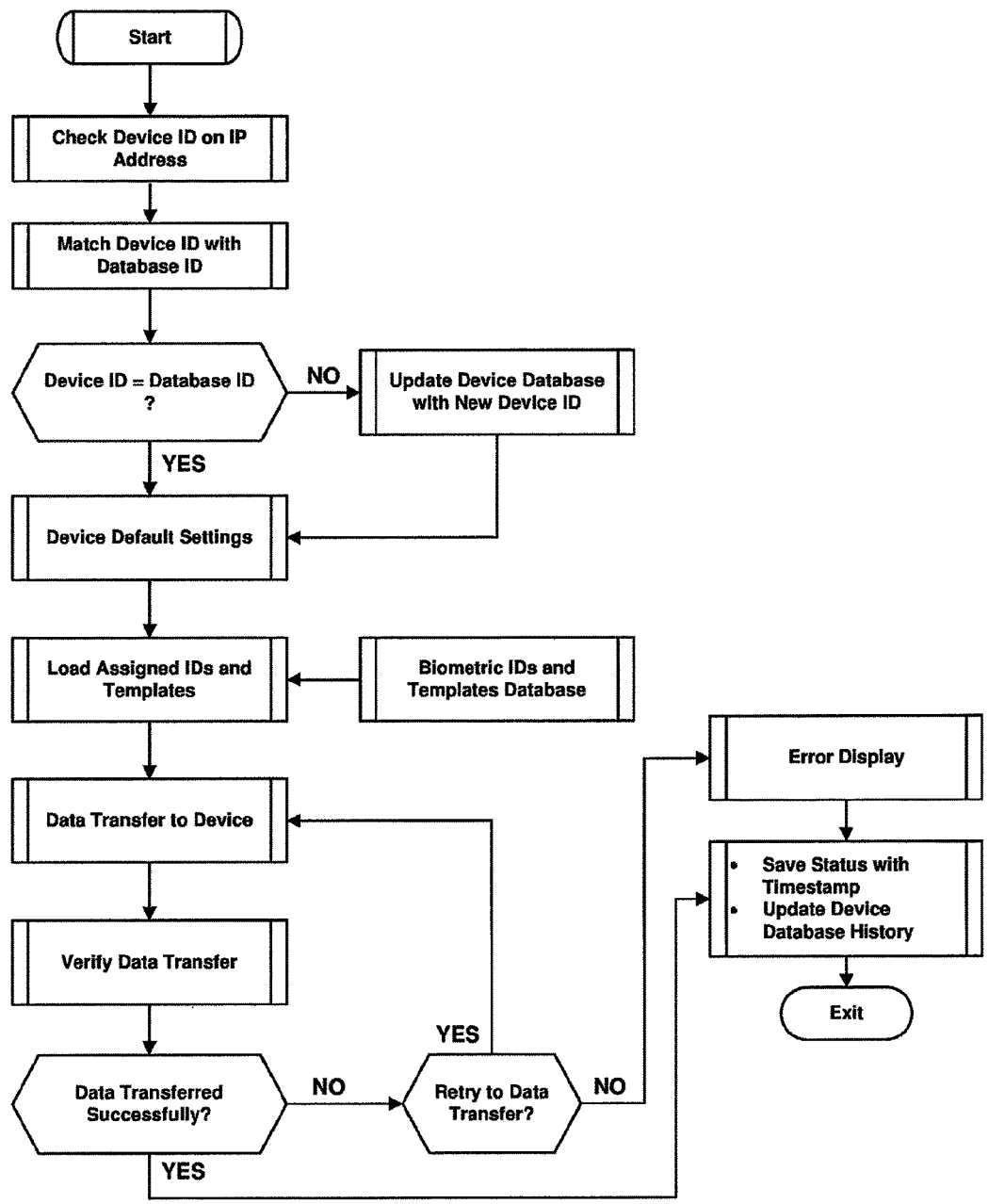
FIG. 18 is a flowchart illustrating an emergency disaster recovery method.

FIG. 18 is a flowchart that illustrates an emergency disaster recovery method executed by the device 20. As noted above, biometric templates and applicable policies are synched between the device 20 and the server 12. If the device 20 fails to function, the device 20 can be replaced with a new device assigned the same IP address as the failing device. Therefore, the new device 20 will be automatically synched with the same biometric templates and applicable policies from the server 12. Accordingly, automatically re-synching a new device from the server 12 offers a painless recovery of the system 10.

In some embodiments, there are two types of problems that may arise during the normal functionality of the system 10: (1) data corruption of secured data storage included in the device 20; and (2) replacement of a device 20 with a new device 20. Two types of data are stored in the device 20: (1) biometric templates and (2) clock-in and clock-out and other log files. To download and upload data from and to a device 20 in either of the above situations, a system administrator can choose a direct connection or a network connection. For direct data transfers from a device 20, a system administration can use a SanDisk or Kingston-compatible USB flash disk (i.e., a USB thumb drive) on USB port 130 of the device 20.

Figure 19:
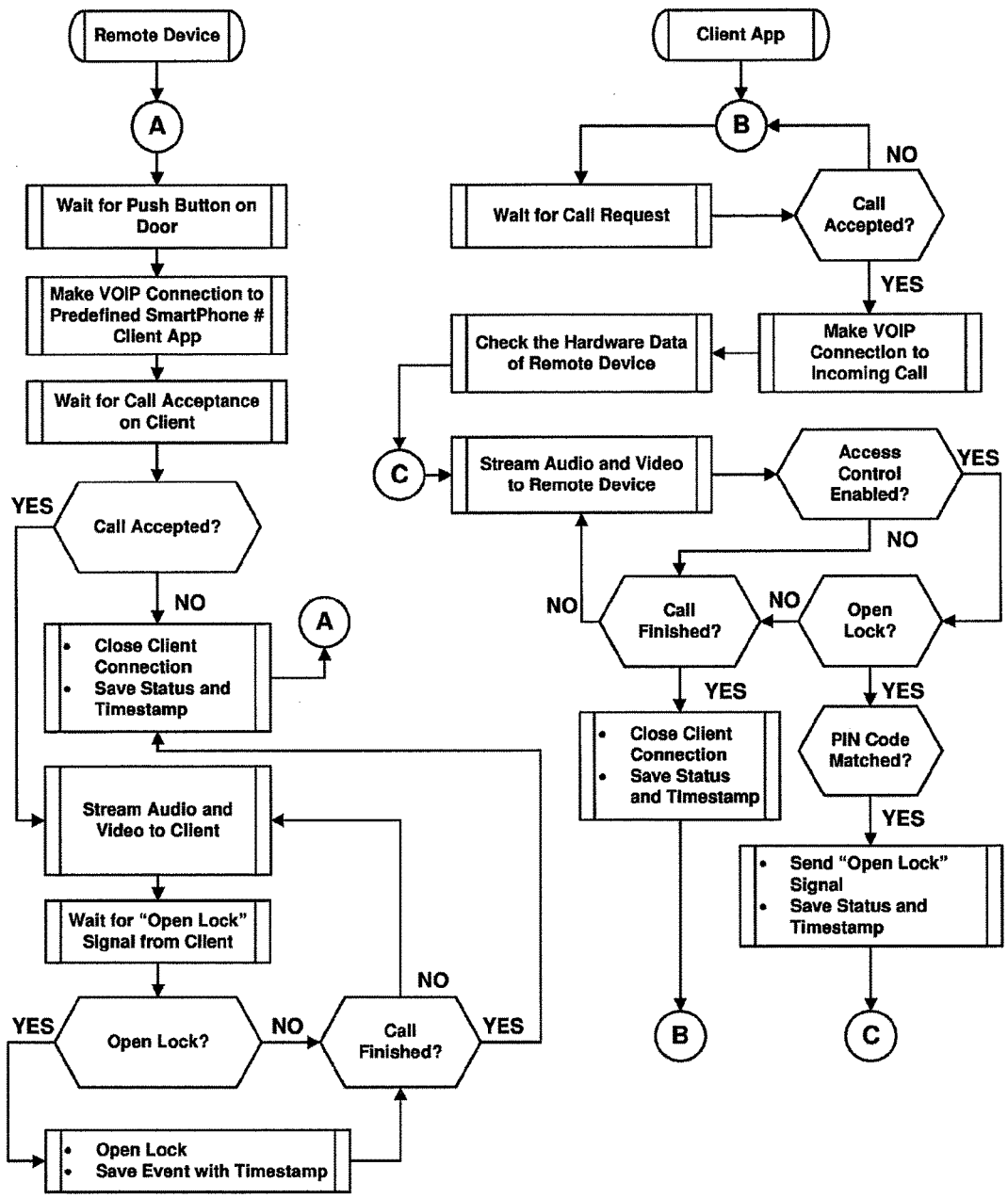
FIG. 19 is a flowchart illustrating a method of performing remote lock operations.

FIG. 19 is a flowchart that illustrates video conference and remote lock operations executed by the device 20. These operations are implemented by a combination of a mobile device (e.g., a smart phone, capable of utilizing the TCP/IP services with a WIFI/3G/LTE or GSM/GPRS radio) and a front facing camera. In particular, a software application is installed on both the device 20 and the remote mobile device. The application provides audio and/or video streaming on both devices. When a call button is pushed on the device, if the status is set to a "BELL" mode, the device 20 will play a sound (e.g., a door bell sound). Otherwise, if the status is set to a "PHONE" mode, the device 20 attempts to connect the remote mobile device and initiate a call (e.g., a voice-over-IP ("VOIP") call). On accepting the call, the remote mobile device queries the device 20 for the hardware capabilities of the device 20. If the device 20 is connected to an electric lock 124, an "Open Lock" button may appear in a graphical user interface ("GUI") displayed by the software application installed on the mobile device. In some embodiments, audio and/or video streaming is also automatically started on both devices after the call is accepted. Accordingly, the user of the mobile device can see and, optionally talk to the worker interacting with the device 20. If the "Open Lock" Button is pressed on the mobile device, the mobile device verifies a code (e.g., a PIN input by the user of the mobile device or stored in the mobile device). After verifying the code, the mobile device sends a signal to the device 20 to open the connected electric lock. Therefore, the device 20 allows not only remote access of the electric lock 124 but also ensures security and maintains a history record or log of the events related to the device 20 performed through the mobile device. This integration offers convenience to a user to talk to and see the person trying to access a particular area through the device 20 and gives the user power to allow access if required even if the user is located remote from the device 20. For example, this integration can be used in residential towers and buildings, such as when a dog walker, nanny, or other individuals needs access to a location when the residence owner is away from home (e.g., at work or on vacation).

Figure 20:
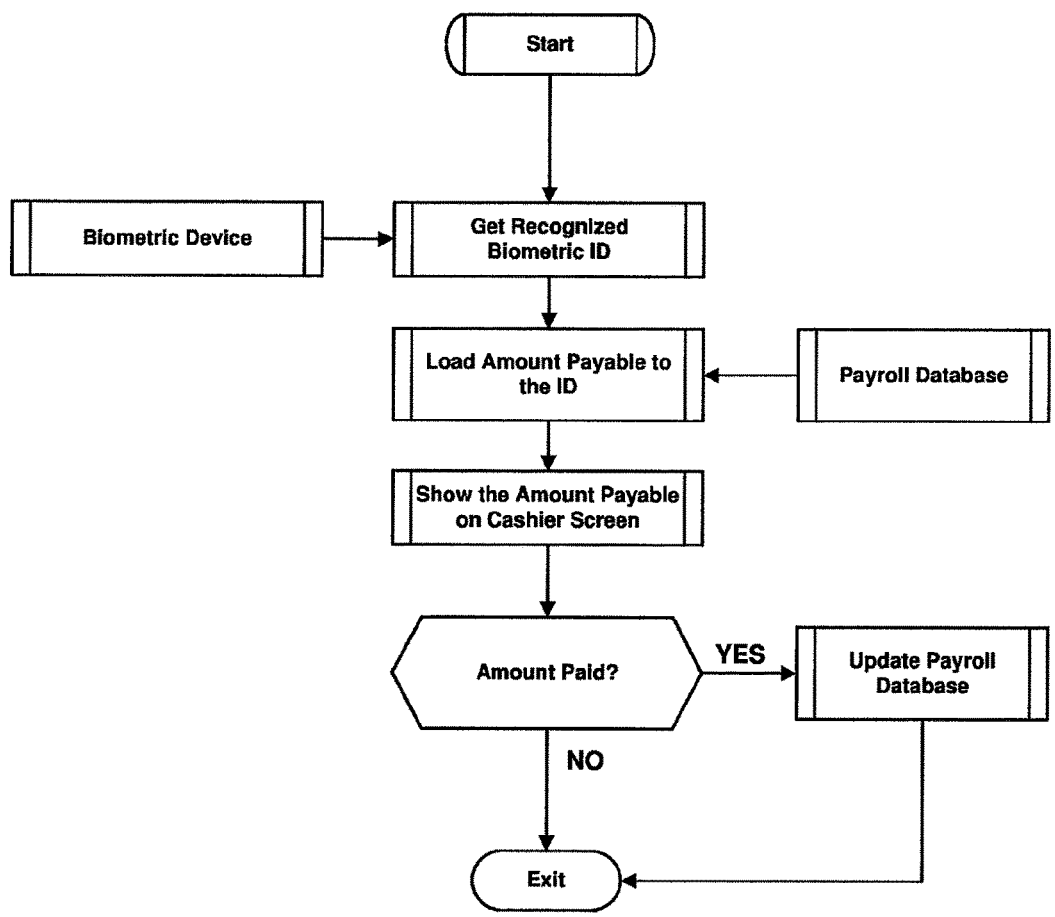
FIGS. 20 and 21 are flowcharts illustrating payment methods performed with a biometric scanning device.

FIG. 20 is a flowchart that illustrates the use of a payment method executed by the device 20. For example, the payment method integration with a device 20 at a cashier window helps to speed up a payment procedure performed at the window and keep transactions secure. For example, the device 20 recognizes the worker's face, and the device 20 pushes the identifier of the worker to a payroll server (e.g., the server 12 or a separate server). The payroll server translates the identifier to payroll-related information, which is displayed on a display screen of the cashier and allows the cashier to securely conduct financial transactions with the worker.

Figure 21:
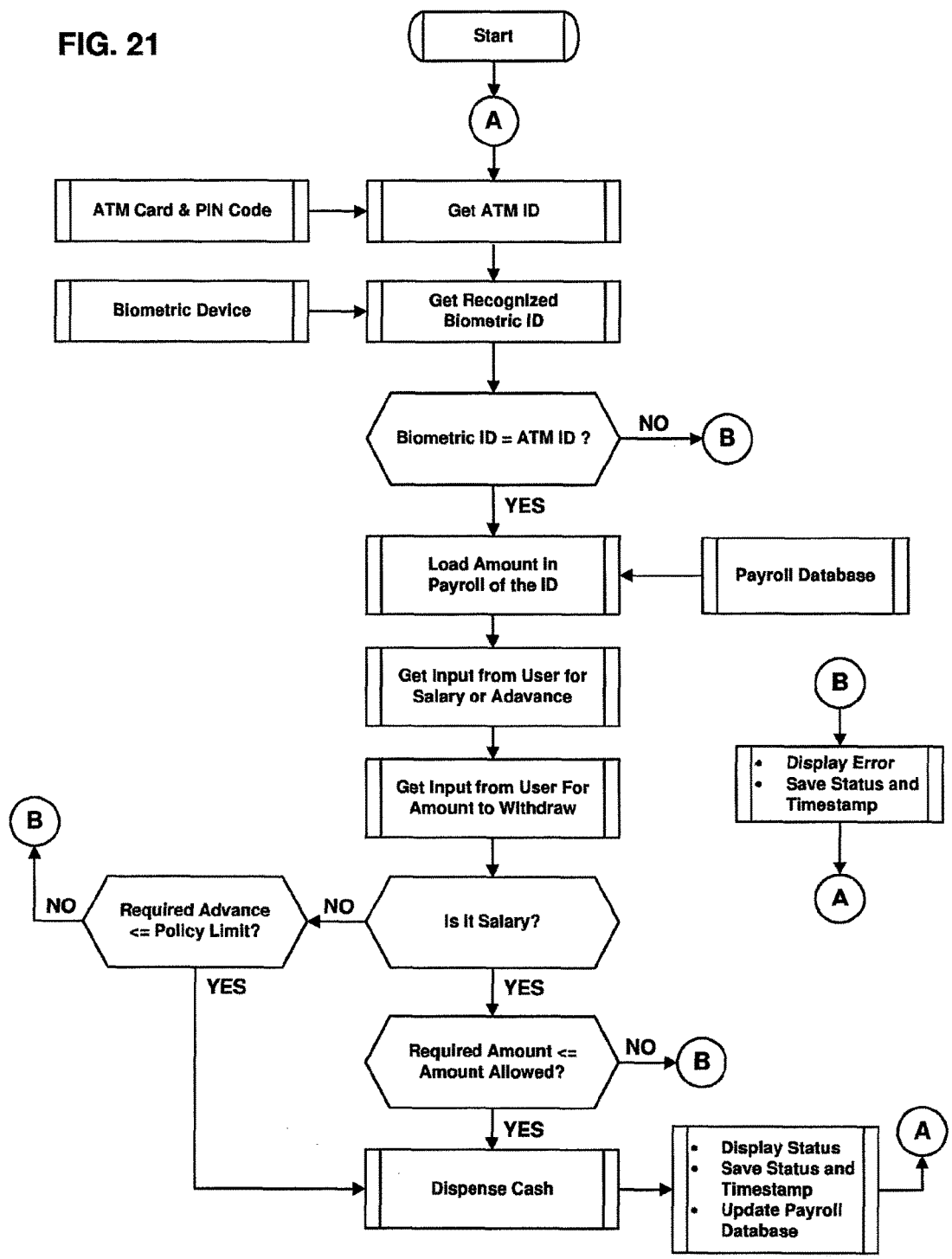

FIG. 21 is a flowchart that illustrates the use of a cash dispenser with the device 20. Integration of the cash dispenser with the device 20 allows robust and more secure financial transactions through an automated teller machine ("ATM"). In particular, ATM card information and a PIN collected through the ATM can be cross-matched against the recognized worker's biometric identity by the device 20. An identifier of the identified worker is pushed from the device 20 to a payroll server (e.g., the server 12 and/or a separate server) where the identifier is translated to payroll-related information. This information is used to allow the worker to withdraw funds based on the payroll-related information (as a regular payroll payment or as an advance payment) through the ATM. Accordingly, this integration increases the reliability and security of cash transactions with workers by mitigating identity-theft frauds.

Figure 22:
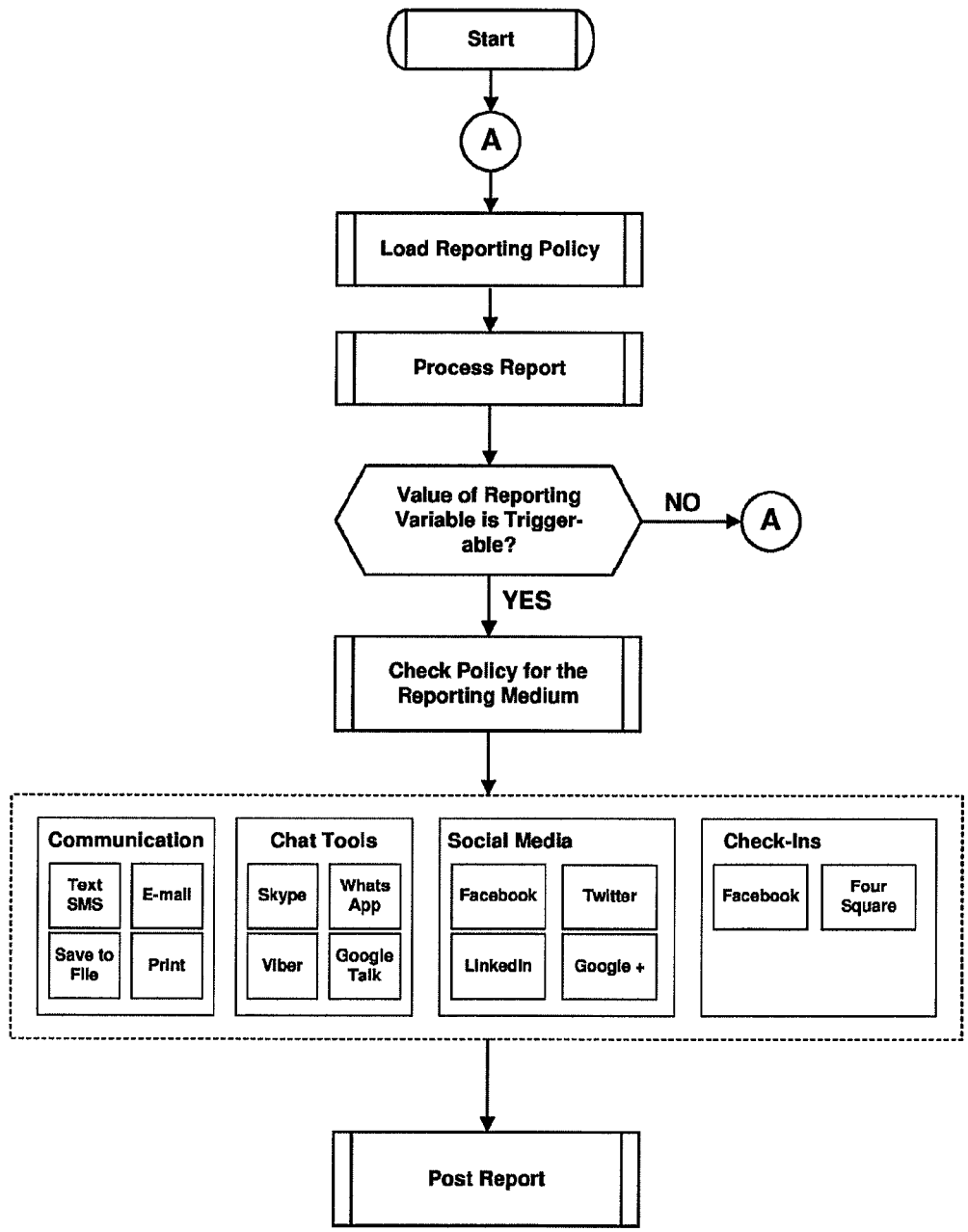
FIG. 22 is a flowchart illustrating a triggered-reporting method.

FIG. 22 is a flowchart that illustrates a triggered-reporting method integrated with the system 10. The triggered-reporting method is an implementation of a "management by exception" policy for work force management. In particular, a reporting engine executed by the device 20 determines the level of exception to be reported to management by cross-examining predefined values of variables during the processing of various reports. The triggered reports are then pushed on different mediums of communication enforced by a triggered reporting policy. In contrast to existing reporting solutions, the triggered-reporting method helps to produce more meaningful and essential reports for work force management. Moreover, the triggered-reporting method can be employed for Facebook and other check-in and loyalty management programs and applications.

Figure 23:
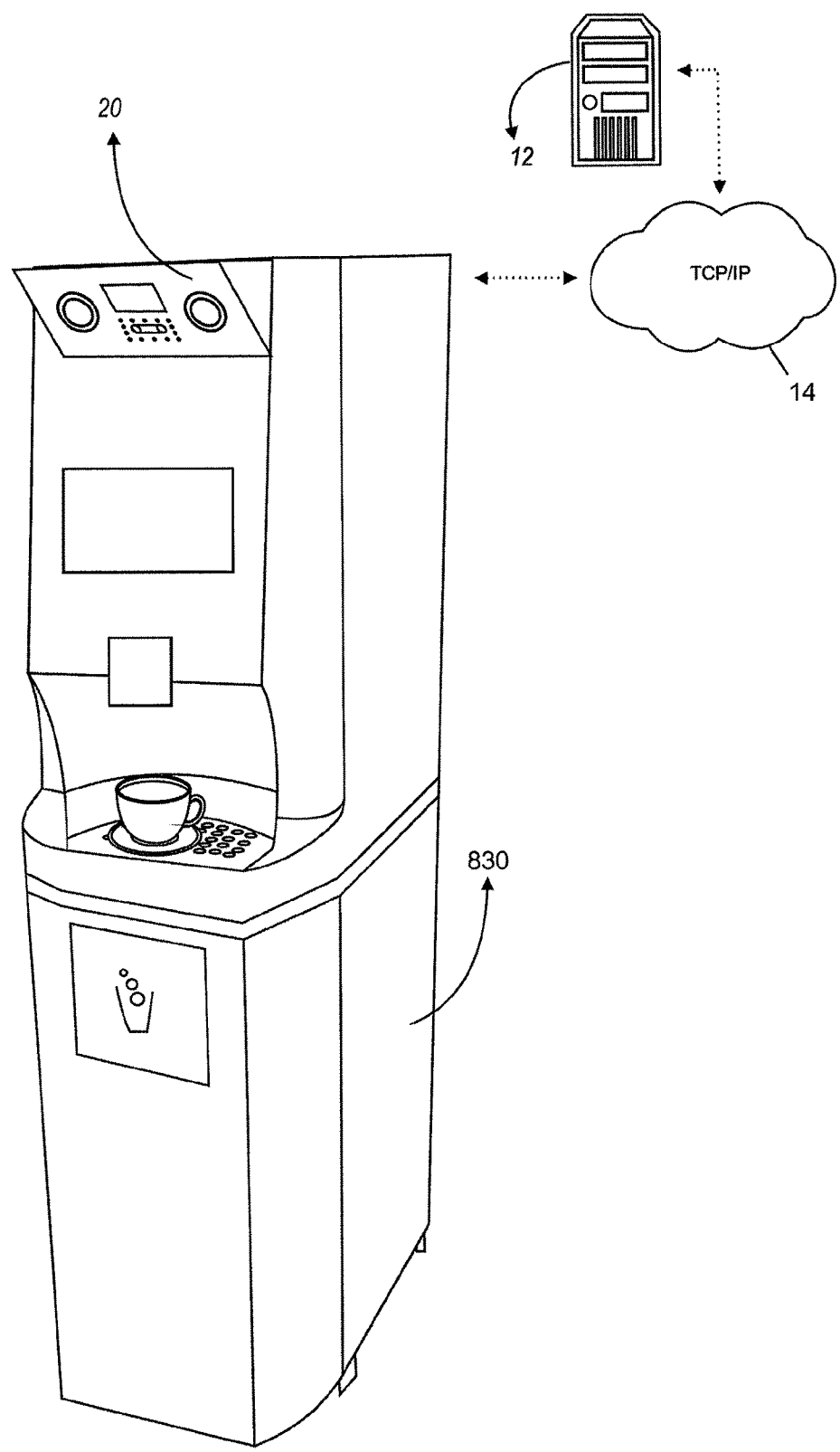
FIG. 23 illustrates a vending machine integrated with a biometric scanning device.

FIG. 23 illustrates a vending machine (e.g., a coffee vending machine) 830 integrated with the device 20. The integration of the vending machine 830 with the device 20 is a unique combination that allows automated biometric-controlled vending (e.g., a personalized cup of coffee). In particular, the device 20 can push a recognized identity of a worker to the server 12, which translates the identity to personalized options for the vending machine 830 (e.g., personalized options of coffee recipes). The options can then be displayed on the device 20 and/or the machine 830 (e.g., a touch screen display), and the worker can select one of the options. The device 20 and/or the machine 830 can keep a record of the selections of the workers, which can be used to analyze moods of the work force, which may help calculate trends or performance of the work force. In some embodiments, the vending machine 830 and the device 20 can be further integrated with a payroll system to allow workers to purchase items from the vending machine 830 from their salary (see, e.g., FIGS. 20 and 21 above).

Figure 24A:
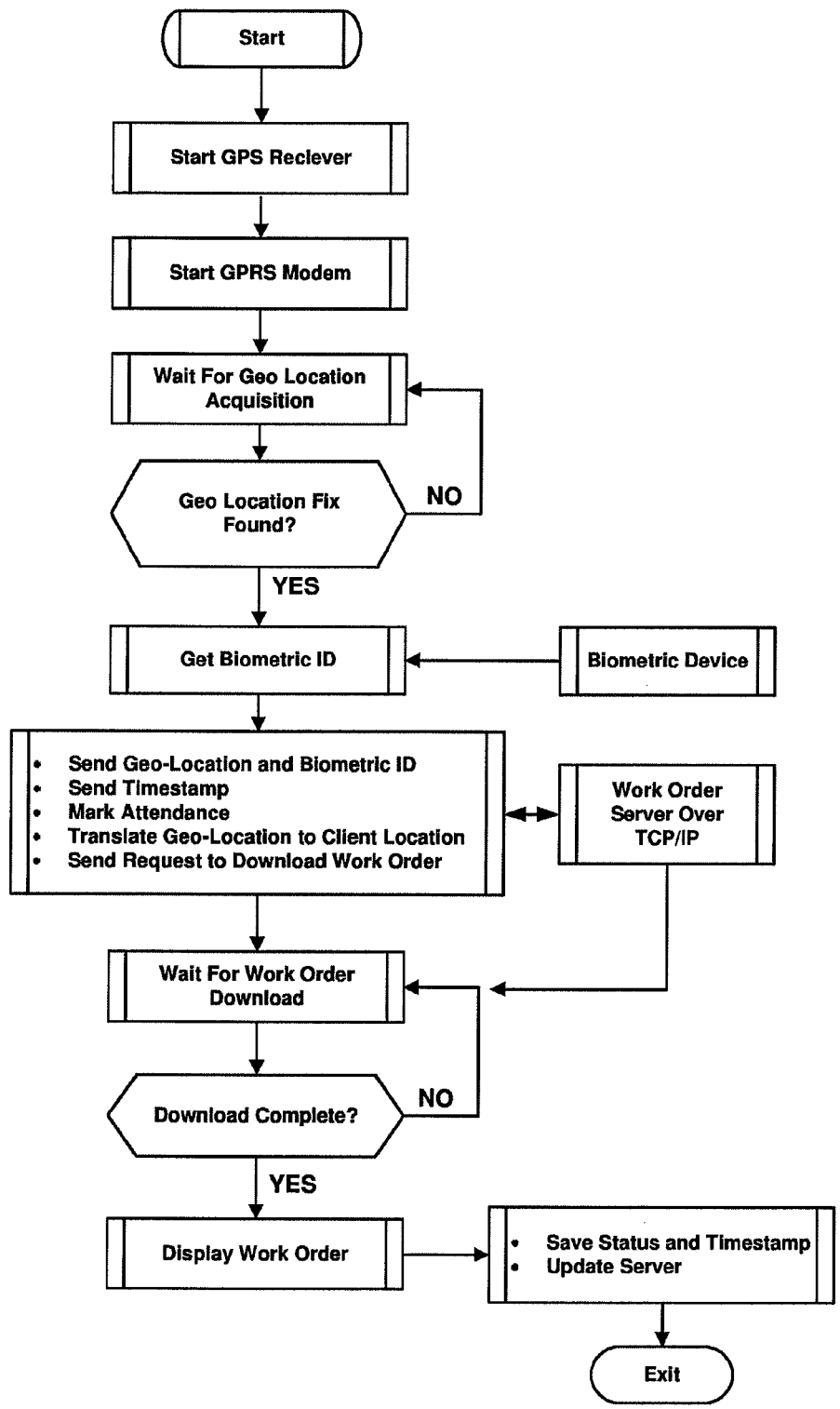
FIG. 24a is a flowchart illustrating a method of performing field worker management.
Figure 24B:
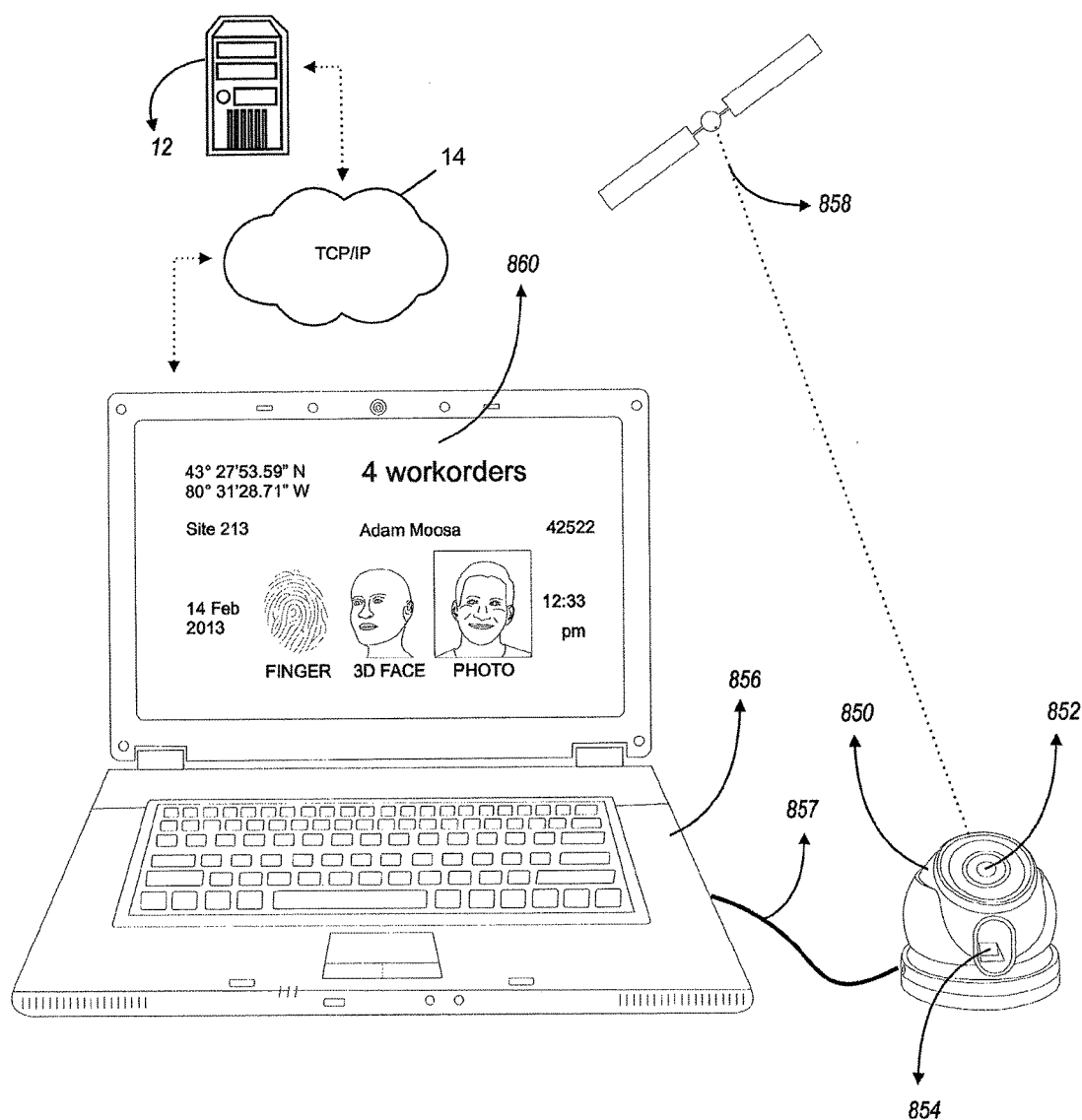
FIG. 24b schematically illustrates a field biometric scanning device.

FIG. 24a is a flowchart that illustrates using a field worker management system. The system allows a field worker to mark attendance and receive work orders based on the worker's current geographic location. For example, a field biometric scanning device 850 is illustrated in FIG. 24b. The field device 850 is a combination of a camera 852 (e.g., an infrared camera), fingerprint reader 854, global positioning system ("GPS") receiver, and a GSM/GPRS modem. The field device 850 connects to a mobile device 856, such as a laptop or tablet computer via a wired connection 857, such as a USB connection. The GPS receiver acquires a geographic location (e.g., latitude and longitude) from at least one GPS satellite 858. The GSM/GPRS modem provides a connection to the server 12 (e.g., a TCP/IP connection) over a cellular network. The mobile device 856 receives video captured by the camera 852 and fingerprint data captured by the fingerprint reader 854. Biometric algorithms performed by software executed by the mobile device 856 determines the biometric facial and fingerprint identifications and sends the identifications to the server 12 along with a geographic location from the GPS receiver through the GSM/GPRS modem. The server 12 identifies a worker based on the transmitted identifications and translates the geographic location to a client location where the worker was expected to work, and marks the attendance with the geographic location and time information.

In some embodiments, after processing the location of an identified worker at an identified client location, the server 12 produces a work order 860 with one or more tasks the worker should conduct at the client location. The work order 860 is downloaded to and displayed on the mobile device 856 from which the request was generated through the field device 850. As the worker progresses through the tasks, the mobile device 850 notifies the server 12 (e.g., in approximately real-time). Accordingly, although matching field workers and task management at multiple client locations with a large workforce is a challenging job, the field worker management system, including the field device 850, manages these working arrangements and can be integrated with payroll and other systems as described above for the device 20. By tracking individual tasks on a work order 860, the field worker management system can pay workers on a per task basis, which enhances performance of the workforce.

Figure 25:
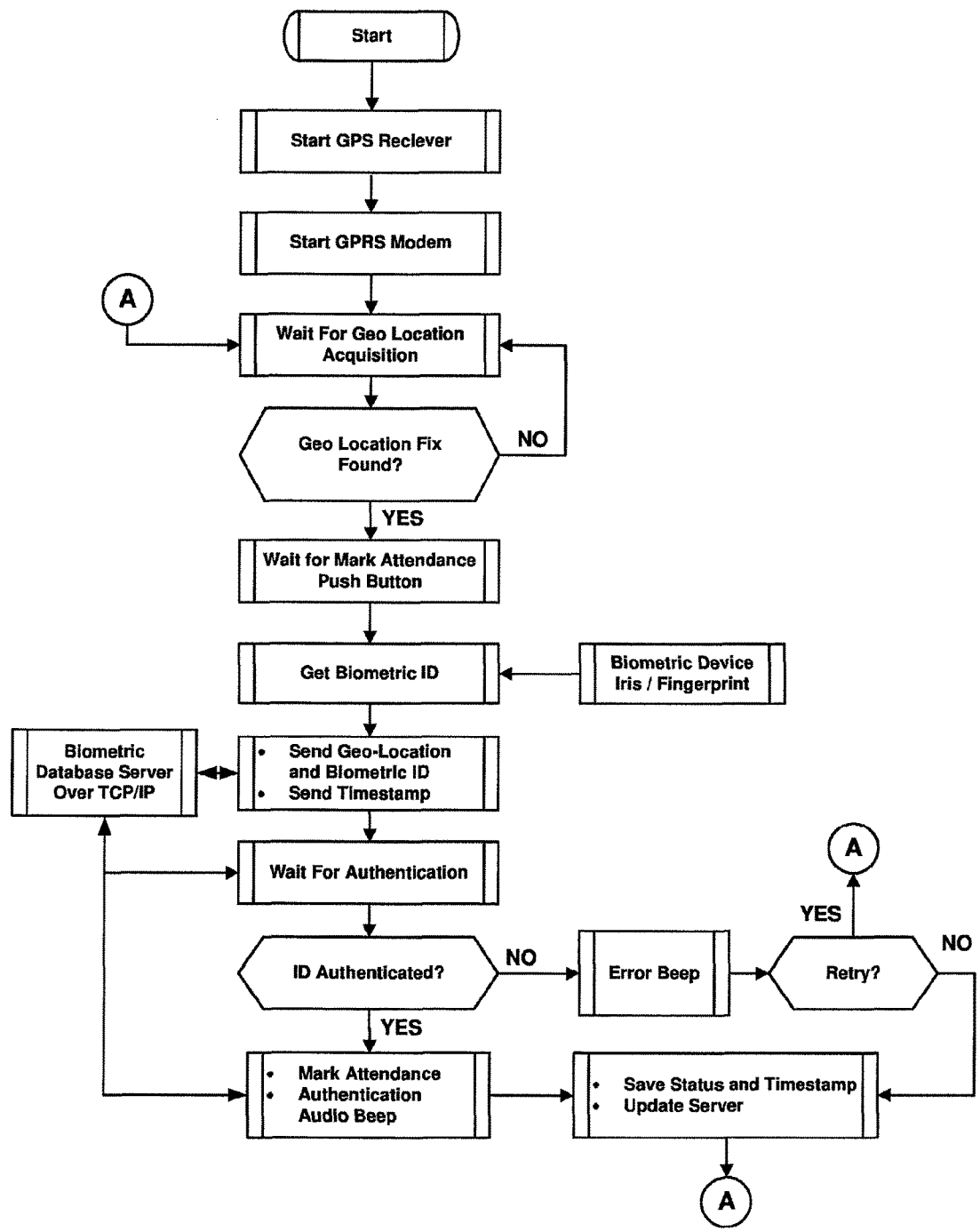
FIG. 25 is a flowchart illustrating a method of using a portable biometric scanning device.

FIG. 25 is a flowchart that illustrates using a portable biometric scanning device ("portable BSD") that integrates with the system 10. The portable BSD can be similar to the field device 850 and mobile device 856 described above with respect to FIGS. 24a and 24b. For example, the portable BSD includes a portable mobile device with a built-in battery (e.g., a smart phone, tablet computer, laptop computer, etc.) connected with an iris and/or infrared camera, a fingerprint reader, or both. The portable BSD also includes a GPS receiver and a GSM/GPRS modem.

A user interface provided by the portable device contains a "clock-in" button (e.g., a push button), an electromagnetic speaker for audio, and, optionally, a display for user interactions. The GPS receiver acquires a geographic location (i.e., latitude and longitude), and the GSM/GPRS modem provides connection servers (e.g., TCP/IP services) over a cellular network. On pressing the clock-in button, iris images from the camera and a fingerprint data from the fingerprint reader are captured and sent to the server 12 via the GSM/GPRS modem along with the geographic location from the GPS receiver and timestamp information. Biometric algorithm software executed by the server 12 recognizes the biometric iris and/or fingerprint and identifies the worker. The software also translates the geographic location to a work location and/or work zone where the worker was expected to work. Furthermore, the software marks the worker's attendance after verifying the biometric identifiers with the geographic location. The server 12 sends results back to the portable BSD. If the result of the request is granted (the worker and his or her location was verified by the server 12), the portable BSD plays a verification sound (e.g., a beep) through the speaker. Otherwise, the portable BSD plays an error sounds. Existing portable workforce systems do not collect biometric and geographic data that is tightly integrated with workforce management system.

Accordingly, the portable BSD helps to manage a remote workforce, such as traffic police, report their location and time while working from anywhere. In some embodiments, real-time GPS tracking of the portable BSD can be turned on and off, such as by issuing a command from the server 12.

Figure 26:
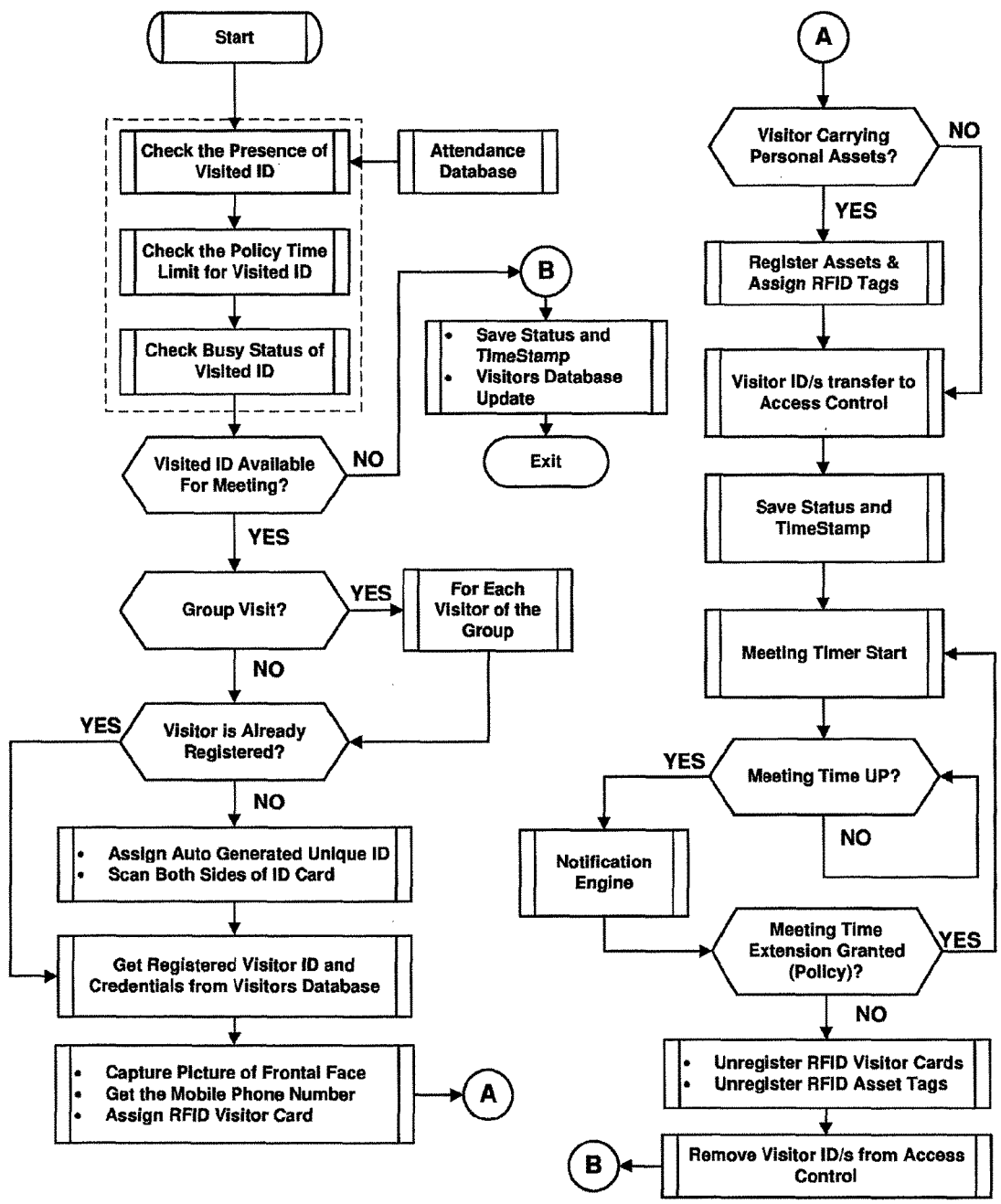
FIG. 26a is a flowchart illustrating a method of performing visitor management.
FIG. 26b schematically illustrates a visitor management console.
Figure 26B:
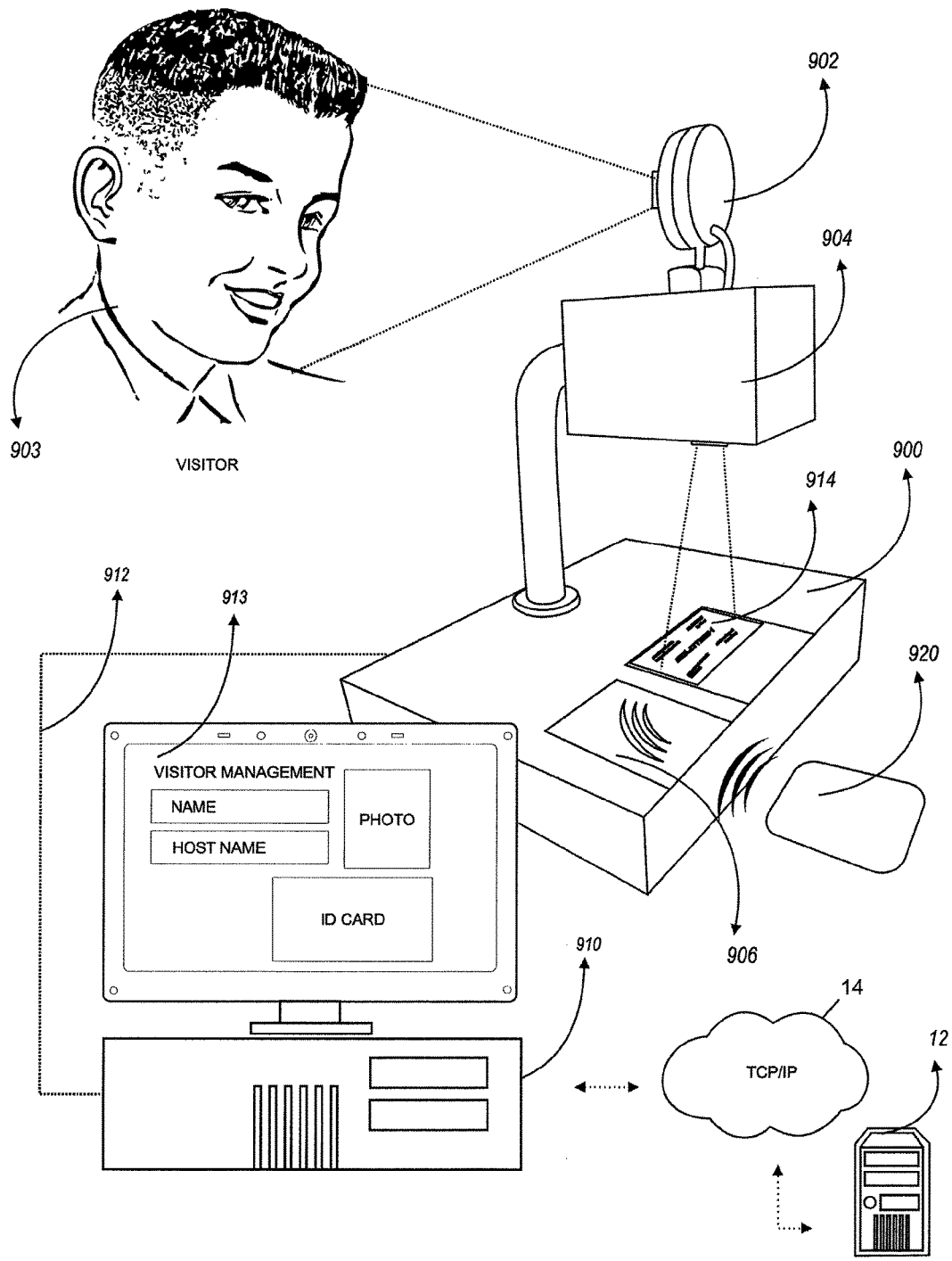

FIG. 26*a* is a flowchart that illustrates a visitor management system integrated with the system 10. In some embodiments, the visitor management system is a combination of a customized hardware and software solution. For example, a visitor management console 900 (hereinafter referred to as "console 900") is illustrated in FIG. 26*b*. The console 900 includes a camera 902 for capturing a front picture of the face of a visitor 903, a card scanner 904, and an RFID card reader 906. The console 900 is connected to a computing device 910 (e.g., a tablet computer or laptop computer), via a connection 912, such as a USB connection. The computing device 910 includes a screen 913 for interacting with an operator and managing visitor information.

When the visitor 903 approaches the console 900, an operator asks for a registration number if the visitor 903 visited previously. If the visitor 903 did not previously visit, a registration number is automatically generated. The visitor 603 is then asked to produce an identification card 914, such as a national identity card, a driver's license, a social security card, etc., and stand in front of console 900. The console 900 then automatically captures a front face photo of the visitor 903, scans the card 914, and issues a visitor RFID card 920. The RFID access code associated with the new card 920 is also broadcast to one or more access control points 16 (e.g., a RFID-driven device 20 and/or turnstile 22). Likewise, if the visitor 903 is carrying personal items, the items are documented and corresponding RFID tags are issued.

When the visitor 903 departs, the visitor management system unregisters the visitor RFID card 902 and any other RFID tags issued for the visitor 903 from the system and access control points and updates the history at the server 12. Visitor management integrated with the system 10 is beneficial for a workforce management system because it provides data on which workers are getting external visitors and how much time the external visitors are consuming of such workers. This kind of data is not available with existing visitor management systems.

In some embodiments, the visitor management system can also enforce visitor polices, such as meeting timings, number of visitors, time limits, frequent visits, group visits, etc. The visitor management system can also be configured to send notifications regarding visitors, such as text messages.

Figure 27:
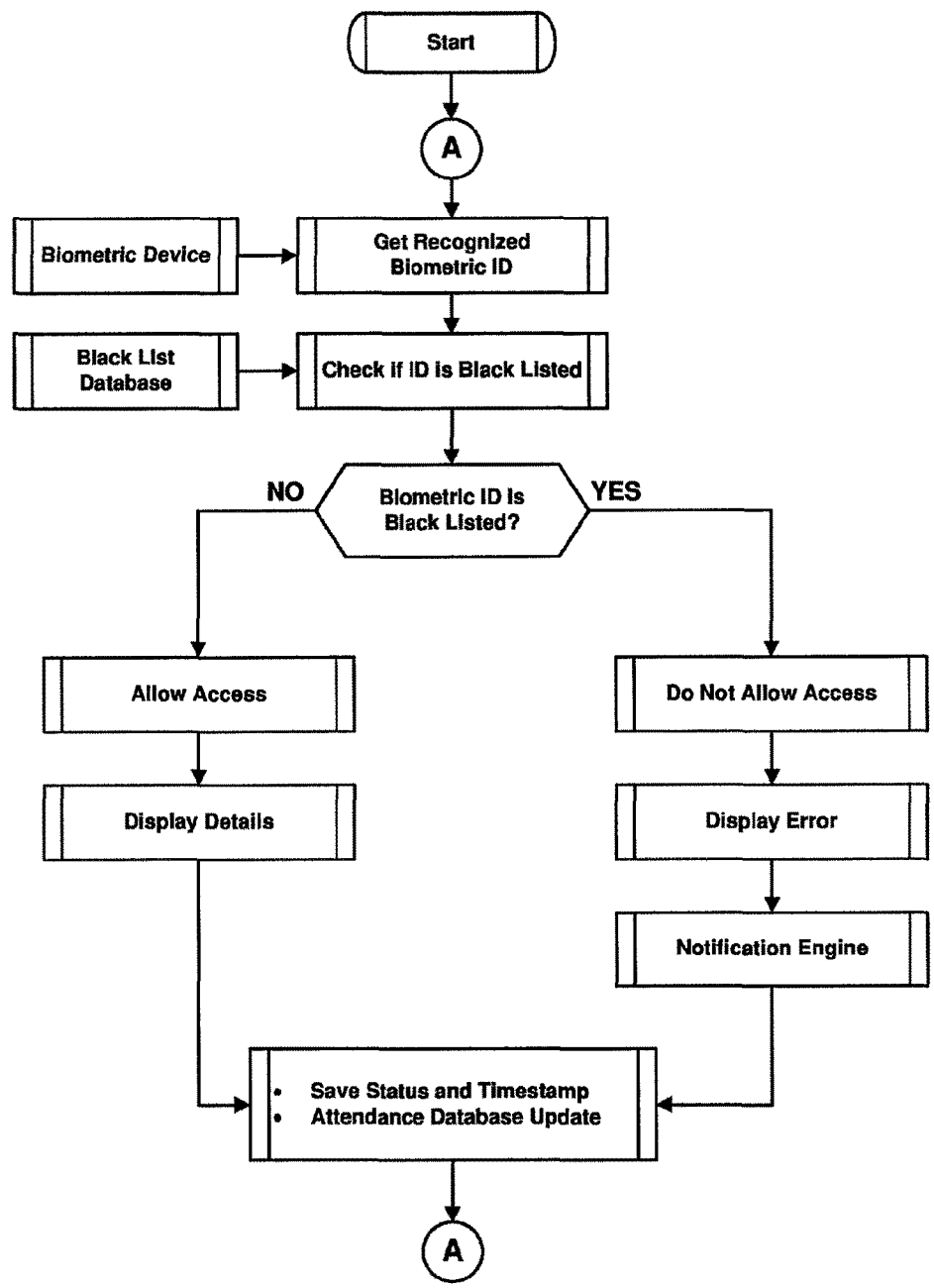
FIG. 27 is a flowchart illustrating a method of performing blacklisted detection.

FIG. 27 is a flowchart that illustrates the use of blacklisted-worker detection performed with the system 10. For example, to prevent entry and/or enrollment of particular workers (i.e., "blacklisted workers"), the device 20 pushes recognized biometric identifiers to the server 12, which cross-checks the biometric identifiers with a "blacklist" to allow or restrict access or enrollment.

Figure 28:
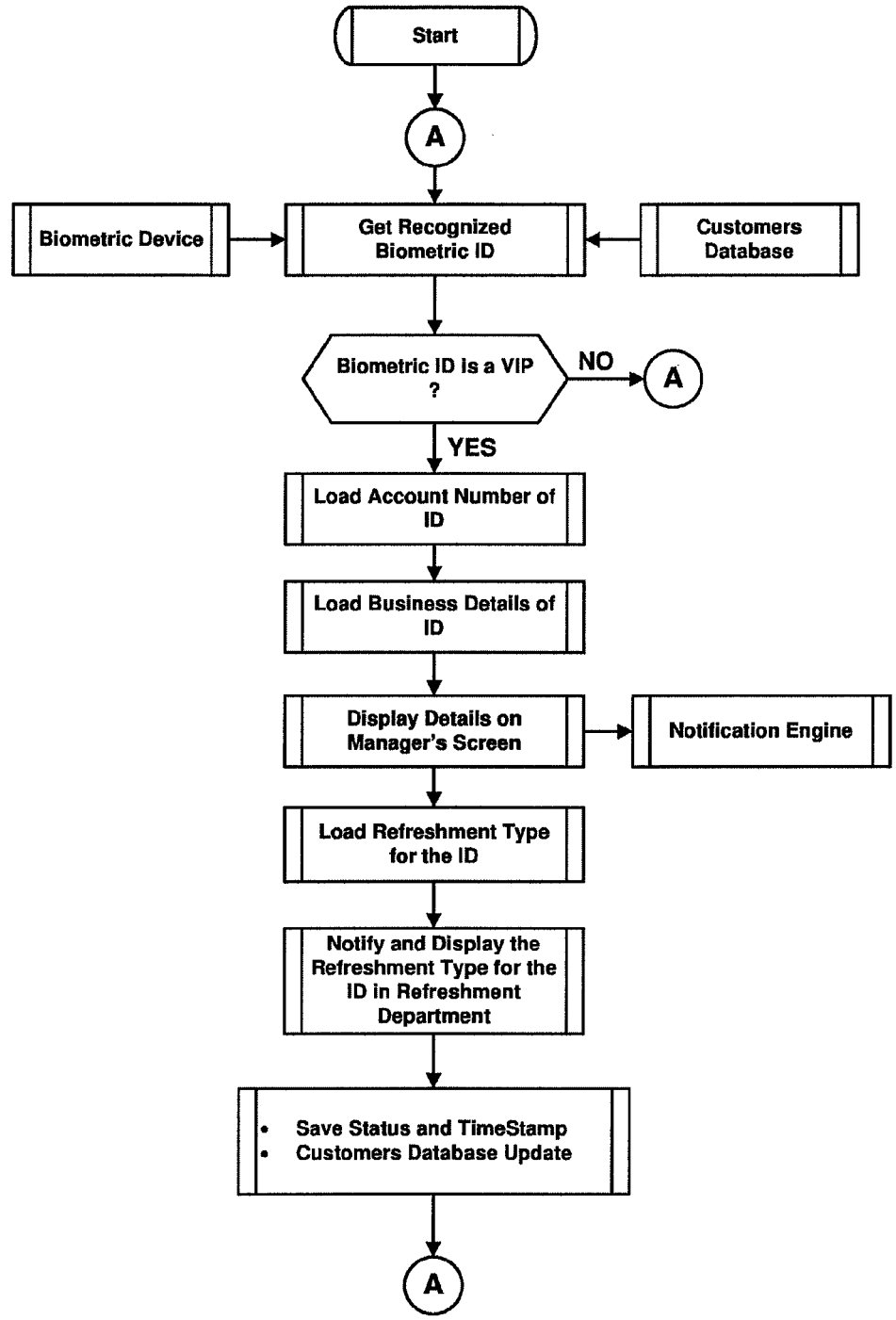
FIG. 28 is a flowchart illustrating a method of identifying a user's status.

FIG. 28 is a flowchart that illustrates the use of very-important-person ("VIP") management integrated with the device 20. In particular, the device 20 recognizes and pushes biometric identifiers to the server 12, which identifies the person's status. If a person's status is set to "VIP," the server 12 pushes the details to a manager or assigned officer of the business to inform him or her of the VIP's presence. If policy allows, the server 12 may also push the information to a catering section of the business to offer personalized catering (e.g., refreshments) for the VIP. VIP management also keeps records of the VIPs, which can be used for analysis and trend calculations for future business planning.

Figure 29:
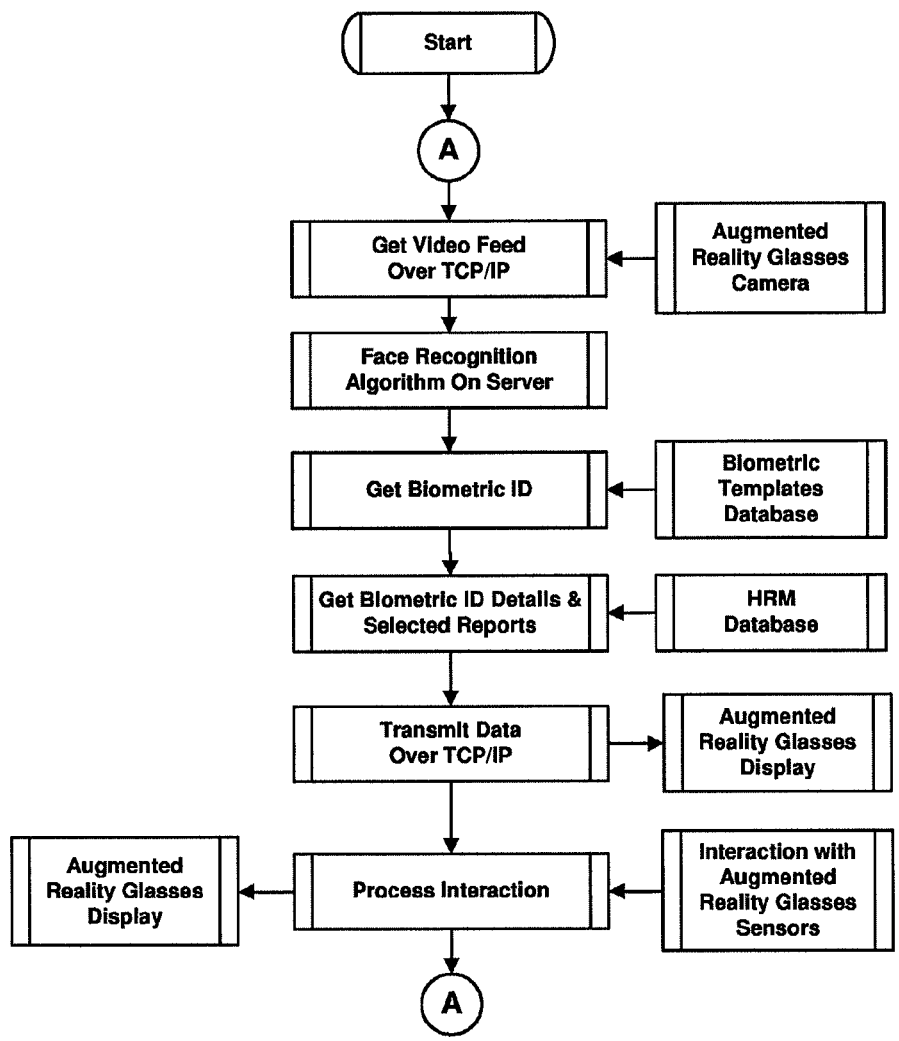
FIG. 29a is a flowchart illustrating using augmented-reality glasses with workforce management.
FIG. 29b schematically illustrates augmented-reality glasses.
Figure 29B:
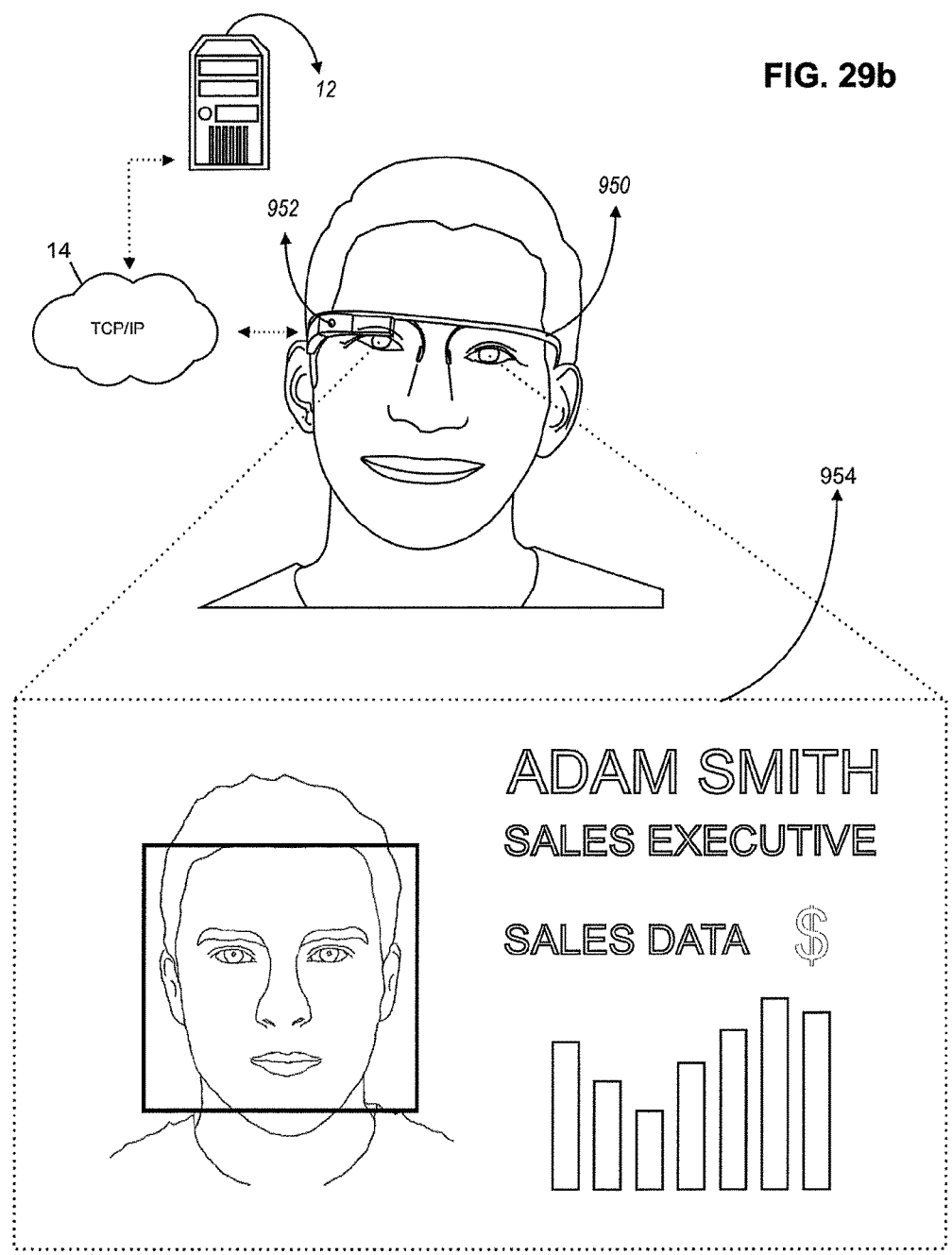

FIG. 29*a* is a flowchart that illustrates the use of augmented-reality glasses integrated with the system 10. For example, FIG. 29*b* illustrates a possible arrangement of such integration. The hardware of the glasses 950 (e.g. Google Glass) is capable of capturing real-time video with an integrated camera 952 and sending the captured video to the server 12. The server 12 recognizes the person viewed by the wearer of the glasses 950 (i.e., using facial recognition as described above), transmits data to the glasses 950 (e.g., providing an identity of the viewed person) in approximately real-time. The returned data or at least a portion thereof is displayed on the glasses 950 themselves or heads up display ("HUD") 954. In some embodiments, the server 12 produces a report based on the identified person viewed by the glasses wearer (e.g., suitable for making quick decisions). The report is then transmitted back to the glasses 950. This integrated can be designed for busy managers who work with large workforces and can increase worker and task management.

Thus, embodiments of the invention provide, among other things, biometric scanning devices configured to collect biometric information from a worker and integrating the collected information with various workforce management systems, such as HR, payroll, security, work orders, task management, asset management, trend analysis, etc. It should be understood that the term "worker" as used in the present application can include any individual attempting to access a particular area or mark their presence at a particular location. Therefore, the term "worker" as used herein should be construed as being limited to employees of an employer.

Various features of the invention are set forth in the following claims.

What is claimed is:

1. A method of performing workforce management, the method comprising:
   receiving, by a biometric scanning device, a plurality of biometric templates, wherein each of the plurality of biometric templates is associated with an individual;
   storing, by the biometric scanning device, the plurality of biometric templates to an internal memory;
   switching, by the biometric scanning device, to a detection mode;
   capturing, by the biometric scanning device, an image of a subject;
   processing, by the biometric scanning device, the image to identify a face;
   processing, by the biometric scanning device, the image to identify a first eye included in the identified face;
   processing, by the biometric scanning device, the image to identify a second eye included in the identified face;
   comparing, by the biometric scanning device, the identified face to at least one of the plurality of biometric templates stored on the internal memory to identify a first match;
   comparing, by the biometric scanning device, the identified first eye to at least one of the plurality of biometric templates stored on the internal memory to identify a second match;

comparing, by the biometric scanning device, the identified second eye to at least one of the plurality of biometric templates stored on the internal memory to identify a third match;

using, by the biometric scanning device, the first match, the second match, and the third match to determine an identity of the subject; and when an identity of the subject is determined, outputting, by biometric scanning device, information, wherein using the first match, the second match, and the third match to determine the identity of the subject includes:

determining if the second match and the third match are the same;

when the second match and the third match are the same, determining if the first match is the same as the second match and the third match; and when the first match is the same as the second match and the third match, determining the identity of the subject based on at least one of the first match, the second match, and the third match.

2. The method of claim 1, wherein shifting to the detection mode includes shifting to the detection mode upon detection of at least one selected from the group comprising motion and a radio frequency device.

3. The method of claim 1, wherein capturing the image of a subject includes capturing a first image of the subject from a first camera and capturing a second image of the subject from a second camera.

4. The method of claim 3, wherein capturing the first image of the subject from the first camera includes capturing the first image from a color camera and wherein capturing the second image of the subject from second camera includes capturing the second image from an infrared camera.

5. The method of claim 1, wherein processing the image to identify a face includes performing three-dimensional reconstruction of the face.

6. The method of claim 1, further comprising detecting a gender of the identified face and identifying a subset of the plurality of biometric templates stored on the internal memory as applicable for the identified face.

7. The method of claim 1, wherein comparing the identified face to the at least one of the plurality of biometric templates includes comparing the identified face to a first subset of the plurality of biometric templates and wherein comparing the identified at least one eye to the at least one of the plurality of biometric templates includes comparing the identified at least one eye to a second subset of the plurality of biometric templates, wherein the first subset is different than the second subset.

8. The method of claim 1, wherein comparing the identified at least one eye to the at least one of the plurality of biometric templates includes comparing the identified at least one eye to the at least one of the plurality of biometric templates at the same time as comparing the identified face to at least one of the plurality of biometric templates.

9. The method of claim 1, wherein comparing the identified face to at least one of the plurality of biometric templates stored on the internal memory to identify the first match includes comparing the identified face to at least one of the plurality of biometric templates to identify a plurality of first matches.

10. The method of claim 9, wherein determining if the first match is the same as the second match and the third match includes determining one of the plurality of first matches is the same as the second match and the third match.

11. The method of claim 1, wherein outputting the information includes outputting the information to at least one selected from the group comprising a display, a speaker, and a light emitting diode.

12. The method of claim 1, wherein outputting the information includes transmitting the information over at least one network.

13. The method of claim 1, wherein outputting the information includes transmitting the information to an external attendance system.

14. The method of claim 1, wherein outputting the information includes transmitting a control signal to a barrier, the control signal instructing the barrier to allow the subject to pass.

15. The method of claim 1, wherein outputting the information includes storing the image to a removable memory included in the biometric scanning device.

16. A system for performing workforce management, the system comprising:

a biometric scanning device including a camera and memory; and a server storing a plurality of biometric templates and configured to transmit the plurality of biometric templates to the biometric scanning device, wherein each of the biometric templates is associated with a different individual, wherein the biometric scanning device is configured to receive the plurality of biometric templates from the server, store the plurality of biometric templates to an internal memory, switch to a detection mode, capture an image of a subject using the camera, process the image to identify a face, process the image to identify a first eye included in the identified face, process the image to identify a second eye included in the identified face, compare the identified face to at least one of the plurality of biometric templates stored on the internal memory to identify a first match, compare the identified first eye to at least one of the plurality of biometric templates stored on the internal memory to identify a second match, compare the identified second eye to at least one of the plurality of biometric templates stored in the internal memory to identify a third match, use the first match, the second match, and the third match to determine an identity of the subject, and when an identity of the subject is determined, output information wherein the biometric scanning device is configured to use the first match, the second match, and the third match to determine the identity of the subject by determining if the second match and the third match are the same, when the second match and the third match are the same, determining if the first match is the same as the second match and the third match; and when the first match is the same as the second match and the third match, determining the identity of the subject based on at least one of the first match, the second match, and the third match.

17. The system of claim 16, wherein the biometric scanning device is configured to output information by transmitting control signals to at least one barrier.

18. The system of claim 17, wherein the at least one barrier includes at least one selected from the group comprising an electromagnetic gate and an electric gate.

19. The system of claim 16, wherein the biometric scanning device is configured to output information by transmitting the identity and a time to a remote attendance system.

20. The system of claim 16, wherein the camera includes a color camera and an infrared camera.

21. The system of claim 20, wherein the biometric scanning device further includes a filter overlaid on the infrared camera, the filter allowing infrared light to pass but blocks visible light.

22. The system of claim 20, wherein the biometric scanning devices includes an infrared illuminator for use with the infrared camera.

23. The system of claim 22, wherein the infrared illuminator includes at least one infrared light emitting diode.

24. The system of claim 16, wherein the biometric scanning device includes a radio frequency identification antenna, and wherein the biometric scanning device is configured to shift to the detection mode upon detecting a radio frequency device.

25. The system of claim 16, wherein the biometric scanning device is configured to output information by outputting information on at least one selected from the group comprising a display screen, a speaker, and a light emitting diode.

26. The system of claim 16, wherein the biometric scanning device further includes a motion detector and wherein the biometric scanning device is configured to switch to the detection mode when the motion detector detects motion.

27. The system of claim 16, wherein the biometric scanning device is configured to compare the identified face to at least one of the plurality of biometric templates stored on the internal memory to identify a plurality of first matches when the second match is not identified.

28. A system for performing workforce management, the system comprising:
   a left eye, right eye, and three-dimensional face based multi-biometric scanning device; and
   a server storing a plurality of biometric templates and configured to transmit the plurality of biometric templates to the biometric scanning device, wherein each of the biometric templates is associated with an individual, wherein the biometric scanning device is configured to identify an individual based on the plurality of biometric templates and integrate with at least one selected from the group comprising: a radio frequency identification reader, a computing device providing a policy override function, a computing device displaying a survey, a payroll system, a cash dispensing machine, a vending machine, a metal detector, a mobile telephone transmitting a remote access instruction, a mobile telephone performing video conferencing, a palm vein reader, one or more proximity sensors for detecting individuals entering or leaving the area, and a pair of augmented-reality glasses,
   wherein the biometric scanning device is configured to identify an individual based on the plurality of biometric templates by
      identifying, from data captured by the biometric scanning device, a face, a first eye included in the face, and a second eye included in the face, comparing the identified face to at least one of the plurality of biometric templates to identify a first match, comparing the identified first eye to at least one of the plurality of biometric templates to identify a second match, comparing the identified second eye to at least one of the plurality of biometric templates to identify a third match, using the first match, the second match, and the third match to determine an identity of the subject, and, when an identity of the subject is determined, outputting information
   wherein the biometric scanning device is configured to use the first match, the second match, and the third match to determine the identity of the subject by
   determining if the second match and the third match are the same,
   when the second match and the third match are the same, determining if the first match is the same as the second match and the third match; and
   when the first match is the same as the second match and the third match, determining the identity of the subject based on at least one of the first match, the second match, and the third match.

* * * * *